US00RE43964E

(19) United States
(12) Reissued Patent
Fischer et al.

(10) Patent Number: US RE43,964 E
(45) Date of Reissued Patent: *Feb. 5, 2013

(54) CELLULAR COMMUNICATIONS SYSTEM WITH SECTORIZATION

(75) Inventors: Larry G. Fischer, Waseca, MN (US); David S. Russell, St. Paul, MN (US); Philip M. Wala, Waseca, MN (US); Charles R. Ratliff, Guatemala (GT); Jeffrey O. Brennan, Waseca, MN (US)

(73) Assignee: ADC Telecommunications, Inc., Shakopee, MN (US)

( * ) Notice: This patent is subject to a terminal disclaimer.

(21) Appl. No.: 11/937,255

(22) Filed: Nov. 8, 2007

Related U.S. Patent Documents

Reissue of:
(64) Patent No.: 5,852,651
Issued: Dec. 22, 1998
Appl. No.: 08/299,159
Filed: Aug. 31, 1994

U.S. Applications:
(60) Continuation of application No. 09/747,273, filed on Dec. 22, 2000, now Pat. No. Re. 40,564, which is a division of application No. 08/204,660, filed on Mar. 2, 1994, now Pat. No. 5,627,879, which is a continuation- (Continued)

(51) Int. Cl.
*H04B 10/12* (2006.01)
(52) U.S. Cl. ..... 379/56.2; 398/115; 398/41; 455/562.1
(58) Field of Classification Search ..... 455/279, 455/279.2, 354
See application file for complete search history.

(56) References Cited

U.S. PATENT DOCUMENTS
(Continued)

FOREIGN PATENT DOCUMENTS

| | | |
|---|---|---|
| CA | 2008900 | 1/1990 |
| CA | 2008900 | 10/1990 |

(Continued)

OTHER PUBLICATIONS

"And now a few words from your Customers . . . " Four pages. ADC Kentrox.COPYRGT. A Subsidiary of ADC Telecommunications, Inc. Aug. 1992.

(Continued)

*Primary Examiner* — Temesgh Ghebretinsae
*Assistant Examiner* — Richard Chan
(74) *Attorney, Agent, or Firm* — Fogg & Powers LLC

(57) ABSTRACT

A method and apparatus for sectorizing coverage of a cellular communications area includes providing a remote unit having microcell antenna units. Each microcell antenna unit is configured to cover a particular sector. The remote unit is connected to a sectorized base station unit which is connected to a mobile telecommunications switching office. Separate digitized streams representative of telephone signals received from the mobile telecommunications switching office are generated corresponding to the microcell antenna units and the separate digitized streams are multiplexed and transmitted to the remote unit. The remote unit demultiplexes the multiplexed digitized streams into the separate digitized streams corresponding to the microcell antenna units and the separate digitized streams are converted to RF signals for coverage of a particular sector by the corresponding microcell antenna unit. Separate digitized streams are separately generated for each microcell antenna unit representative of RF signals received at the microcell antenna unit for a particular sector. The separately generated digitized streams are multiplexed at the remote unit and transmitted to the sectorized base station unit. At the sectorized base station unit, the multiplexed digitized streams are demultiplexed into the separate digitized streams corresponding to microcell antenna units and the separate digitized streams are converted to RF signals for provision to the mobile telecommunications switching office. Diversity at the remote units is also provided.

149 Claims, 58 Drawing Sheets

Related U.S. Application Data in-part of application No. 08/183,221, filed on Jan. 14, 1994, now abandoned, which is a continuation-in-part of application No. 08/068,389, filed on May 28, 1993, now abandoned, which is a continuation-in-part of application No. 07/946,402, filed on Sep. 17, 1992, now abandoned, and a continuation-in-part of application No. 07/946,964, filed on Sep. 17, 1992, now abandoned, and a continuation-in-part of application No. 07/946,931, filed on Sep. 17, 1992, now abandoned, and a continuation-in-part of application No. 07/946,548, filed on Sep. 17, 1992, now abandoned.

(56) References Cited

U.S. PATENT DOCUMENTS

| | | | | |
|---|---|---|---|---|
| 3,931,473 | A | | 1/1976 | Ferris, Jr. |
| 4,101,834 | A | | 7/1978 | Stutt et al. |
| 4,112,488 | A | | 9/1978 | Smith, III |
| 4,144,409 | A | | 3/1979 | Utano et al. |
| 4,144,411 | A | | 3/1979 | Frenkiel |
| 4,183,054 | A | | 1/1980 | Patisaul et al. |
| 4,231,116 | A | | 10/1980 | Sekiguchi et al. |
| 4,244,046 | A | | 1/1981 | Brouard et al. |
| 4,354,167 | A | | 10/1982 | Terreault et al. |
| 4,402,076 | A | | 8/1983 | Krajewski |
| 4,451,699 | A | | 5/1984 | Gruenberg |
| 4,456,793 | A | | 6/1984 | Baker et al. |
| 4,475,010 | A | | 10/1984 | Huensch et al. |
| 4,485,486 | A | | 11/1984 | Webb et al. |
| 4,525,861 | A | | 6/1985 | Freeburg |
| 4,531,239 | A | | 7/1985 | Usui |
| 4,556,760 | A | | 12/1985 | Goldman |
| 4,596,051 | A | | 6/1986 | Feldman |
| 4,611,323 | A | | 9/1986 | Hessenmuller |
| 4,613,990 | A | | 9/1986 | Halpern |
| 4,628,501 | A | | 12/1986 | Loscoe |
| 4,654,843 | A | | 3/1987 | Roza et al. |
| 4,669,107 | A | | 5/1987 | Eriksson-Lennartsson |
| 4,691,292 | A | | 9/1987 | Rothweiler |
| 4,701,909 | A | | 10/1987 | Kavehrad et al. |
| 4,704,733 | A | | 11/1987 | Kawano |
| 4,718,004 | A | | 1/1988 | Dalal |
| 4,754,451 | A | | 6/1988 | Eng et al. |
| 4,759,051 | A | | 7/1988 | Han |
| 4,760,573 | A | | 7/1988 | Calvignac et al. |
| 4,790,000 | A | | 12/1988 | Kinoshita |
| 4,797,947 | A | | 1/1989 | Labedz |
| 4,816,825 | A | | 3/1989 | Chan et al. |
| 4,831,662 | A | | 5/1989 | Kuhn |
| 4,849,963 | A | | 7/1989 | Kawano et al. |
| 4,916,460 | A | | 4/1990 | Powell |
| 4,920,533 | A | | 4/1990 | Dufresne et al. |
| 4,932,049 | A | | 6/1990 | Lee |
| 4,959,829 | A | | 9/1990 | Griesing |
| 4,977,593 | A | | 12/1990 | Ballance |
| 4,999,831 | A | | 3/1991 | Grace |
| 5,067,147 | A | | 11/1991 | Lee |
| 5,067,173 | A | | 11/1991 | Gordon et al. |
| 5,084,869 | A | | 1/1992 | Russell |
| 5,136,410 | A | | 8/1992 | Heiling et al. |
| 5,138,440 | A | | 8/1992 | Radice |
| 5,159,479 | A | | 10/1992 | Takagi |
| 5,175,867 | A | | 12/1992 | Wejke et al. |
| 5,193,109 | A | | 3/1993 | Lee |
| 5,243,598 | A | | 9/1993 | Lee |
| 5,251,053 | A | | 10/1993 | Heidemann |
| 5,267,261 | A | | 11/1993 | Blakeney, II et al. |
| 5,272,700 | A | | 12/1993 | Hansen et al. |
| 5,278,690 | A | | 1/1994 | Vella-Coleiro |
| 5,280,472 | A | | 1/1994 | Gilhousen et al. |
| 5,285,469 | A | | 2/1994 | Vanderpool |
| 5,297,193 | A | | 3/1994 | Bouix et al. |
| 5,299,198 | A | | 3/1994 | Kay et al. |
| 5,301,056 | A | | 4/1994 | O'Neill |
| 5,303,287 | A | | 4/1994 | Laborde |
| 5,305,308 | A | | 4/1994 | English et al. |
| 5,309,474 | A | | 5/1994 | Gilhousen et al. |
| 5,313,461 | A | | 5/1994 | Ahl et al. |
| 5,321,849 | A | | 6/1994 | Lemson |
| 5,339,184 | A | | 8/1994 | Tang |
| 5,381,459 | A | | 1/1995 | Lappington |
| 5,392,453 | A | | 2/1995 | Gudmundson et al. |
| 5,442,681 | A | * | 8/1995 | Kotzin et al. ..... 455/450 |
| 5,442,700 | A | | 8/1995 | Snell et al. |
| 5,528,582 | A | * | 6/1996 | Bodeep et al. ..... 370/276 |
| 5,586,121 | A | | 12/1996 | Moura et al. |
| 5,587,734 | A | | 12/1996 | Lauder et al. |
| 5,627,879 | A | * | 5/1997 | Russell et al. ..... 370/328 |
| 5,642,405 | A | * | 6/1997 | Fischer et al. ..... 455/444 |
| 5,644,622 | A | * | 7/1997 | Russell et al. ..... 455/422.1 |
| 5,682,256 | A | * | 10/1997 | Motley et al. ..... 398/115 |
| 5,802,173 | A | | 9/1998 | Hamilton-Piercy et al. |
| 5,805,983 | A | * | 9/1998 | Naidu et al. ..... 455/67.16 |
| 5,809,395 | A | * | 9/1998 | Hamilton-Piercy et al. .. 725/106 |
| 6,751,417 | B1 | * | 6/2004 | Combs et al. ..... 398/71 |
| 7,075,369 | B2 | * | 7/2006 | Takenaka ..... 330/254 |
| 7,190,903 | B1 | * | 3/2007 | Combs et al. ..... 398/71 |
| 7,548,695 | B2 | * | 6/2009 | Wake ..... 398/71 |
| 7,614,074 | B2 | * | 11/2009 | Mobley et al. ..... 725/129 |
| 8,019,221 | B2 | * | 9/2011 | Zancewicz ..... 398/72 |
| 8,032,916 | B2 | * | 10/2011 | Oyadomari et al. ..... 725/119 |
| 2003/0066087 | A1 | * | 4/2003 | Sawyer et al. ..... 725/111 |
| 2005/0131645 | A1 | * | 6/2005 | Panopoulos ..... 701/214 |
| 2007/0166036 | A1 | * | 7/2007 | Combs et al. ..... 398/71 |
| 2009/0034979 | A1 | * | 2/2009 | Zancewicz ..... 398/115 |
| 2009/0067841 | A1 | * | 3/2009 | Combs et al. ..... 398/72 |
| 2011/0182583 | A1 | * | 7/2011 | Rakib ..... 398/67 |
| 2011/0265140 | A1 | * | 10/2011 | Rakib ..... 725/124 |

FOREIGN PATENT DOCUMENTS

| | | | |
|---|---|---|---|
| DE | 3707244 | | 9/1988 |
| EP | 2 345 865 | | 3/1977 |
| EP | 0 166 885 | | 4/1985 |
| EP | 0166885 | A2 | 1/1986 |
| EP | 0 346 925 | | 6/1989 |
| EP | 0 368 673 | | 11/1989 |
| EP | 0346925 | A2 | 12/1989 |
| EP | 0 391 597 | | 3/1990 |
| EP | 0368673 | A1 | 5/1990 |
| EP | 0391597 | A2 | 10/1990 |
| EP | 0 468 688 | A2 | 7/1991 |
| EP | 0468688 | A2 | 1/1992 |
| FR | 2345865 | | 10/1977 |
| JP | 3 26031 | | 0/0000 |
| JP | 58-164007 | | 6/1983 |
| JP | 58-164007 | | 9/1983 |
| JP | 3-26031 | | 2/1991 |
| JP | 5-12374 | | 1/1993 |
| WO | 9115927 | | 10/1991 |

OTHER PUBLICATIONS

ADC Kentrox, News Release, "ADC Kentrox Introduces Innovative Wireless Network Access Solution Cellular Subscribers Offered a New Level of Portable Services," Mar. 1, 1993 (3 pages).

ADC Kentrox, News Release, "First Field Trial Results Exceeds Expectations," Mar. 2, 1993 (2 pages).

ADC Kentrox Wireless System Group CityCell.TM. 824—A Positioning white paper, (Mar. 1993) CITA Trade Show.

"ADC Kentrox Introduces CityCell 824, A Replacement for Conventional Cell Sites; Company's Original Goal Was To Improve Fiber Optic T1 Links Between Cells, MTSOs," Telocator Bulletin, Feb. 1993 (1 page).

Ameritech, "Broadband Optical Transport Digital Microcell Connection Service—Interface and Performance Specifications. A technical descriptionof the User-Network Interface and Performance Specifications," AM TR-NIS 000117, (pp. 1-26), Issue 1, Dec. 1993.

Cellular Industry, The Day Group, "New Signal Transport Technology Digitizes The Cellular Band," 2 pages, (prior to Dec. 22, 2000).

Cox, "A Radio System Proposal for Widespread Low-Power Tetherless Communications," IEEE Transactions on Communication, vol. 39(2), Feb. 1991, pp. 324-335.

Gupta et al., "Land Mobile Radio Systems—A Tutorial Exposition", IEEE Communications Magazine, vol. 23(6), Jun. 1985, pp. 34-45.
Ishio et al., "A Two-Way Wavelength-Division-Multiplexing Transmission and its Application to a Switched TV Distribution System," Electrical Communication Laboratories, Nipon Telegraph & Telephone Public Corporation, Yokosuka, Japan and Technical Bureau, Nippon Telegraph & Telephone Public Corporation, Tokyo, Japan, (10 pages) (prior to Dec. 22, 2000).
Kobb, "Personal Wireless," Special Report/Communications, IEEE Spectrum, Jun. 1993, pp. 20-25.
Lee et al., 1993 43rd IEEE Vehicular Technology Conference, May 18-20, 1993, Personal Communication—Freedom Through Wireless Technology, PacTel Corporation, published May 18, 1993, "Intelligent Microcell Applications in PCS," pp. 722-725.
Merrett et al., 41st IEEE Vehicular Technology Conference, May 19-22, 1991, Gateway to the Future Technology, 91CH2944-7, British Telecom Research Laboratories, "A Cordless Access System Using Radio-Over-Fibre Techniques," pp. 921-924.
Miicrowaves & RF, "Digital Transport for Cellular," Feb. 1993.
Microwaves & RF, Mar. 1993, "Offshore Markets Gain in Size, Competitiveness, Even the smallest industry companies are expanding their global business, despite such costly distractions as ISO 9000." (pp. 33, 34, 36-39).
O'Byrne, Vehicular Technology Society 42nd VTS Conference Frontiers of Technology, From Pioneers to the 21st Century, GTE Laboratories Incorporated, "TDMA and CDMA in a Fiber-Optic Environment," vol. 2 of 2, pp. 727-731 (May 10, 1992).
Russell, New Microcell Technology Sets Cellular Carriers Free, Telephony, Mar. 1993, pp. 40, 42 and 46.
R. Steele. Towards a High-Capacity Digital Cellular Mobile Radio System. "Towards a High Capacity Digital Cellular Mobile Radio System," IEE Proceedings, vol. 132, Pt.F, No. 5, Aug. 1985, pp. 405-415.
Tang, Fiber Optic Antenna Remoting for Multi-Sector Cellular Cell Sites. GTE Laboratories—Abstract (Conference Jun. 14-18, 1992).
Titch, "Kentrox boosts coverage and capacity," Telephony Jan. 25, 1993 (1 page).
Urban Microcell System Layout. GTE Laboratories (Conference Jun. 14-18, 1992).
Wala, 1993 43rd IEEE Vehicular Technology Conference, May 18-20, 1993, Personal Communication—Freedom Through Wireless Technology, Waseca Techonology Inc., published May 18, 1993, "A New Microcell Architecture Using Digital Optical Transport," pp. 585-588.
"ZoneMaster.TM.—Maximum Coverage For High-Capacity Locations". Decibel Multi Media MicroCELL System. 4 pages. 1993 Decibel Products. 2-83-5M.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", Jun. 1991, pp. 1171-1175, Publisher: IEEE.
City Cell, Cellular Industry The Day Group, "ADC Kentrox CityCell Field Trial Yields Another First: Simultaneous Analog and Digital Calls," (1 page).
A Two-Way Wavelength-Division-Multiplexing Transmission and its Application to a Switched TV Distribution System, Electrical Communication Laboratories, Nipon Telegraph & Telephone Public Corporation, Yokosuka, Japan and Technical Bureau, Nippon Telegraph & Telephone Public Corporation, Tokyo, Japan, Hideki Ishio, et al. (10 pages).
Microwaves & RF, Mar. 1993, "Offshore Markets Gain in Size, Competitiveness, Even the smallest industry companies are expanding their global business, despite such costly distractions as ISO 9000." (1 page).
"New Signal Transport Technology Digitizes The Cellular Band" Cellular Industry—The Day Group.
"Kentrox boosts coverage and capacity" Steven Titch, News Editor, Telephony/Jan. 25, 1993.
"New Microcell Technology Sets Cellular Carriers Free", David Russell, Telephony Mar. 1993.
"ADC Kentrox Introduces CityCell 824, A Replacement For conventional Cell Sites; Company's Original Goal Was To Improve Fiber Optic T1 Links Between Cells, MTSOs", Telocator Bulletin, Feb. 1993.
"Digital transport for cellular", Microwaves & RF, Feb. 1993.
ADC Kentrox Wireless System Group CityCell™ 824—A positioning white paper. (Mar. 1993) CITA Trade Show.
Broadband Optical Transport Digital Microcell Connection Service—Interface and Performance Specifications. A technical description of the User-Network Interface and performance specification for Amaurotic Digital Microcell Connection Service. To: Amaurotic and Vendor Community. AM TR-NIS 000117. Issue 1, Dec. 1993.
ZoneMaster—Maximum Coverage for High-Capacity Locations. Decibel Multi-MicroCell Systems (Feb. 1993).
Personal Wireless. Special Report/Communications, IEEE Spectrum (Jun. 1993).
Fiber Optic Antenna Remoting for Multi-Sector Cellular Cell Sites. Douglas D. Tang GTE Laboratories—Abstract (Conference Jun. 14-18, 1992).
A Radio System Proposal Widespread Low-Power Tetherless Communication, Donald C. Cox, IEEE, vol. 290, No. 2 (Feb. 1991), pp. 328-329.
Land Mobile Radio Systems—A Tutorial Exposition, S.C. Gupta, IEEE, vol. 23 No. 6, (Jun. 1985) pp. 34-41.
Prof. R. Steele, B.Sc., Ph.D., D.Sc., C. Eng., Sen. Mem. I.E.E.E., M.I.E.E. Towards a High Capacity Digital Cellular Mobile Radio System, IEEE Proceedings, vol. 132, Pt.F., No. 5, Aug. 1985.
ZoneMaster™—Maximum Coverage For High-Capacity Locations. Decibel Multi Media MicroCell System. Four pages. 1993 Decibel Products. 2-83-5M.
"And now a few words from your Customers . . . " Four pages. ADC Kentrox© A Subsidiary of ADC Telecommunications, Inc. Aug. 1992—4069.
New Release—First Field Trail Results Exceeds Expectations (Mar. 2, 1993).
News Release—"ADC Kentrox Introduces Innovative Wireless Network Access Solution" (Mar. 1, 1993).
41st IEEE Vehicular Technology Conference, May 19-22, 1991, Gateway to the Future Technology, 91CH2944-7, British Telecom Research Laboratories, R P Merrett, A J Cooper & I C Symington, "A Cordless Access System Using Radio-Over-Fibre Techniques," pp. 921-924.
1993 43rd IEEE Vehicular Technology Conference, May 18-20, 1993, Personal Communication—Freedom Through Wireless Technology, Waseca Technology Inc., Philip M. Wala, published May 18, 1993, "A New Microcell Architecture Using Digital Optical Transport," pp. 585-588.
1993 43rd IEEE Vehicular Technology Conference, May 18-20, 1993, Personal Communication—Freedom Through Wireless Technology, PacTel Corporation, W.C.Y. Lee, Terry Benz, Ron Rudokas, published May 18, 1993, "Intelligent Microcell Applications In PCS," pp. 722-725.
Vehicular Technology Society 42nd VTS Conference Frontiers of Technology, From Pioneers to the 21st Century, GTE Laboratories Incorporated, Vincent O'Byrne, "TDMA and CDMA in a Fiber-Optic Environment," vol. 2 of 2, pp. 727-731. (May 10, 1992).

* cited by examiner

*Prior Art Cable System*

*AM Modulator*

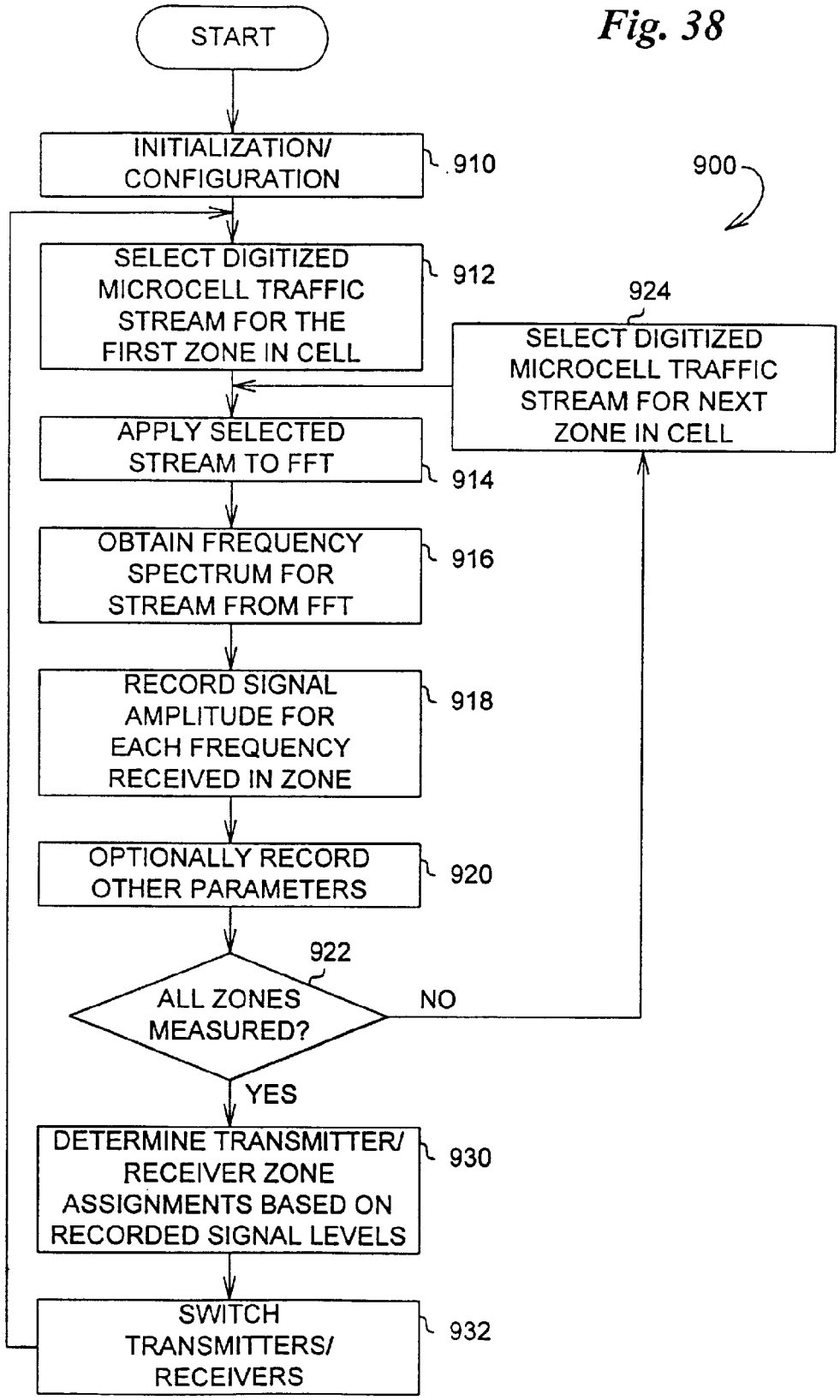
Fig. 38
START
INITIALIZATION/ CONFIGURATION
910
900
SELECT DIGITIZED MICROCELL TRAFFIC STREAM FOR THE FIRST ZONE IN CELL
912
924
SELECT DIGITIZED MICROCELL TRAFFIC STREAM FOR NEXT ZONE IN CELL
APPLY SELECTED STREAM TO FFT
914
OBTAIN FREQUENCY SPECTRUM FOR STREAM FROM FFT
916
RECORD SIGNAL AMPLITUDE FOR EACH FREQUENCY RECEIVED IN ZONE
918
OPTIONALLY RECORD OTHER PARAMETERS
920
922
ALL ZONES MEASURED?
NO
YES
DETERMINE TRANSMITTER/ RECEIVER ZONE ASSIGNMENTS BASED ON RECORDED SIGNAL LEVELS
930
SWITCH TRANSMITTERS/ RECEIVERS
932

CELLULAR COMMUNICATIONS SYSTEM WITH SECTORIZATION

Matter enclosed in heavy brackets [ ] appears in the original patent but forms no part of this reissue specification; matter printed in italics indicates the additions made by reissue.

This *Reissue Application is a continuation of Reissue application Ser. No. 09/747,273, filed Dec. 22, 2000, now U.S. Pat. No. Re. 40,564 which is a reissue of application Ser. No. 08/299,159, filed Aug. 31, 1994, (U.S. Pat. No. 5,852, 651), which* is a division of application Ser. No. 08/204,660, filed Mar. 2, 1994, *now* U.S. Pat. No. 5,627,879, which is a continuation-in-part of U.S. application Ser. No. 08/183,221, filed Jan. 14, 1994, now abandoned, which is a continuation-in-part of U.S. application Ser. No. 08/068,389, filed May 28, 1993, now abandoned, which is a continuation-in-part of U.S. [application] *applications* Ser. Nos. 07/946,402, 07/946,964, 07/946,931, and 07/946,548, all filed Sep. 17, 1992, all of which are now abandoned. *More than one reissue application has been filed for U.S. Pat. No. 5,852,651. Specifically, Reissue application Ser. No. 09/747,273 was filed Dec. 22, 2000 and the present application is a continuation thereof.*

FIELD OF THE INVENTION

This invention relates generally to high capacity mobile communications systems, and more particularly to a digital microcellular communication system.

BACKGROUND

A conventional cellular phone system 5 is shown in FIG. 1A. Such systems are currently in widespread use in the United States. As illustrated in FIG. 1A, system 5 has a fixed number of channel sets distributed among the base stations 12, 13 serving a plurality of cells 11, 16 arranged in a predetermined reusable pattern. Typical cell areas range from 1 to 300 square miles. The larger cells typically cover rural areas and smaller cells cover urban areas. Cell antenna sites utilizing the same channel sets are spaced by a sufficient distance to assure that co-channel interference is held to an acceptably low level.

A mobile unit 10 in a cell 11 has radio telephone transceiver equipment which communicates with similar equipment in base station sites 12, 13 as the unit moves from cell to cell. Each base station 12, 13 relays telephone signals between mobile units 10 and a mobile telecommunications switching office (MTSO) 17 by way of communication lines 18. The lines 18 between a cell site and the MTSO 17, typically T1 lines, carry separate voice grade circuits for each radio channel equipped at the cell site, and data circuits for switching and other control functions. The MTSO 17 is also connected through paths 19 to a switched telephone network 15 including fixed subscriber telephone stations as well as various telephone switching offices.

MTSO 17 in FIG. 1A includes a switching network for establishing call connections between the public switched telephone network 15 and mobile units 10 located in cell sites 11, 16, and for switching call connections from one cell site to another. In addition, the MTSO 17 includes a dual access feeder for use in switching a call connection from one cell site to another. Various handoff criteria are known in the art and utilize features such as phase ranging to indicate the distance of a mobile unit from a receiving cell site, triangulation, and received signal strength to indicate the potential desirability of a handoff. Also included in the MTSO 17 is a central processing unit for processing data received from the cell sites and supervisory signals obtained from the network 15 to control the operation of setting up and taking down call connections.

A conventional base station 12 is illustrated in FIG. 1B. A radio controller unit 22 provides the interface between the T1 lines from the MTSO and the base station radio equipment. Transmitters 23, one for each channel serviced by the base station, are driven by circuit 22, which supplies each transmitter with an analog voice signal. Next, the signals are passed to a separate nonlinear power amplifier for each channel, or the signals may be combined and applied to a single linear power amplifier 24 as shown in FIG. 1B. The output of power amplifier 24 is applied through duplexer 25 to antenna 26, to be broadcast into the cellular area serviced by the base station.

Signals received in antenna 26 are applied through duplexer 25 to filter 27. Filter 27 isolates the entire cellular band signal from adjacent bands and applies it to receivers 28, one for each channel. The analog voice signal outputs of receivers 28 are applied to circuit 22. Base station 20 may optionally include a diversity antenna 26' and corresponding diversity filter 27' and a plurality of diversity receivers 28', one for each associated main receiver 28. Where implemented, the outputs of diversity receivers 28' are applied to circuit 22, which would thus include circuitry for selecting the strongest signal as between corresponding receivers 28 and 28' using known techniques.

In densely populated urban areas, the capacity of a conventional system 5 is severely limited by the relatively small number of channels available in each cell 11, 16. Moreover, the coverage of urban cellular phone systems is limited by blockage, attenuation and shadowing of the RF signals by high rises and other structures. This can also be a problem with respect to suburban office buildings and complexes.

To increase capacity and coverage, a cell area can be subdivided and assigned frequencies reused in closer proximities at lower power levels. Subdivision can be accomplished by dividing the geographic territory of a cell, or for example by assigning cells to buildings or floors within a building. While such "microcell" systems are a viable solution to capacity and coverage problems, it can be difficult to find space at a reasonable cost to install conventional base station equipment in each microcell, especially in densely populated urban areas. Furthermore, maintaining a large number of base stations spread throughout a densely populated urban area can be time consuming and uneconomical.

AT&T has proposed a system to solve the problem of coverage in urban areas without having to deploy a large number of conventional base stations. The system is shown and described with respect to FIG. 1 of AT&T's European Patent Application No. 0 391 597, published on Oct. 10, 1990. In that system a grid of antennas sites 40 is placed throughout the microcellular system. An optical fiber network 42 interconnects the antennas with the base station 44. Optical wavelength carriers are analog modulated with RF mobile radio channels for transmission through the optical fiber network 26 to the antennas sites 22. A detector circuit 27 is provided for each antenna site 22 to receive the modulated carrier and reconstruct an RF signal to be applied to the antenna sites 22, for transmission into the microcell area 21. RF signals received at antenna sites 22 from mobile units are likewise modulated onto a fiber and transmitted back through optical fiber network 26 to base station 25. All of the channels transmitted from base station 25 are distributed to all antenna sites 22. Also, all the channels transmitted from the base station 25 can be received from the mobile units in any microcell 21 and transmitted via optical fiber to base station 25.

The above-described AT&T system has certain limitations. The ability to analog modulate and demodulate light, the limitations imposed by line reflections, and path loss on the fiber all introduce significant distortion and errors into an analog modulated signal and therefore limit the dynamic range of the signals which can be effectively carried via an analog system, especially in the uplink direction. These factors limit the distance from the base station to the antenna sites.

Moreover, in AM systems an out-of-band signal is required to transmit control and alarm information to and from the antenna sites, again adding to the expense of the modulation and demodulation equipment. Moreover, provision of other services such as paging systems, personal communications networks (PCN's) or mobile data services are not easily added to analog AM systems such as that shown in AT&T's European application.

Furthermore, the AT&T system teaches the use of dedicated fiber lines installed for each remote antenna site. It would be desirable if preexisting transmission lines or fiber paths could be utilized so that installation of new fibers could be avoided.

Another approach to increasing coverage is disclosed in U.S. Pat. No. 4,932,049 to Lee. The Lee patent describes a "passive handoff" system wherein a cell is subdivided into several zones, with a directional antenna oriented to cover each zone. All the antenna's in the cell are serviced by the same set of transmitters and receivers. A zone switch is used to selectively connect the transmitters and receivers to the antenna units. In operation, the antenna best able to service a mobile unit on a given channel is connected to the transmitter/receiver pair assigned to the mobile unit by the MTSO, and the other antennas disconnected from that transmitter/receiver pair. To control the switching of transmitters and receivers to the antennas, a scanning receiver continuously polls the strength of signals received at the antenna units on all active channels in the cell. The zone having the best receiver signal strength is selected as the active zone for the associated channel. The system disclosed in the Lee patent thus allows for improving communications with mobile units while at the same time reducing interference with other cells by directionalizing and limiting overall signal strength in a cell.

SUMMARY OF THE INVENTION

The present invention provides improved coverage and increased capacity by assignment of reusable channel sets throughout the microcell system, without the need to deploy independent, conventional base stations in each microcell area. It also provides good dynamic range over extended distances as compared to analog systems such as the AT&T system described above.

According to one exemplary embodiment of the present invention, there is provided a microcell system wherein a plurality of commonly located microcell base station units communicate with a corresponding plurality of microcell antenna units deployed in respective microcell areas. Each base station unit includes conventional RF base station transmitter and receiver pairs, one for each channel assigned to the microcell. Additional receivers are also provided to receive diversity channels. The RF signal outputs from the transmitters are combined and applied to a broadband analog-to-digital converter. The digitized signal is transmitted over optical fiber to a microcell unit. Each microcell unit receives a digitized RF signal and reconstructs the analog RF signal using a digital-to-analog converter. The reconstructed RF signal is applied to a power amplifier, the output of which is fed to an antenna for broadcast into the microcell area.

The antenna units include both a main and a diversity antenna. The antennas each independently receive RF signals from the mobile units. The RF signal from the main antenna is filtered through a first set of filters, one for each channel assigned to the microcell, and the combined filtered main signal applied to an analog-to-digital converter. A second set of filters receives the diversity signal from the diversity antenna. The diversity signal is also applied to an analog-to-digital converter. The digitized main signal and diversity signal are multiplexed and transmitted over the optical fiber back to the microcell base station. The base station in turn includes a pair of digital-to-analog converters which reconstruct the main and diversity analog RF signals for application to the receivers. The strongest signal is selected for use in accordance with conventional diversity technology. Conventional circuitry interfaces the transmitters and receivers to the MTSO.

Thus, the exemplary embodiment outlined above contemplates that the microcell base station/antenna unit pairs are arranged to provide a reusable pattern of channels (as in conventional cellular technology) in the microcell system. The microcell base station units do not normally include an antenna, and can be located in a convenient and preferably low cost location, which may be outside of the microcell system territory if desired.

According to another exemplary embodiment, the invention may be deployed to extend the coverage in a conventional cell. In this embodiment, the base station may include an antenna for transmission and reception of analog RF directly from the transmitters and receivers, while at the same time transmitting and receiving from a microcell antenna unit using the digital carrier over a fiber as described with respect to the first exemplary embodiment.

According to another exemplary embodiment of the invention, the digitized microcell traffic is carried in a frame format to and from the antenna units. Each frame includes a plurality of bits assigned to carry a sample of the digitized microcell traffic, with other bits employed for control and monitoring of equipment, error detection and correction, and end-to-end point-to-point voice traffic between the base station and the antenna unit. Alternate services such as personal communications network traffic, paging services and mobile data services may also be carried using the framing format.

According to yet another exemplary embodiment of the invention, the fiber carrier may be replaced with cable or other carrier medium.

According to still anther exemplary embodiment, the invention can be deployed to distribute a single set of channels to a plurality of micro cell areas. In this embodiment, a single base station unit sends the same set of digitized channels to a plurality of microcell antenna units, which in turn return the same set of channel signals to the microcell base station.

Therefore, the invention eliminates the problems associated with analog AM (or FM) systems, such as that illustrated in the above-mentioned AT&T application, by using a digital transport resulting in better signal quality and for greater range between a base station and a microcell antenna unit. As employed in one exemplary embodiment, the invention greatly increases system capacity over existing mobile telephone systems without the requirement of deploying conventional base station equipment in each microcell area, and allows for provision of alternative services such as paging systems, mobile data services or personal communication networks. The present invention also improves the dynamic range of the signal and extends the distance signals may be reliably transported from the base stations to the antenna units. In another exemplary embodiment, the invention provides readily for the transmission of control and monitoring information to and from the microcell antenna unit.

To provide additional advantages, an exemplary all-digital embodiment of a microcell system is also provided wherein a plurality of commonly located digital microcell base station units communicate with a corresponding plurality of microcell antenna units deployed in respective microcell areas. According to this all digital embodiment, the base stations are fully digital and synthesize a digital signal directly from the T1 carrier received from the MTSO. The digital signal is transmitted over optical fiber to the microcell units. The microcell units receive the digital signal, and construct an analog RF signal using a digital-to-analog converter. The RF signal is applied to a power amplifier, the output of which is fed to an antenna for broadcast into the microcell area. The antenna units receive RF signals from the mobile units. The RF signal is filtered through a set of filters, one for each channel assigned to the microcell, and the filtered signal applied to an analog-to-digital converter. The digitized signal is transmitted over the optical fiber back to the digital microcell base station. The base station in turn directly synthesizes the digital signal onto the T1 carrier back to the MTSO. Conventional circuitry interfaces the transmitters and receivers to the MTSO. Thus, this exemplary embodiment contemplates that the microcell base station units are fully digital and eliminate the need for RF equipment at the base station as well as for analog-to-digital and digital-to-analog converters, thus providing the opportunity to reduce both the cost and volume of equipment required at the base station site, and to reduce maintenance needs on inherently less reliable analog equipment. The digital microcell base station units can be located in a convenient and preferably low cost location, which may be outside of the microcell system territory if desired.

A method which allows for the rapid deployment of a system of the type using analog-type base stations while permitting the easy upgrade of such base stations to all digital technology is also provided. The method's first stage calls for deploying a plurality of microcell base station units as described above, each including conventional RF base station transmitters and receivers, one for each channel assigned to the microcell.

In the second stage of deployment, the analog base stations are replaced with all-digital base stations wherein the base stations are fully digital and synthesize a digital signal directly from the T1 carrier received from the MTSO. The digital signal is transmitted over optical fiber to the microcell antenna units installed in the first stage of deployment. The microcell antenna units receive the digital signal, and construct an analog RF signal using a digital-to-analog converter. The RF signal is applied to a power amplifier, the output of which is fed to an antenna for broadcast into the microcell area. The antenna units also receive RF signals from the mobile units. The RF signal is filtered through a set of filters, one for each channel assigned to the microcell, and the filtered signal applied to an analog-to-digital converter. The digitized signal is transmitted over the optical fiber back to the digital microcell base station. The base station in turn directly synthesizes the digital signal onto the T1 carrier back to the MTSO.

Thus, the exemplary embodiment outlined above contemplates that the antenna units installed in the first stage do not need alteration or replacement when the analog microcell base station units are replaced with all digital microcell base stations. The method thus allows the full benefit of the all-digital base station to be accomplished without the expense of modifying existing installed microcell antenna units.

According to yet another alternate, exemplary embodiment, the digitized RF signal, carrying either microcell or PCN traffic, is framed for transmission over a switched telephone network. In this embodiment, a limited number of digitized microcell or PCN channels are grouped together, in a standard framing format for transmission using a standard DS-3, OC-1, or other protocol.

In yet another alternate, exemplary embodiment, digitized microcell or PCN RF signals are transmitted over the installed fiber infrastructure of a cable system from the head end to the optical nodes, in an amplified modulated (AM) format.

A still further exemplary embodiment contemplates the transmission of the microcell or PCN traffic in digital form over the cable system feeder lines, using QAM modulation or other digital modulation formats.

Thus, according to these embodiments, microcell or PCN channels may be transmitted over an established switched network or using established cable system infrastructure.

According to still another embodiment of the invention, there is provided a passive handoff system using digital signal analysis to rapidly switch transmitters and receivers among different antenna units in different microcell zones of a cell.

According to yet still another embodiment of the invention, there is provided decimation filters for digitally filtering out a selected number of channels from the digital stream output from the analog-to-digital converter, and multiplexing the selected channels onto one or more lower speed carriers, such as a T1 line or SONET carrier.

According to yet still another embodiment of the invention, a passive switching method is described for use in a cellular phone system having a plurality of macrocells including a first macrocell, each macrocell sharing a common set of channels, the method comprising the steps of providing a plurality of primary and secondary microcell antenna units; dividing the first macrocell into a plurality of primary microcells, wherein the step of dividing includes placing the primary microcell antenna units so as to provide coverage over the first macrocell; providing a plurality of secondary microcell antenna units; placing the secondary microcell antenna units to provide macrocell coverage overlapping the primary microcells; at a base station, generating a digitized representation of a telephone signal received from a mobile telephone switching office, selecting a microcell from said plurality of primary and secondary microcells and transmitting the digitized representation to the microcell antenna unit of the selected microcell; receiving, at the selected microcell, the digitized representation, generating a corresponding RF signal by digital-to-analog conversion, and broadcasting the RF signal in the selected microcell; receiving RF signals in each of the plurality of primary and secondary microcells for the set of channels, and converting the RF signals received to corresponding digitized RF signal representations for transmission back to the base station; at the base receiving the digitized RF signal representations from the primary and secondary microcells; and monitoring the digitized RF signal representations from each of the primary and secondary microcells and based on the energy level of each channel in each zone, selectively controlling the channels broadcast into each of the primary and secondary microcells and selectively choosing the microcell from the plurality of primary and secondary microcell in which a received channel is received so that passive switching may be accomplished.

According to yet still another embodiment of the invention, a method of sectorizing coverage over a particular cellular communications area is described, the method comprising the steps of providing a remote unit having a plurality of microcell antenna units, including a first and a second microcell antenna unit, wherein each microcell antenna unit comprises an antenna configured to cover a particular sector and a channel filter unit used to filter channels assigned to the particular sector; connecting the remote unit to a sectorized base station unit, wherein the step of connecting comprises providing a unique sector frequency associated with each antenna unit sector; connecting the sectorized base station unit to a mobile telecommunications switching office; generating, at the sectorized base station unit, a digitized representation of a telephone signal received from the mobile telephone switching office; transmitting the digitized representation to the microcell antenna unit for a particular sector; receiving, at the first microcell antenna unit, a first RF signal, digitizing the first RF signal and converting the digitized first RF signal to a first sector frequency; receiving, at the second microcell antenna unit, a second RF signal, digitizing the second RF signal and converting the digitized second RF signal to a second sector frequency; and multiplexing the digitized first RF signal at the first sector frequency and the digitized second RF signal at the second sector frequency and transmitting the multiplexed signal to the sectorized base station.

BRIEF DESCRIPTION OF THE DRAWINGS

A more complete understanding of the invention and its various features, objects and advantages may be obtained from a consideration of the following detailed description, the appended claims, and the attached drawings in which:

FIG. 38 is a simplified block diagram of the operation of controller 810 of the system of FIG. 35A;

DETAILED DESCRIPTION OF THE PREFERRED EMBODIMENTS

In the following detailed description of exemplary embodiments of the invention, reference is made to the accompanying drawings which form a part hereof, in which like numerals refer to like elements throughout the several views, and which is shown by way of illustration only, specific embodiments in which the invention may be practiced. It is to be understood that other embodiments may be utilized and structural changes may be made without departing from the scope of the present invention.

Figure 2:
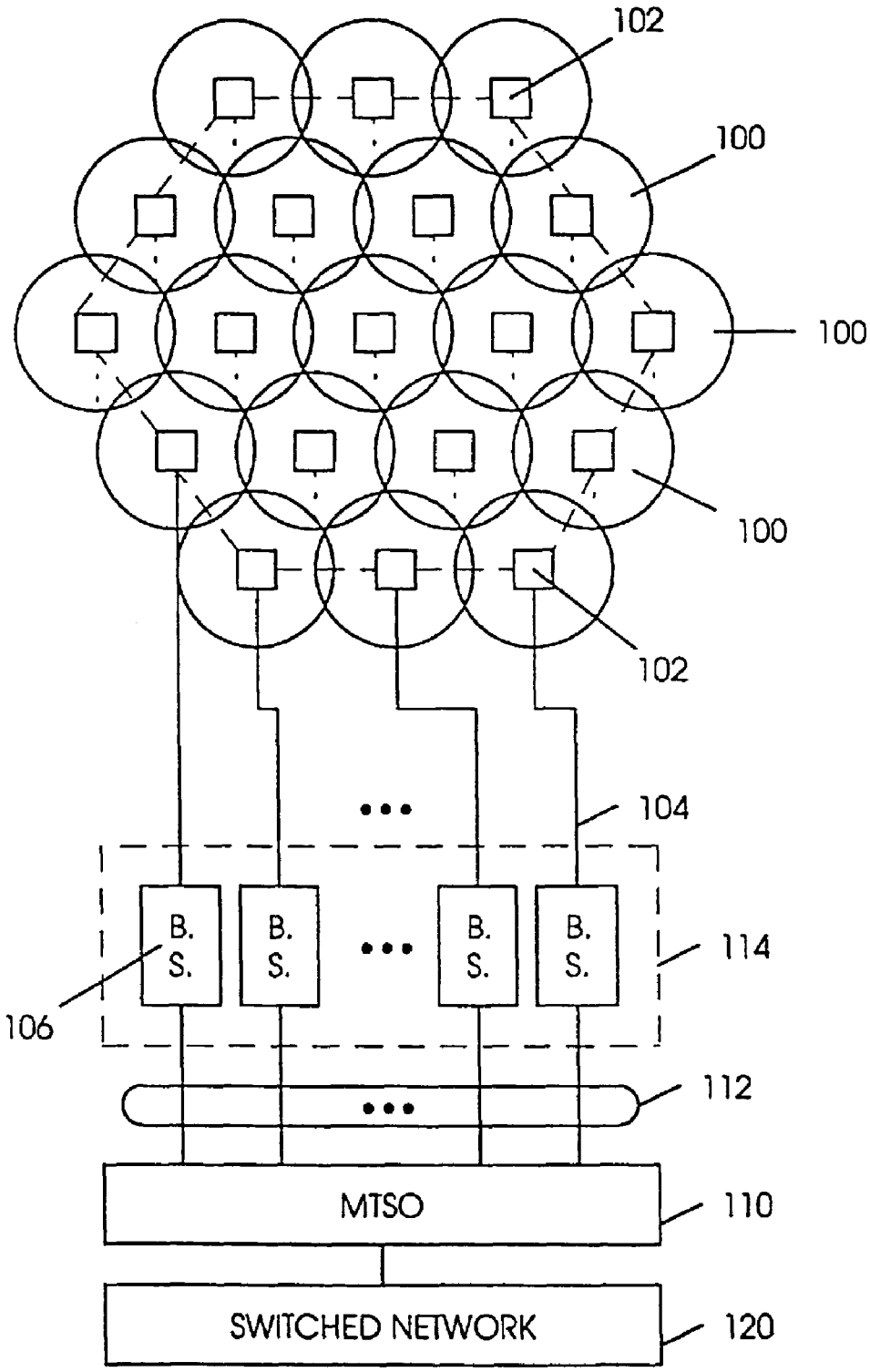
FIG. 2 is a simplified block diagram of an exemplary embodiment of the microcell communications system of the present invention.

The general configuration of one exemplary embodiment of the present invention is shown in FIG. 2. The microcell system includes a plurality of microcell areas 100. Deployed within each microcell area 100 is a microcell remote antenna unit 102. Such units may be deployed on the roof of a building or within a building, or on or in other structures. For example, a microcell antenna unit 102 may be deployed on each floor of a building on or adjacent an antenna tower, or along a highway corridor.

Remote antenna units 102 are connected through fiber 104 (or optionally another high bandwidth carrier) to respective base station units 106. Base station units 106 are interfaced to MTSO 110 over T1 lines 112. MTSO 110 is interfaced with a switched telephone network 120, as in a conventional cellular phone system. Microcell base station units 106 are preferably located in a single location 114. Such location may be inside or outside of the area serviced by the microcell system, but in any event is preferably conveniently located for maintenance purposes.

Figure 3:
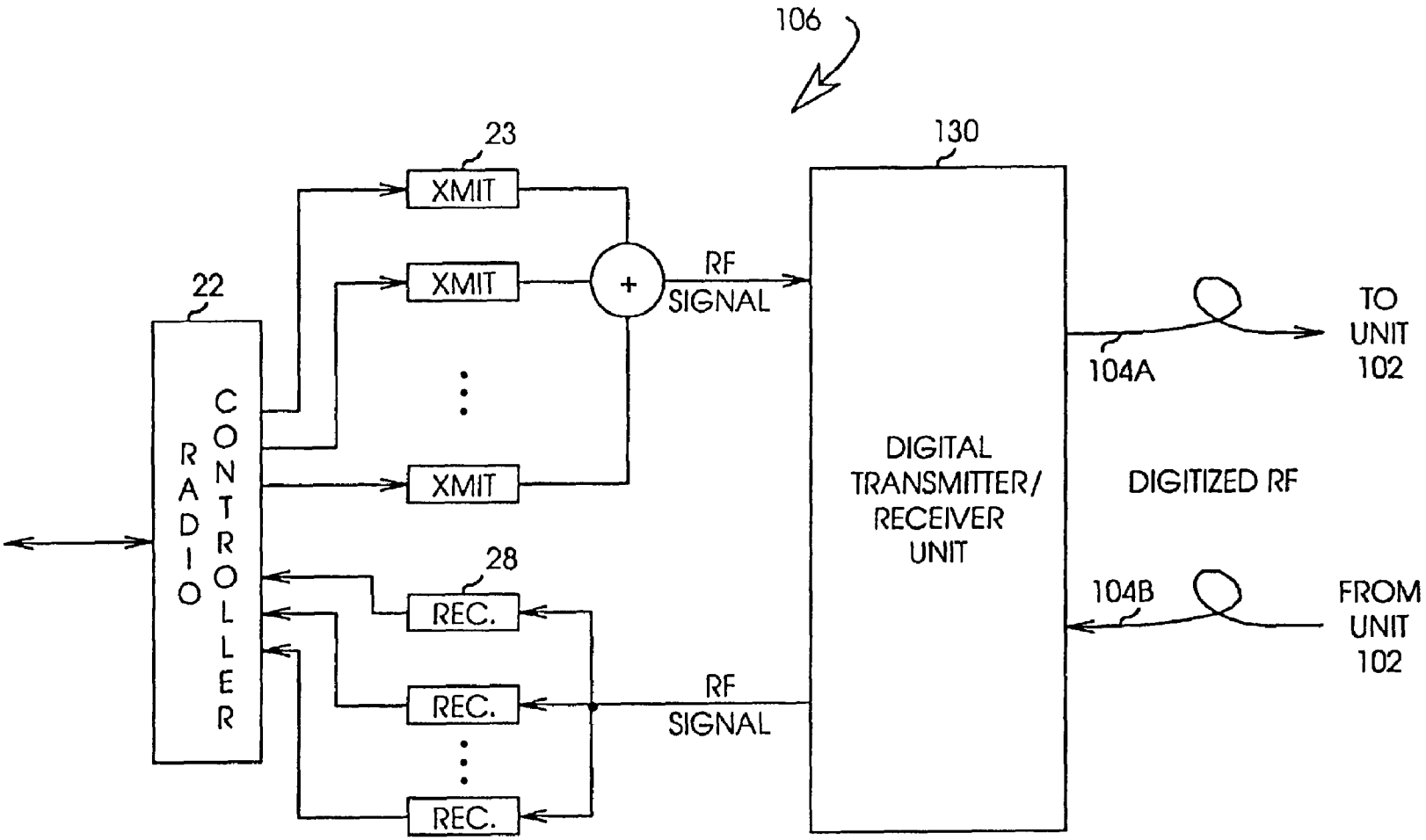
FIG. 3 is a more detailed block diagram of the base station embodiment shown in FIG. 2.

Referring now to FIG. 3 there is shown a simplified diagram of a microcell base station 106 according to one exemplary embodiment of the present invention. Base station 106 includes conventional transmitters and receivers 23 and 28, respectively, and conventional radio controller or interface circuitry 22 to the MTSO 110. A digital transmitter/receiver unit 130 receives the combined RF signal from transmitters 23, digitizes the combined signal and transmits it in digital format over fiber 104A connected to a remote antenna unit 102. Unit 130 also receives a digitized RF signal over fiber 104B from a remote antenna unit 102, reconstructs the corresponding analog RF signal, and applies it to receivers 28. Accordingly, conventional equipment may be used on the downstream (MTSO) side of digital transmitting/receiving unit 130.

Figure 4:
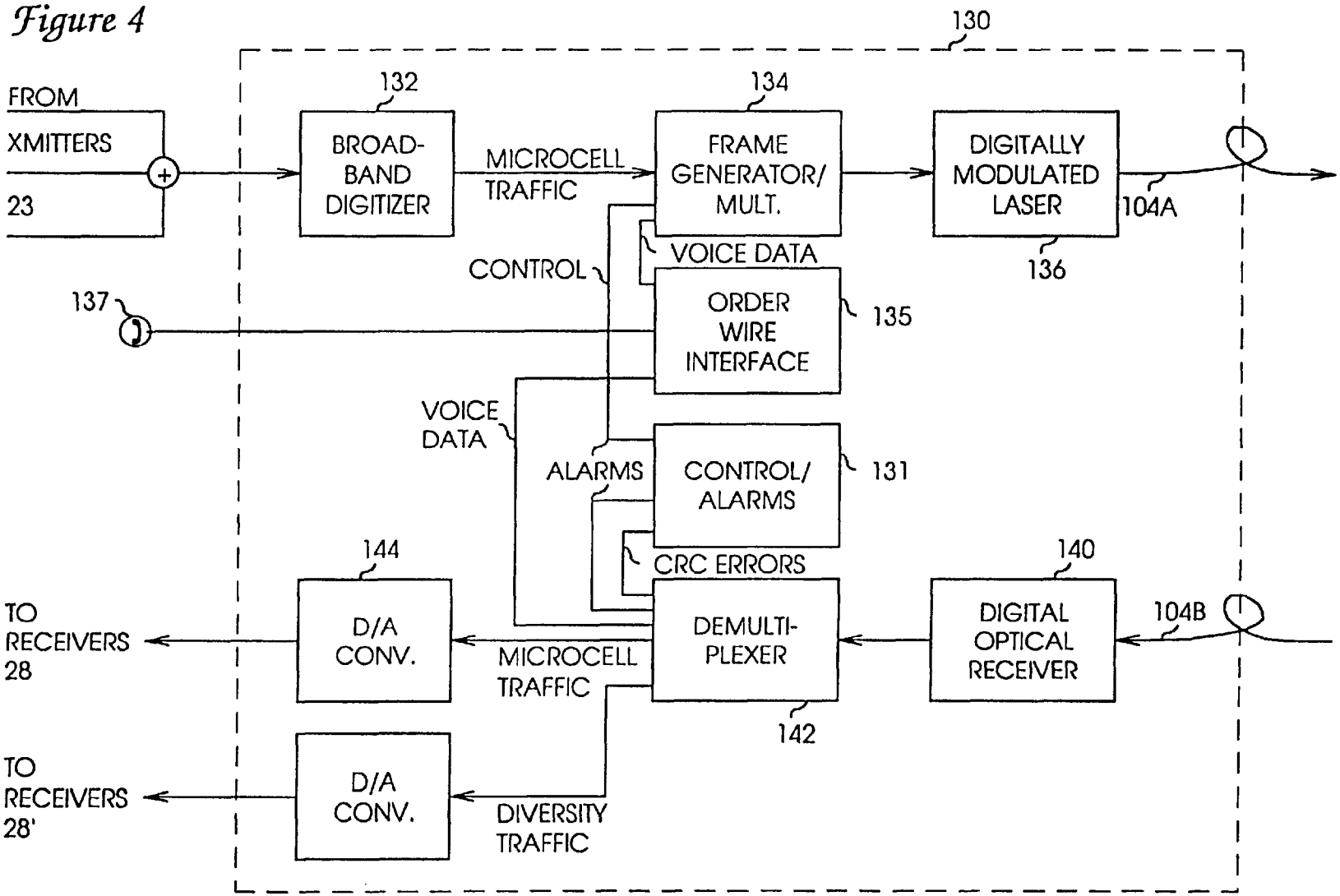
FIG. 4 is a more detailed block diagram of the base station shown in FIG. 3.

Referring now to FIG. 4, there is shown digital transmitting/receiving unit 130 in greater detail. Unit 130 includes a broadband digitizer 132 receiving the combined RF signal from transmitters 23. Digitizer 132 provides a digitized microcell traffic stream, consisting of a series of samples of the incoming analog RF signal. Frame generator/multiplexer 134 frames the digitized microcell traffic data, together with control, voice and error checking data, and applies it to a digitally modulated laser 136. The voice data channel, also termed the order wire channel, originates from order wire interface 135, which has an input for a handset 137 or a two-wire phone line. Order wire interface 135 provides for two-way point-to-point voice grade communications. Typically a handset is used at the remote site to connect with a handset at the base site. Control signals originate from control/alarm circuit 131, which generates control information for the remote antenna unit 102 to monitor error and alarm information.

The laser signal from digitally modulated laser 136 is applied to fiber 104A for transmission to the corresponding remote antenna unit 102. According to one possible embodiment, digitizer 132 preferably provides a 24 bit wide word (parallel structure sample) running at 30.72 MegaSamples/second (MSamples/s). The frame generator/multiplexer 134 converts the 30.72 MSamples/s word to a single serial bit stream running at 819.2 MegaBits/second (Mb/s).

The digitizer 132 conditions the broadband RF signal by providing bandpass filtering sufficient to eliminate out of band signals, and sufficient gain adjustment to prevent overloading of the analog-to-digital converter. The analog-to-digital converter converts the conditioned broadband RF signal into a parallel bit stream, either by direct sampling at RF, or by sampling following down-conversion to baseband or to an intermediate frequency band. In the preferred embodiment, the digitizer is obtained from Steinbrecher Corporation of Woburn, Mass., with sampling performed on a 12.5 MHz wide signal down-converted to either the first or second Nyquist zone, with 12 bit sampling occurring at a rate of 30.72 MSamples/s.

Unit 130 further includes a digital optical receiver 140. Receiver 140 outputs an electronic digital signal, which is applied to demultiplexer 142, which extracts the digitized microcell traffic data generated at the remote antenna unit 102, as will be explained further below. Demultiplexer 142 further extracts alarm (monitoring) and voice information framed with the microcell traffic data. The digitized microcell traffic signal is applied to digital-to-analog converter 144, which reconstructs the analog RF signal, to be applied to receivers 28.

The digital-to-analog converter 144 operates on the microcell traffic parallel bit stream extracted by demultiplexer 142, reconstructing a baseband replica of the broadband RF signal digitized by digitizer 132. The baseband replica is then up-converted to its original radio frequency by mixing with a local oscillator and filtering to remove image frequencies. In the preferred embodiment, the digital-to-analog converter is obtained from Steinbrecher Corporation of Woburn, Mass., and operates at the preferred sample rate of 30.72 MSamples/s.

Figure 8:
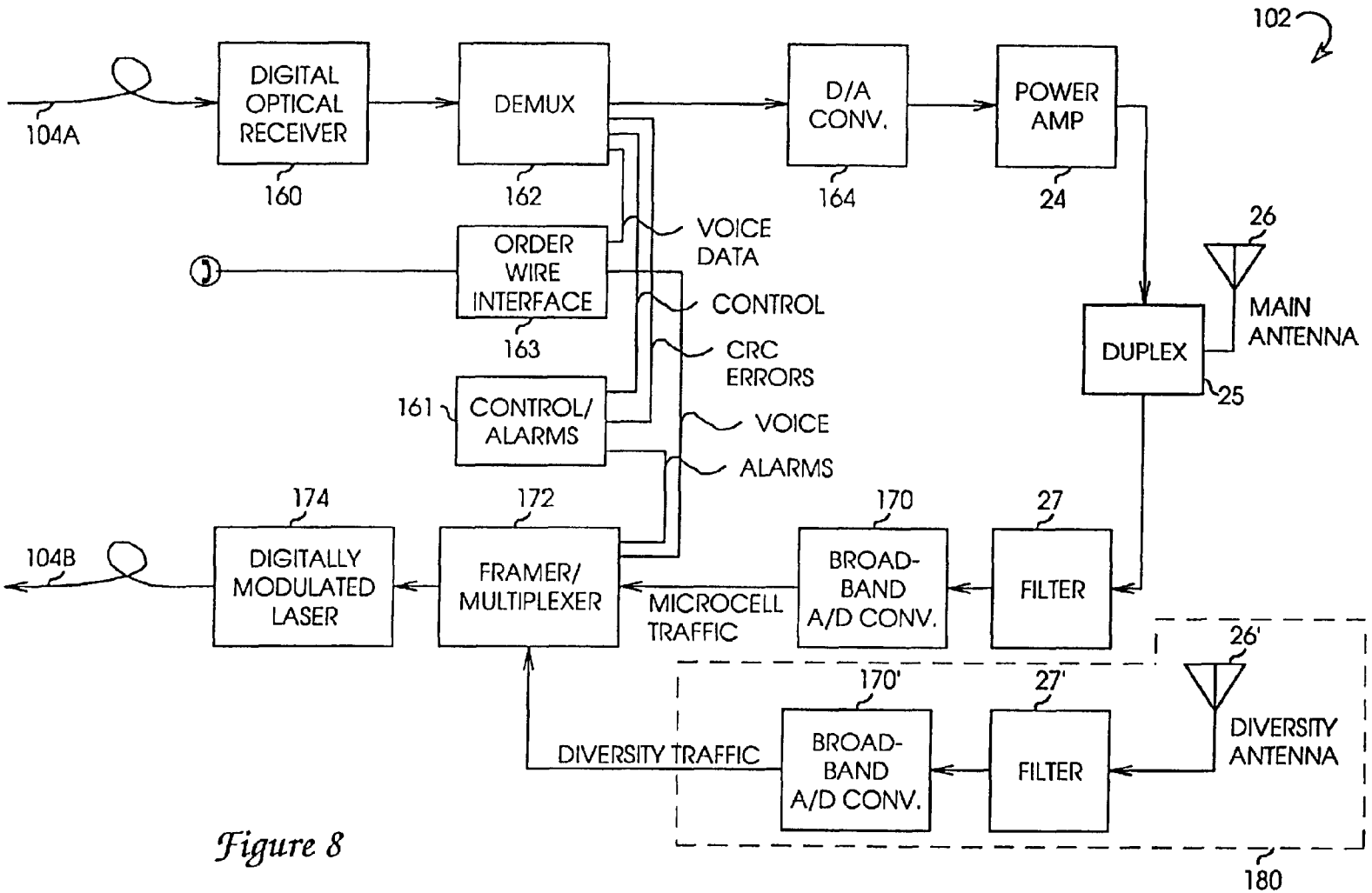
FIG. 8 is a functional block diagram of a microcell antenna unit according to the exemplary embodiment shown in FIG. 2.
Figure 21A:
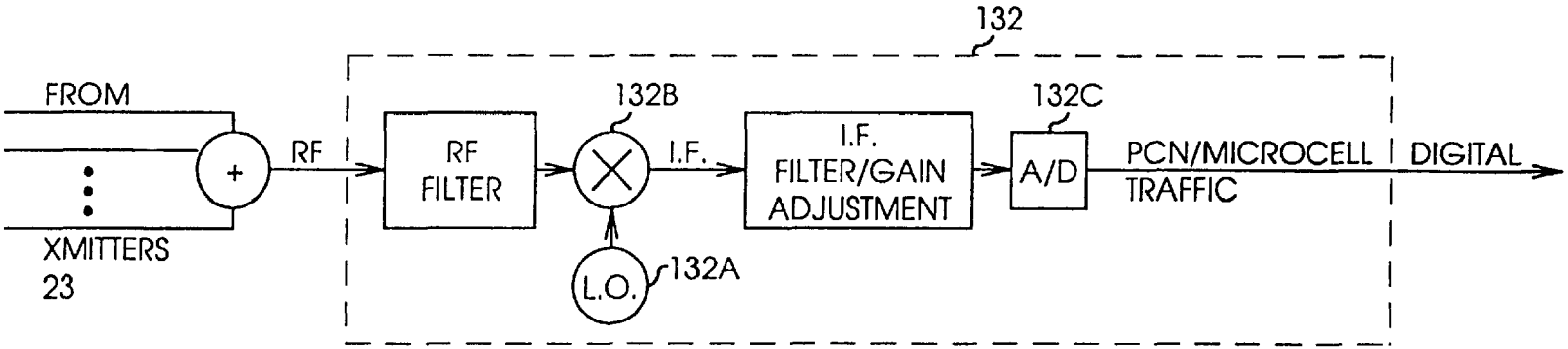
FIG. 21A is a more detailed block diagram of analog-to-digital converter 132, as used throughout the various embodiments in the invention.

Referring now to FIG. 21A, there is illustrated in more detail the broadband digitizer or analog-to-digital converter circuit 132 in FIGS. 4 and 170 in FIG. 8. Analog-to-digital converter circuit 132 preferably includes a local oscillator 132A, which applies its output to mixer 132B, which receives the combined output from the transmitters 23. Mixer 132B reduces the high frequency microcell signal (approximately 850 MHz in the case of conventional cellular phone service or approximately 1.8 GHz in the case of PCN traffic), to an intermediate (or baseband) frequency of approximately 1 to 15 MHz (such that the 12.5 MHz frequency fits between these limits) prior to application to analog-to-digital converter 132C.

Figure 21B:
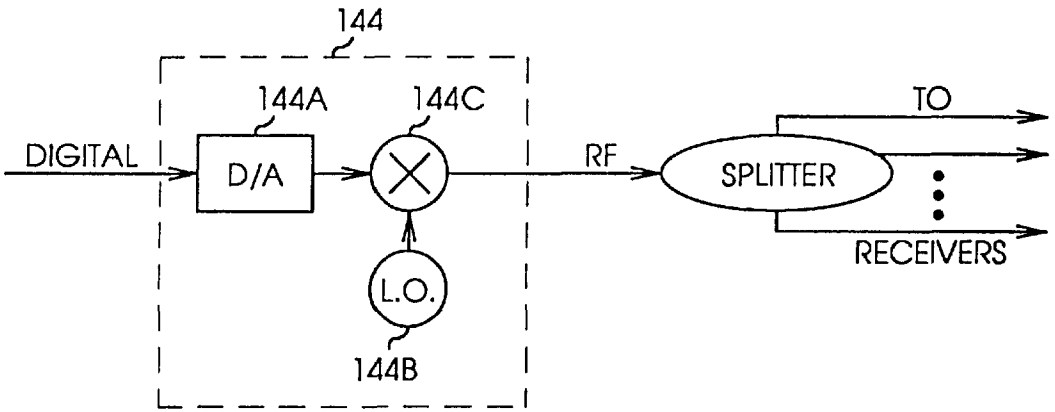
FIG. 21B is a more detailed block diagram of digital-to-analog converter 144 as used throughout the various embodiments of the invention.

Illustrated in FIG. 21B is the digital-to-analog converter 144 and 164, of FIGS. 4 and 8, respectively, which performs the reverse operation of analog-to-digital converters 132 and 170. Digital-to-analog converter 144 includes a digital-to-analog converter 144A, which outputs an intermediate frequency signal, which is up-converted with mixer 144B, using the local oscillator 144C. Up-conversion restores the operating frequency of the RF to the broadcast frequencies of the cellular or PCN systems.

Figure 5:
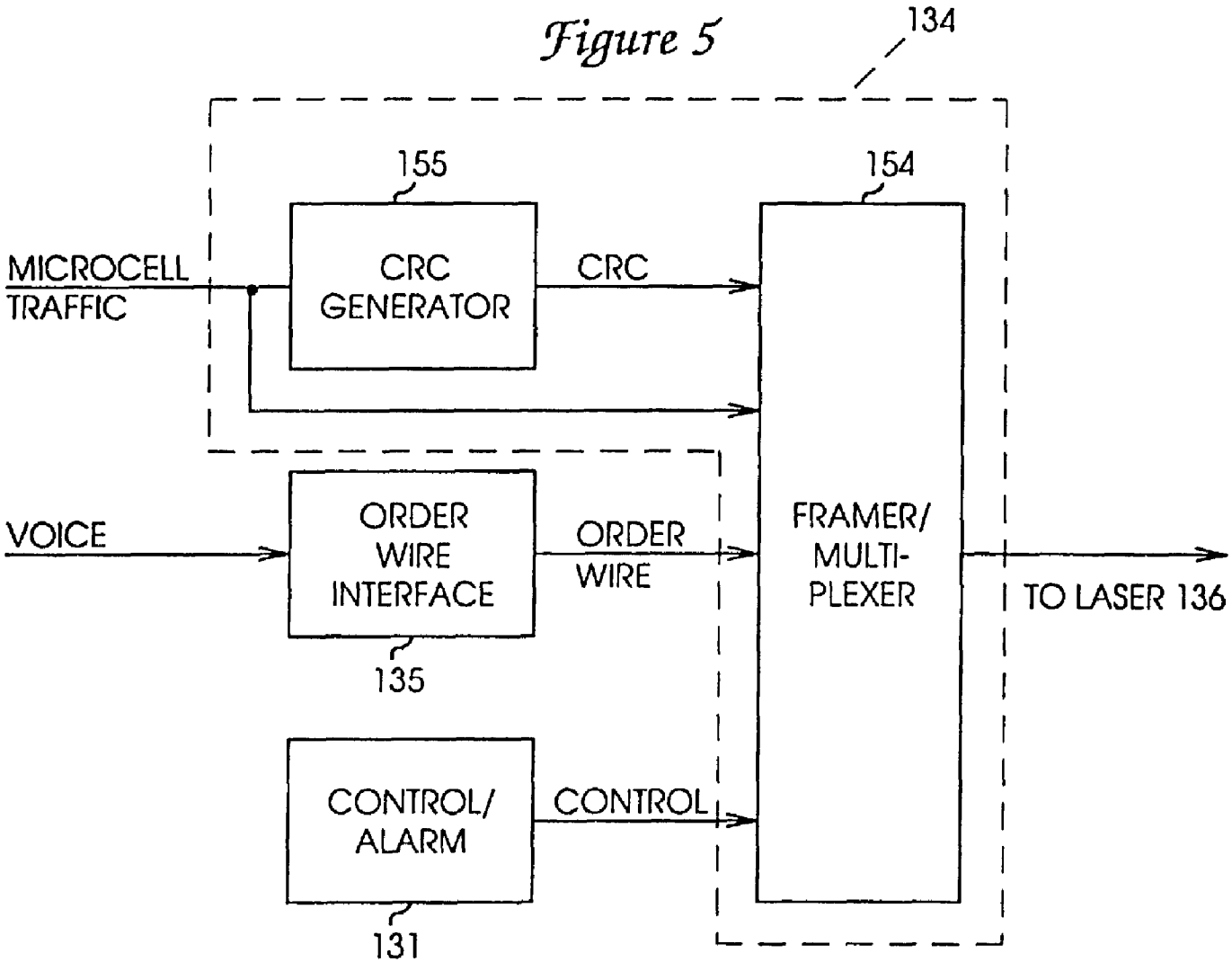
FIG. 5 is a more detailed block diagram of the frame generator/multiplexer 134 shown in FIG. 4.

Referring now to FIG. 5, there is shown in greater detail the frame generator/multiplexer circuit 134 according to the exemplary embodiment of the invention shown in FIG. 4. Circuit 134 includes a cyclic redundancy check (CRC) generator 155, which receives microcell traffic data from digitizer 132 and outputs a CRC code.

Figure 6:
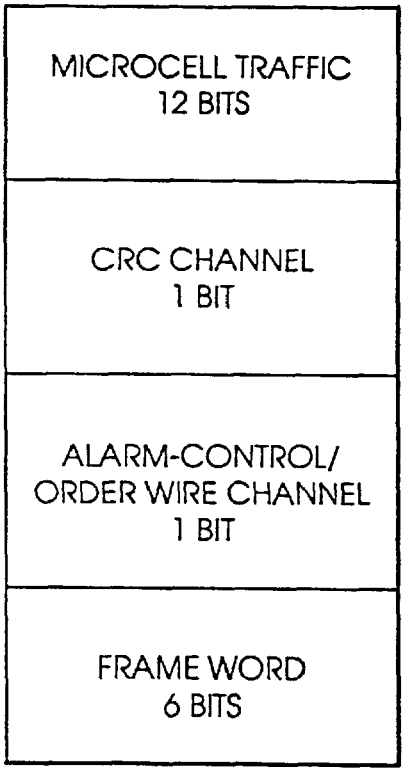
FIG. 6 is a simplified diagram of the structure of one exemplary data frame.

According to one exemplary embodiment, framer/multiplexer 154 multiplexes the CRC channel, microcell traffic, order wire (voice) channel and control (alarm) channel into the frame structure illustrated in FIG. 6. Each frame includes a 12-bit microcell traffic word, a one bit CRC channel, a one bit control-alarm/order wire channel and a six bit framing word. The control-alarm and order wire data are multiplexed together in a single channel.

Figure 7:
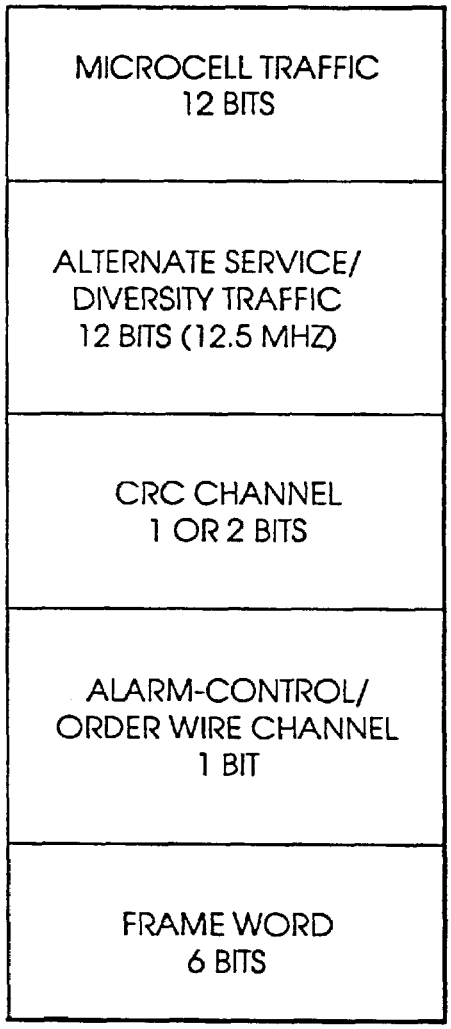
FIG. 7 is a diagram of the structure of another exemplary data frame.

FIG. 7 shows an alternate frame structure having 12 bits for the main antenna channel, 12 bits for 12.5 MHz coverage of alternate service or diversity channel, a one or two bit CRC channel, 1 bit control-alarm channel and 6 bit frame word. Other possible framing structures could involve a total of 48 information bits for full band coverage and diversity capability, or for carrying additional services. It shall be understood that the present invention is not limited to these or any other particular framing format, but rather that any format could be used without departing from the scope of the present invention.

To achieve synchronization with the parallel transfer word, the frame signal shown in FIGS. 6 and 7 runs at 819.2 Mb/s (i.e. $32\times25.6\times10^6$ bits/second=$819.2\times10^6$ bit/second). (The bit rate and sampling rate for 40 MHz/48 bit or other frame structure would change accordingly.) Synchronization is achieved at the receiving demultiplexer 142 (162 in FIG. 8 described below) by searching for the frame pattern. Thirty-two individual frames are grouped into a superframe. One of the 32 frames has a bit sequence different from the other 31 frames. Each frame byte is a balanced code having an equal number of ones and zeros. The frame search is initiated by the demultiplexer 142 to find consecutive patterns, followed by a search for the unique bit sequence in one of the 32 frames. When the frame and superframe are found by the demultiplexer 142 (or 162), valid traffic pattern or data patterns result. Framing methods of this type are well known in the telecommunications arts, and those of skill in the art will recognize that various alternate framing methodologies may also be used. Preferably, frame generator/multiplexer 134 includes circuitry for scrambling the outgoing data to provide for the balanced line code preferred for fiber optic transmission.

Figure 22:
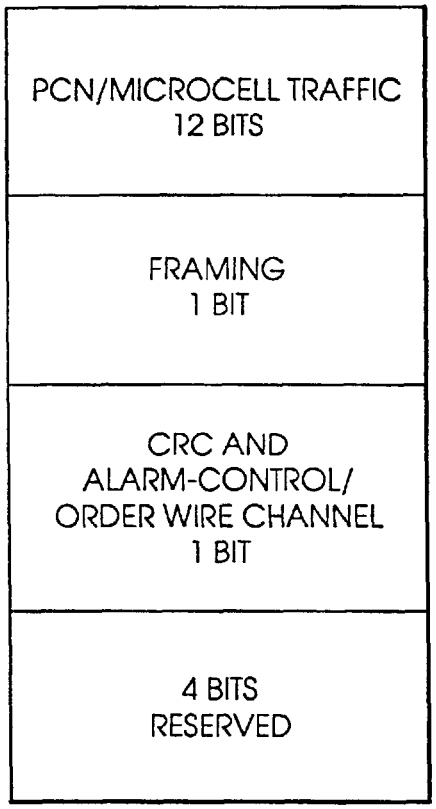
FIG. 22 is an alternate preferred framing structure for the embodiment of FIG. 2 of the present invention.
Figure 23:
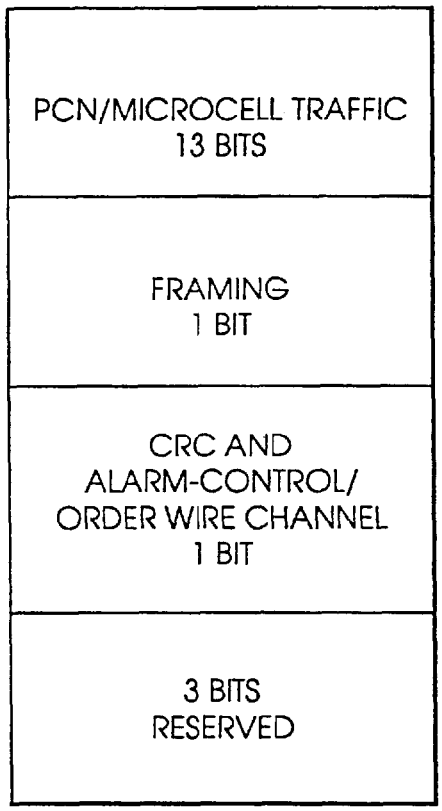
FIG. 23 is yet another alternate preferred framing structure for the embodiment of FIG. 2 of the present invention.

Referring now to FIGS. 22 and 23, there are shown the alternate preferred framing structures of the embodiment of FIG. 2. As shown in FIG. 22, the framing structure includes 12 bits of PCN/microcell traffic, one framing bit, one bit of CRC and an alarm-control/order wire channel, and four reserve bits. The framing structure in FIG. 23 is identical, except for 13 bits have been allocated to the PCN/microcell traffic. Neither of these framing structures is designed to accommodate diversity traffic, however, they could be so expanded. The framing structures of FIGS. 22 and 23 assumes a 12 bit sampling at 30.72 Mb/s. The basic framing structure is 18 bits, which, when run at 30.72 Mb/s, results in a rate of 552.96 Mb/s serial rate. As shown in FIG. 22, one bit is dedicated to framing. Another bit is multiplexed between CRC, alarm-control, and the order wire function. These two bits achieve framing and multiplexing by virtue of the following sequence:

| Framing Bit | CRC, Etc. |
|---|---|
| 00 | Frame 1 |
| 01 | Frame 2 |
| 10 | Frame 3 |
| 10 | Frame 4 |
| 1C | Frame 5 |
| 1D | Frame 6 |

As illustrated above, the framing structure of this embodiment contemplates that six frames make up a "super frame." The first four frames of each super frame include the 00, 01, 10, 10 sequence. In the fifth frame, the framing bit is a 1, and the other bit represents one bit of CRC code. In the sixth frame, the framing bit is a 1 and the other bit is an alarm-control/order wire channel bit.

Preferably, the CRC code is 32 bits wide, so that 32 frames must be received in order to accumulate the entire CRC code. Accordingly, errors are checked every 32 words of data. As in the case of the previously described framing structure, a balanced line code is provided.

Referring now to FIG. 8, there is shown a block diagram of the remote antenna unit 102, according to the first exemplary embodiment of the present invention. A digital optical receiver 160 receives the optical digital data stream transmitted from the microcell base station on fiber 104A. Receiver 160 converts the optical data stream to a corresponding series of electrical pulses, which are applied to demultiplexer 162. Demultiplexer 162 extracts the microcell traffic and applies the 12-bit (or 13-bit) samples to digital-to-analog converter 164. Converter 164 reconstructs the analog RF signal and applies it to linear power amplifier 24. Converter 164 is preferably the same as digital-to-analog converter 144 described and shown above with respect to FIG. 4. Amplifier 24 is connected to the main antenna 26 through a duplexer 25. Accordingly, radio frequency signals originating from transmitters 23 in the microcell base station are transmitted from main antenna 26. Demultiplexer 162 also extracts control signals for application to a control/alarm circuit 161. Order wire data is also extracted and applied to order wire interface 163 to provide two-way, point-to-point voice grade communication.

RF signals received at main antenna 26 are passed through duplexer 25 to filter 27. Power amplifier 24, duplexer 25, main antenna 26 and filter 27 are conventional base station components, as are described with reference to FIG. 1B. The output of filter 27 is combined and applied to a broadband analog-to-digital converter 170 (of the same type as 144 described above with respect to FIG. 4), which digitizes the analog RF signal and applies it to a frame generator/multiplexer circuit 172. The output of circuit 172 is applied to digitally modulated laser 174, which applies the corresponding optical digital stream to fiber 104B. Frame generator/multiplexer 172 is of substantially the same design as framer/multiplexer 34. It receives an alarm (or monitoring) signal data stream from control/alarm circuit 161, and an order wire data stream signal from order wire interface 163.

Optionally, remote antenna unit 102 may include a diversity antenna system 180. System 180 includes a diversity antenna 26', which applies its output to filter 27' and in turn to broadband analog-to-digital converter 170', which operate in the same manner as main antenna 26, filter 27 and broadband analog-to-digital converter 170, respectively. The output of analog digital converter 170' is applied to circuit 172, which multiplexes the digitized RF signal from the diversity antenna into the data stream applied to fiber 104B. In such a case, the framing scheme includes diversity traffic capacity.

Figure 9:
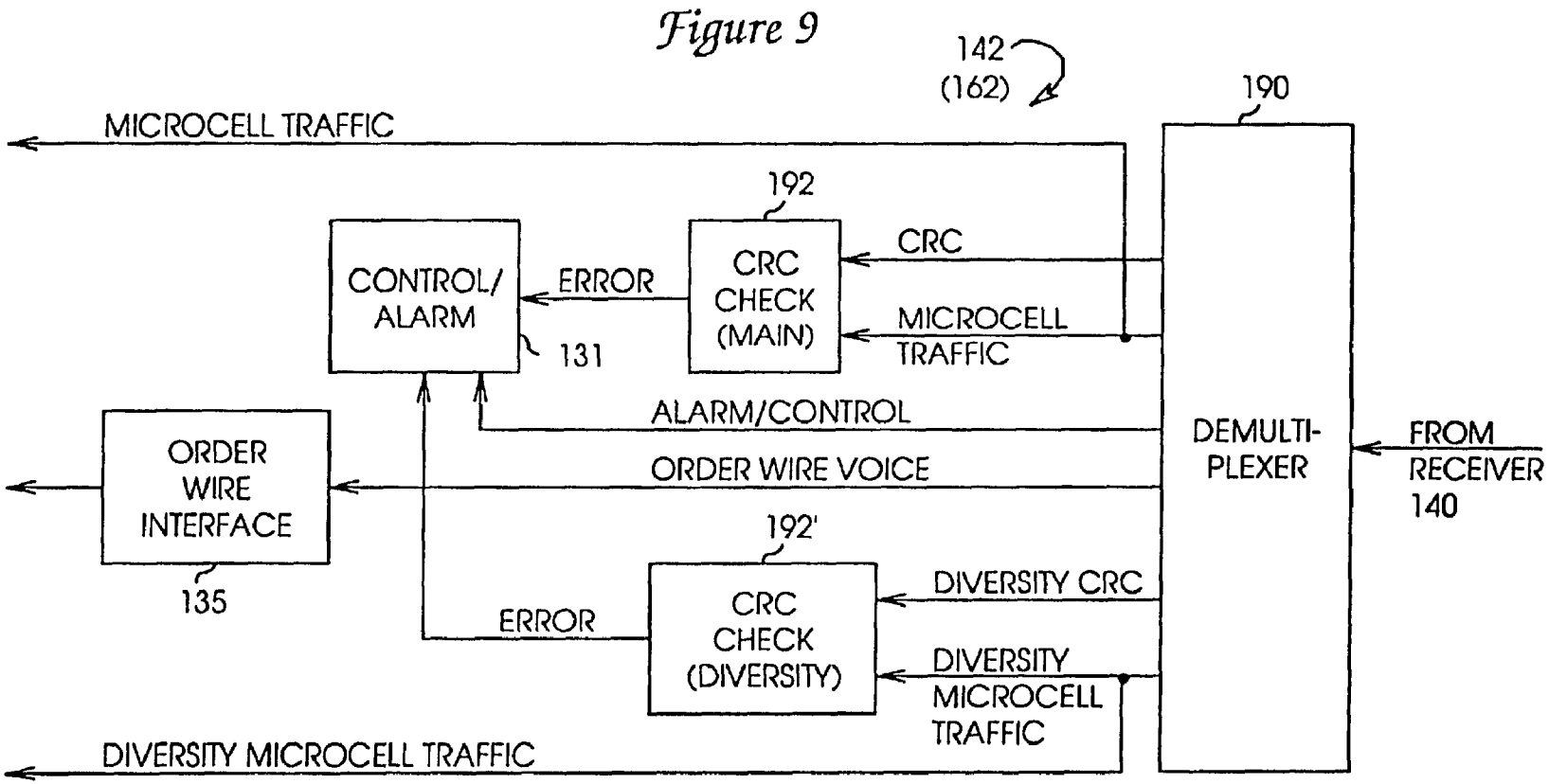
FIG. 9 is a functional block diagram of the demultiplexer 142 and associated interfaces of FIG. 4.

Referring now to FIG. 9, there is shown in greater detail demultiplexer circuit 142 (and correspondingly 162) shown in FIG. 4 and FIG. 8. Circuit 142 (162) includes a demultiplexer 190, which receives the digital data stream from digital optical receiver 140. Demultiplexer 190 extracts the control/alarm channel, order wire channel, CRC channel and microcell traffic channel from the digital data stream. Optionally, where the diversity function is provided, the diversity CRC channel and diversity microcell channel are also extracted. The main CRC channel and microcell traffic channel are applied to CRC checking circuit 192, which provides an error signal to the control/alarm circuit 131. Circuit 131 monitors the error rate of data and alarms occurring at the remote antenna unit 102. The order wire channel is applied to order wire interface 163, to provide two-way point-to-point communication.

Where diversity is optionally included, a second CRC checking circuit 192' receives the diversity CRC channel and diversity microcell channel and produces an error signal which is applied to control/alarm circuit 131.

All-Digital Embodiment

Figure 10:
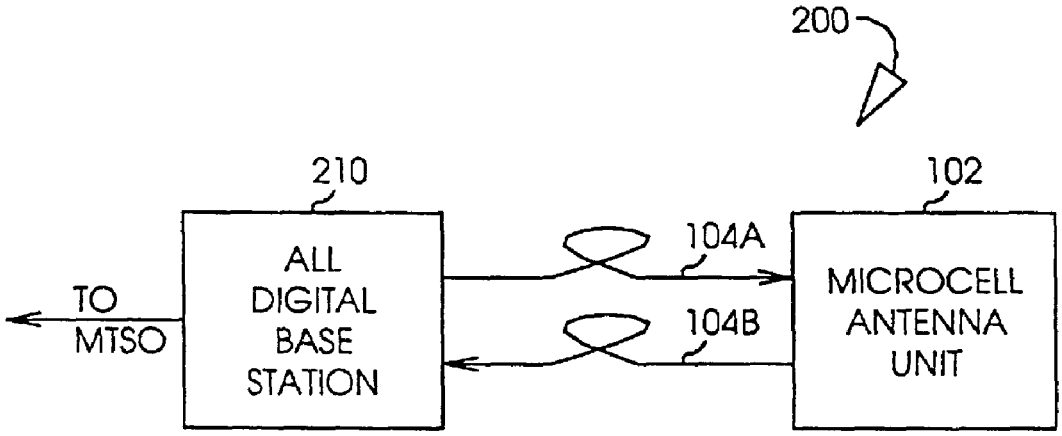
FIG. 10 is a functional block diagram of an all-digital exemplary embodiment of the invention.

Referring now to FIG. 10, there is shown an alternate exemplary embodiment 200 of the present invention. Alternate embodiment 200 includes a remote antenna unit 102 as described with respect to FIG. 8. Remote antenna unit 102 is connected to an all-digital microcell base station 210 through fibers 104A and 104B. Microcell base station 210 is connected to an MTSO.

Figure 11A:
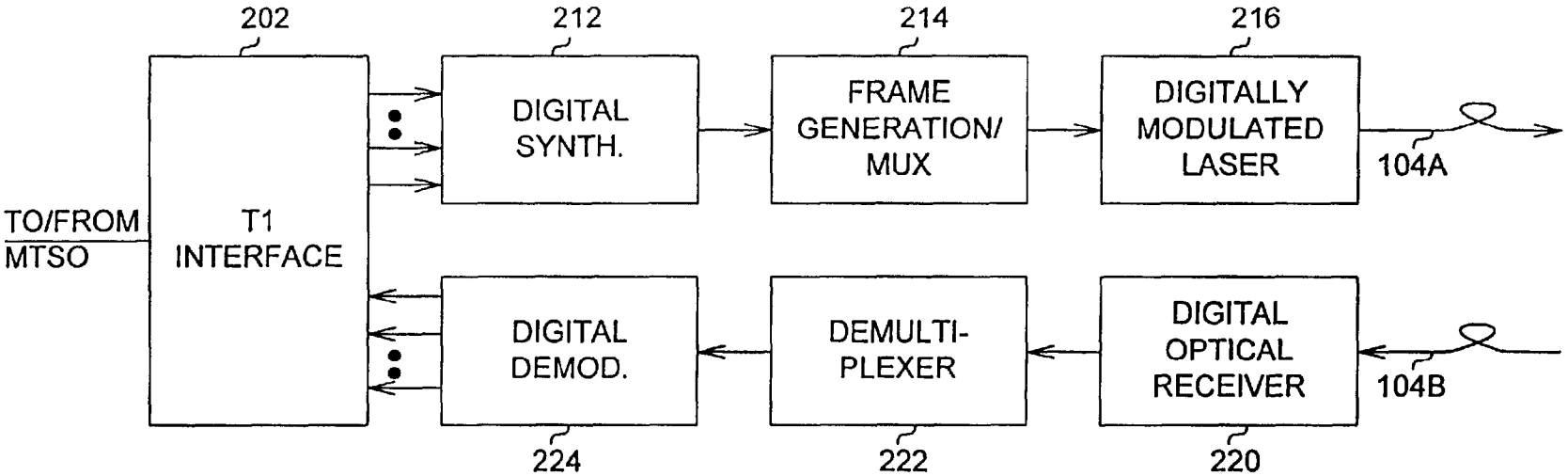
FIG. 11A is a more detailed block diagram of the system illustrated in FIG. 10.

All-digital microcell base station 210 is shown in more detail in FIG. 11A. Circuit 210 includes a T1 interface 202, which extracts digitized voice channels carried by a T1 line or other carrier from an MTSO and applies those channels in digital form to digital synthesizer 212. Digital synthesizer 212 replaces transmitters 23 and the analog-to-digital converter 132 of the embodiment shown in FIG. 4. Digital synthesizer 212 constructs, with digital logic or software, an equivalent to the digitized output of broadband digitizer 132 for application to frame generator/multiplexer 214. Synthesis may be accomplished, for instance, by electronic or software simulation of the generation of the analog telephone signal and the modulation of the transmittal signal therewith. The simulated signal transmitter output signal can then be directly represented in digital form that can be processed to emulate the output of the A/D converter.

Figure 11B:
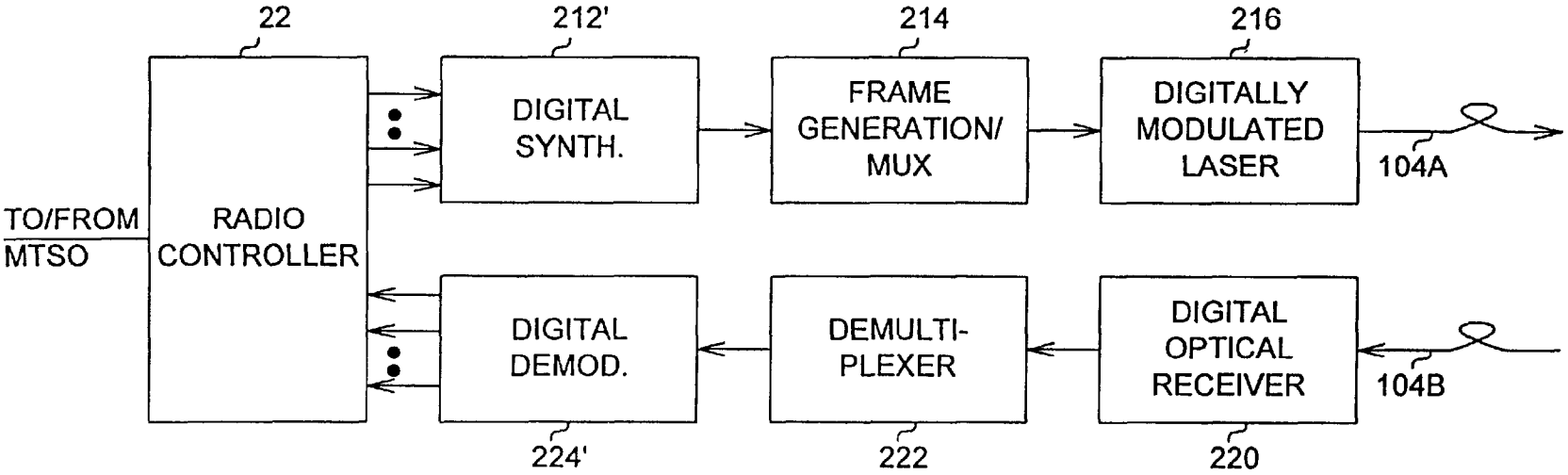
FIG. 11B is an alternative embodiment of the system illustrated in FIG. 11A.

An alternate embodiment of the system of FIG. 11A is shown in FIG. 11B. In the system of FIG. 11B, the synthesizer 212' receives an analog input from radio controller 22, and converts the analog output signals (corresponding to analog telephone signals) from the radio controller 22 into a corresponding digitized traffic stream. In this process, for example, synthesizer 212' can first digitize the individual analog input signals, and then process them digitally to produce the digitized signal for delivery to units 106. On the return path, digital demodulator 224' produces a plurality of analog telephone signals compatible with the input to the radio controller 22. Multiplexer 214 operates in the same fashion as described with respect to frame generator/multiplexer 134 described above with respect to FIGS. 4 and 5. The output of frame generator multiplexer 214 is applied to digitally modulated laser 216, which outputs the optical data stream on fiber 104A. Digital optical receiver 220 receives the optical data stream from fiber 104B and applies it to demultiplexer 222, which operates in the same fashion as demultiplexer 142 of FIG. 4. The output of demultiplexer 222 is applied to digital demodulator or receiver circuit 224, which extracts the microcell channels and applies them to T1 interface 202 for transmission to the MTSO.

Figure 11C:
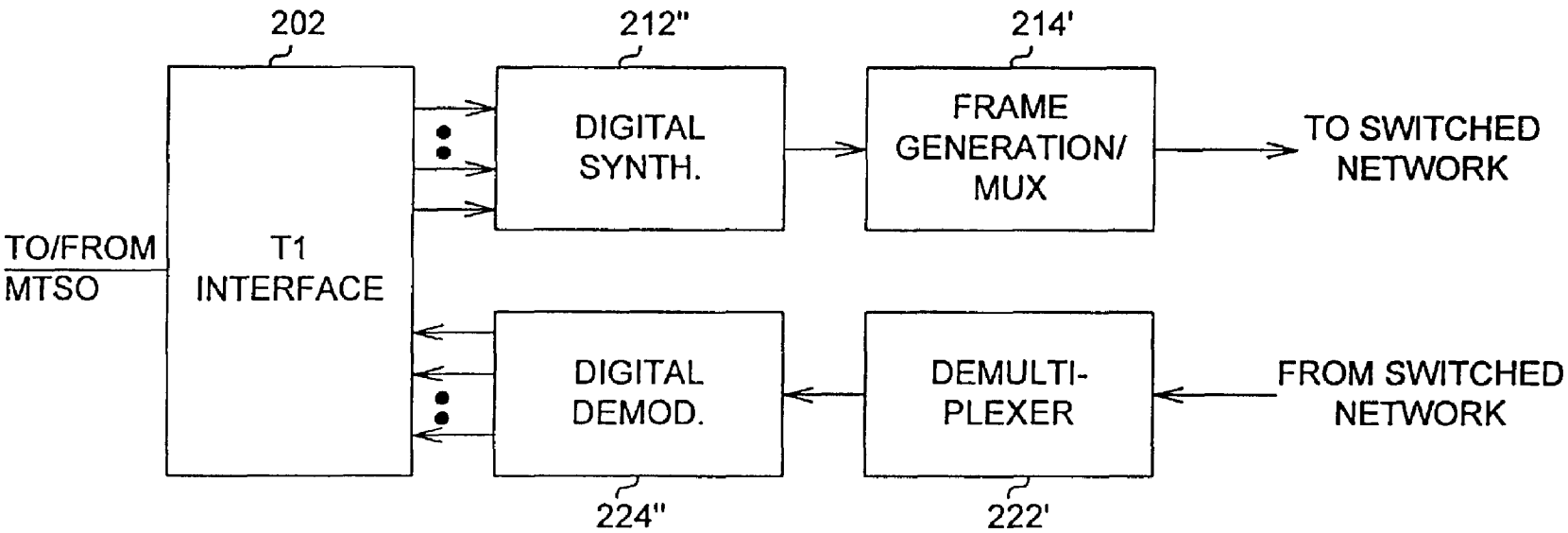
FIG. 11C is yet another alternate embodiment of the system illustrated in FIG. 11A.
Figure 11D:
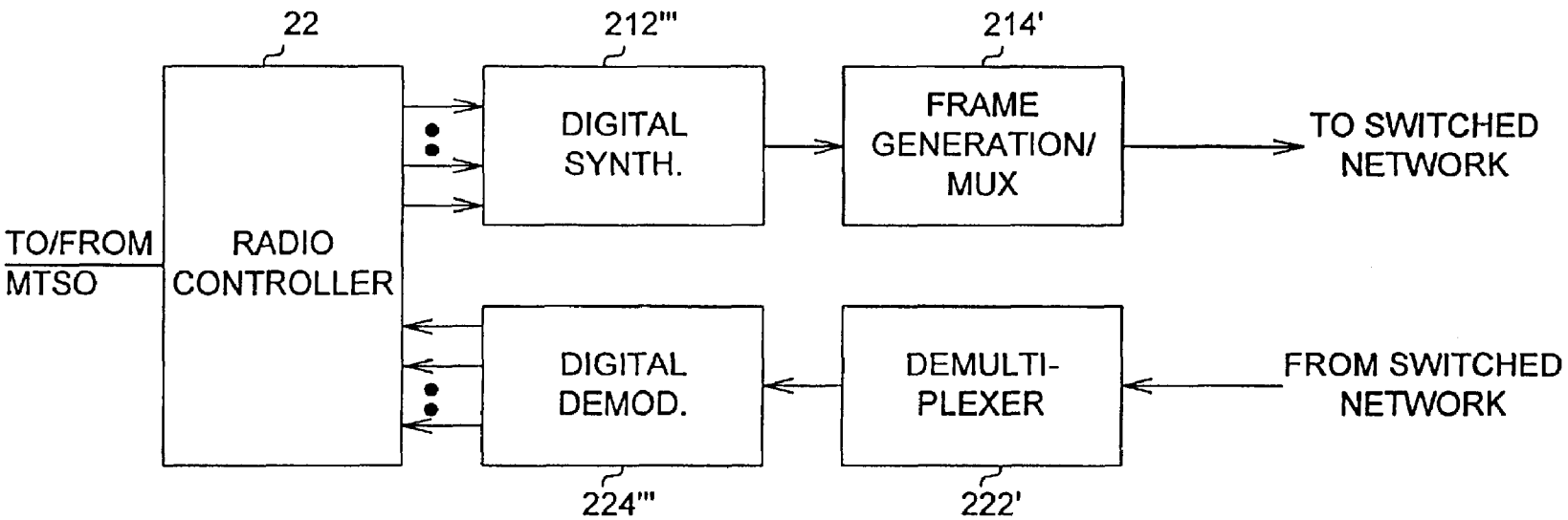
FIG. 11D is still another alternative embodiment of the system illustrated in FIG. 11A.

Yet another alternate embodiment of the all digital base station is shown in FIG. 11C. In FIG. 11C, the frame generation/multiplexer 211' is modified to apply its output directly to the switched telephone network, in a format compatible with network protocols, for example DS1, DS3 or SONET. The switched network is then used to connect the base station with each antenna unit 106. According to this embodiment, the modified synthesizer 212" generates a separate digitized output (for example as shown below with respect to FIG. 32B) for each channel being used (as opposed to all channels in the cellular band), such that only the digitized form of the channels used for each antenna unit 106 are actually transported thereto, thus greatly reducing the bandwidth required for this purpose. Similarly, demultiplexer 222' is configured to receive the individually packaged digitized channels from the switched network, and demodulator 224" is modified to receive and extract the individual channels. The embodiment of FIG. 11B can also be modified in this manner, as is illustrated in FIG. 11D.

Thus, all-digital base station 210 synthesizes the effect of digitizing the transmitter data stream, providing for an all-digital conversion from circuit 202 to the data stream applied to fiber 104A. The synthesized signal is received at the remote antenna unit 102, which constructs the radio frequency signal, using digital-to-analog converter 164, thus eliminating the need for transmitters 23. Similarly, digital demodulator or receiver circuit 224 eliminates the need for receivers 28, by converting the demultiplexed digitized RF data stream directly into digital phone channels for application to circuit 202 and transport to the MTSO.

Figure 12:
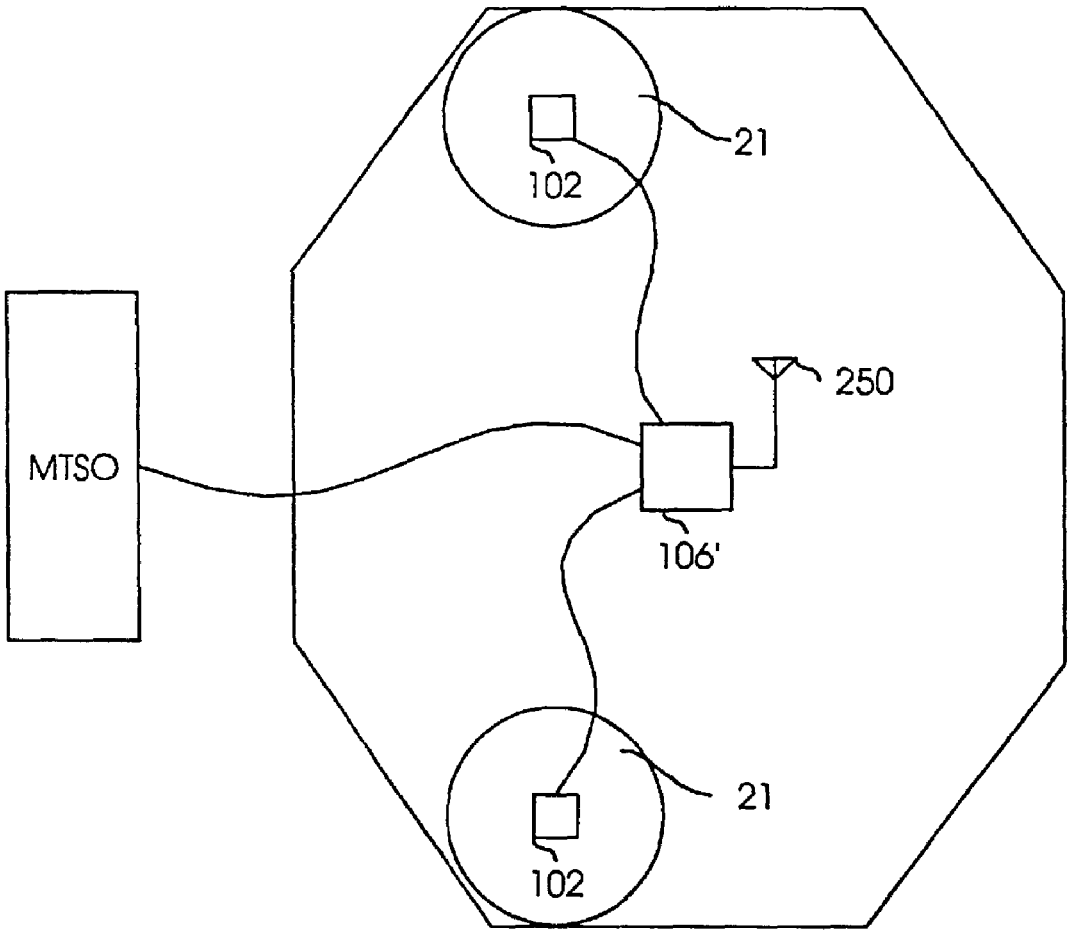
FIG. 12 is a simplified illustration of an alternate embodiment of the microcell communication system according to the present invention.

Yet another exemplary alternative embodiment of the invention is shown in FIG. 12. The alternate embodiment shown in FIG. 12 includes a base station 106', having an antenna 250 for broadcasting and receiving RF signals into a cellular area. In addition, 106' includes one or more remote antenna units 102 used to reach shadowed areas. This embodiment is not for the purpose of extending capacity, but rather to improve coverage.

Figure 13:
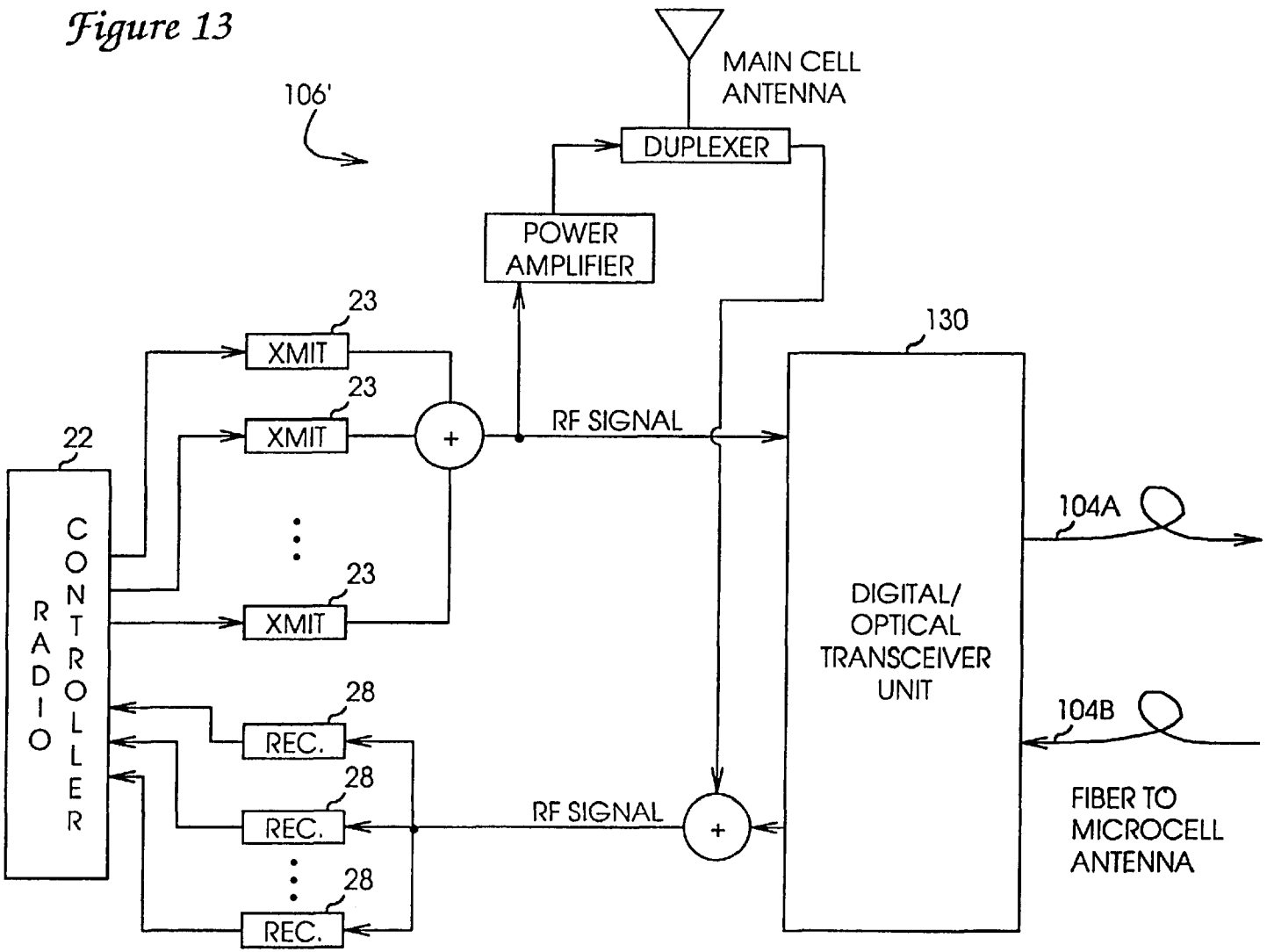
FIG. 13 is a functional block design of the alternate embodiment 106' of the system of FIG. 12.

Referring to FIG. 13, base station embodiment 106' is shown in more detail. The configuration of FIG. 13 is the same as FIG. 3, except the RF signals are connected simultaneously to a main cell site antenna through a duplexer and power amplifier.

Figure 14:
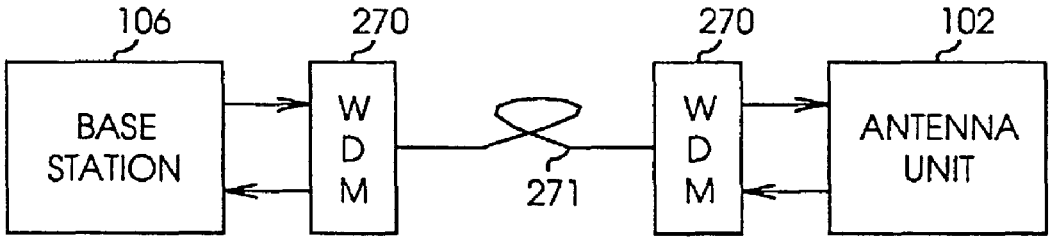
FIG. 14 is another alternate exemplary embodiment of the microcell communication system of the present invention.

Referring now to FIG. 14, there is illustrated an alternate preferred embodiment of base station units 106 and antenna unit 102. According to this alternate preferred embodiment shown in FIG. 14, there are provided wave division multiplexers 270 at the base station 106 and remote antenna unit 102. Wave division multiplexers 270 provide that a single optical fiber 271 can be used in place of a pair of optical fibers 104A and 104B, as shown with respect to the exemplary embodiment of FIG. 4. Preferably, the wavelengths of operation for wave division multiplexers 270 are 1310 nm±20 nm, and 1550 nm±20 nm.

Figure 15:
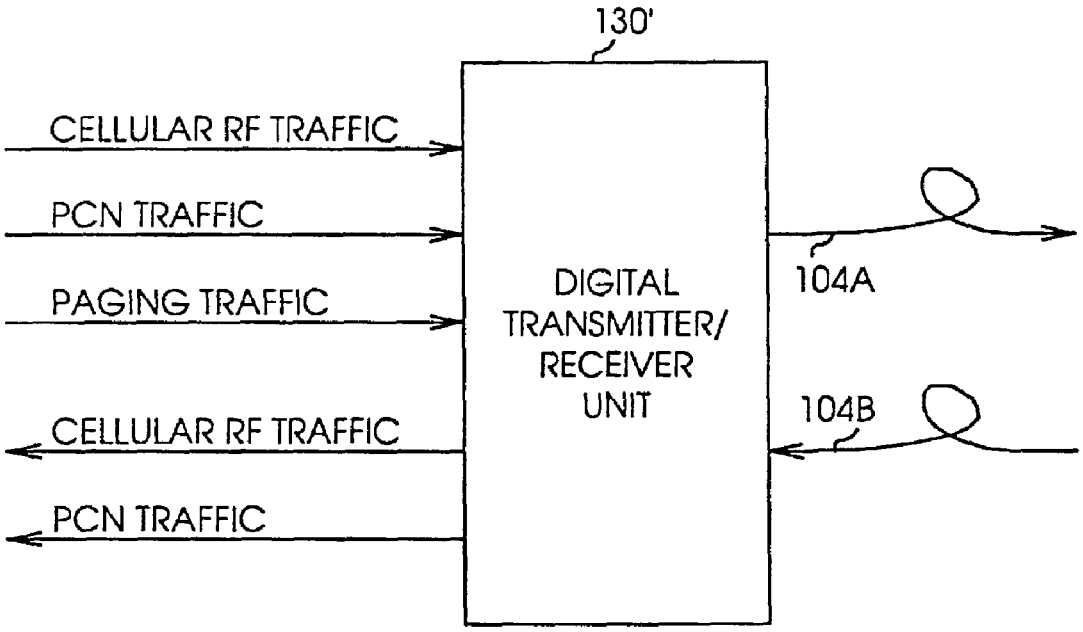
FIG. 15 illustrates yet another alternate exemplary embodiment of the invention wherein alternate services, such as personal communication network (PCN) traffic and paging traffic is multiplexed with cellular system traffic.

Yet another alternate exemplary embodiment of the invention is shown in FIG. 15. In FIG. 15, alternate service traffic (personal communication network (PCN) traffic and/or paging traffic as shown in FIG. 15, for example) are multiplexed into the digital carrier and conveyed to the remote antenna unit 102 for transmission as part of a broadband signal reconstructed by the digital-to-analog converter. The remote antenna unit is modified to include separate analog-to-digital converter, digital-to-analog converter, filter, duplexer, linear power amplifier and antenna for the alternate service. The optical transceiver and fiber being shared with the microcell traffic. PCN transmissions are received at the remote antenna unit 102 and conveyed on the digital carrier back to the base station 106. The additional services are carried over the same fiber simply by adding more bits per frame. Therefore, the embodiment of FIG. 15 can carry the traffic associated with several different alternate services and cellular traffic simultaneously, with minimal cost over straight cellular traffic. It is contemplated that yet other services can be carried, and the invention is in no way limited to microcellular, paging, PCN or mobile data service traffic.

Method of Installing and Upgrading the Microcell System

For ease of implementation of the present all-digital embodiment, two-stage deployment is contemplated. In the first stage, microcell base station units 106, of the design shown in FIG. 3, are deployed. These units may be readily constructed with conventional transmitter and receiver technology in the base station unit, and conventional interface circuitry to the MTSO. In the second stage, units 106 may be replaced or upgraded to all digital microcell base station units 210, wherein the analog transmit and receive circuits are eliminated. This upgrade may be accomplished without changing remote antenna units 102, and therefore may be done conveniently and expeditiously. This method of installation thus allows the initial units 106 to be constructed readily and at relatively low cost, and thus providing for rapid deployment, while allowing for upgrade to more reliable all-digital base station equipment without change to the remote antenna units 102.

Thus, as described above, the present invention provides not only improved coverage, but also for increased capacity by assignment of reusable channel sets throughout the microcell system, without the need to deploy independent, conventional base stations in each microcell area. Also, by virtue of digital transmission, it also provides good dynamic range over extended distances as compared to analog systems.

The exemplary configuration illustrated with respect to base station 106 and remote antenna unit 102 provides control/alarm/monitoring and two-way point-to-point voice channels to be readily multiplexed on the digital carrier, providing advantages over analog systems such as that disclosed by AT&T. Furthermore, a diversity channel can also be multiplexed into the data stream to provide the diversity function without the need for additional fiber paths.

The invention also permits ready adaptation to carry alternate services such as PCN, mobile data and paging services together with microcellular traffic.

Another advantage of the invention is its ready adaptation to all digital base station technology, wherein microcell traffic data received from an MTSO in digital form can be digitally converted to a synthesized stream of data samples for application to the digital-to-analog converter in the remote antenna unit 102.

It shall be understood that other control or monitoring type channels between the base station and antenna units are also possible, and that the invention is not limited to the particular channels illustrated in the exemplary embodiments.

Transmission of Microcell and PCN Traffic Over Cable System Fiber Feeders

Figure 16:
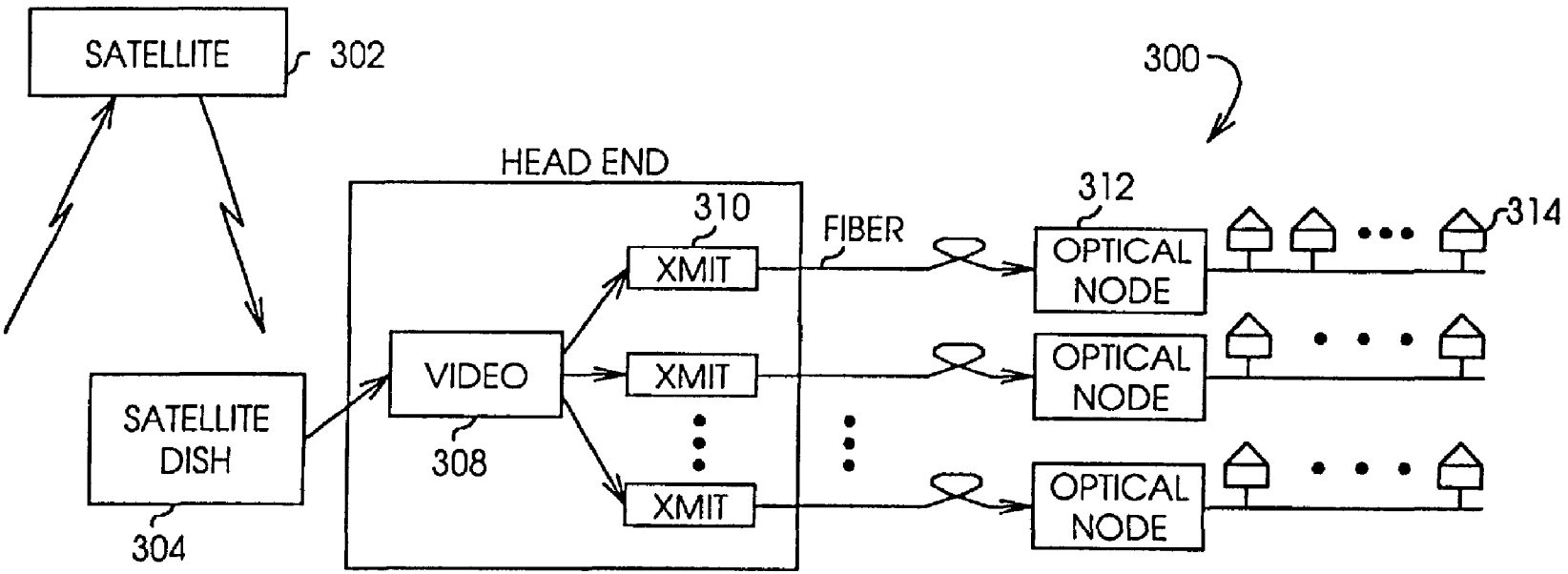
FIG. 16 is a simplified illustration of a prior art cable television system infrastructure.

A conventional cable system is illustrated in FIG. 16. System 300 includes one or more satellite dishes 304 receiving satellite television signals from satellite 302. In addition, the head end may receive video feeds from local sources or over other media such as fiber, coaxial cable or line of sight microwave link Video unit 308 provides video signal splitting, and provides a video signal to AM transmitters 310, which apply an amplitude modulated signal, typically down-converted prior to transmission, for application to a fiber feeder. The fiber optic feeder transmits the video signal to a optical node 312, which processes the received signal for delivery to a plurality of homes 314, typically over copper coax cable, or in state of the art installations, over a fiber link. In a typical suburban installation of the type most adaptable to the benefits of this exemplary embodiment, an optical node 312 preferably provides service to approximately 250 homes, covering a geographic area of approximately 1-2 square miles.

Figure 17:
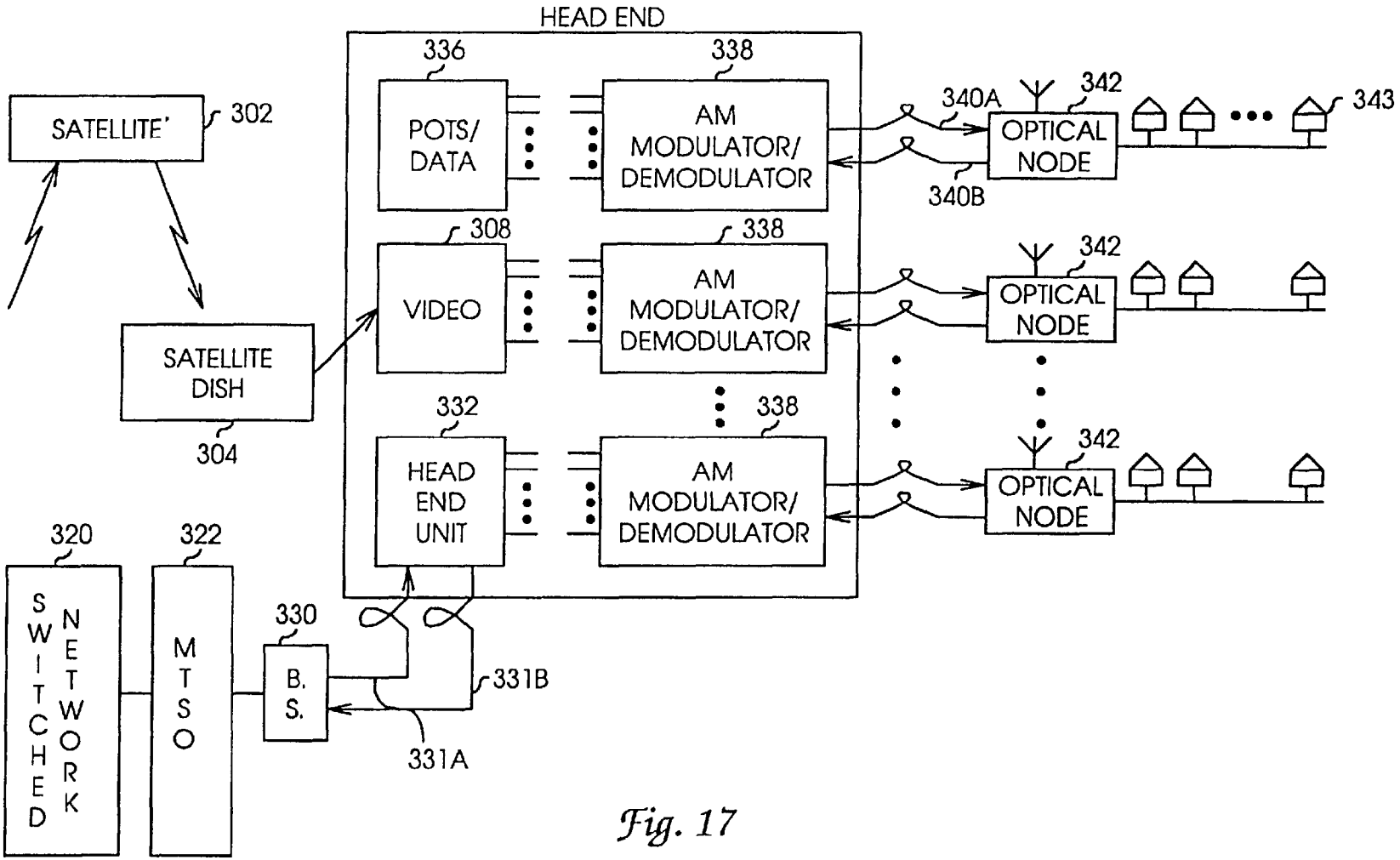
FIG. 17 is a simplified block diagram of an alternate exemplary embodiment of the invention, wherein cable system infrastructure is used to transmit digitized RF to and from a microcell location.

An exemplary embodiment of the present invention, wherein the cable system 300 is utilized to transmit microcell or PCN traffic to microcell areas will now be explained with reference to FIG. 17. The system of FIG. 17 provides the advantage of using the installed infrastructure of a cable television system to transport microcell and PCN traffic. As shown in FIG. 17, the head end of the cable system includes a head end microcell/PCN unit 332, video multiplexer 308, and a plain old telephone service (POTS) and data source 336. Although the provision of POTS and data service is included in this exemplary embodiment, it is not necessary to the delivery of cellular/PCN service, and may be omitted from the system. Preferably, the POTS/data are carried on a plurality of subcarriers within a certain band. A separate subcarrier would be assigned to each subscriber in the system. Similarly, the video channels are also contained on a plurality of subcarriers in a specified band. In addition, the microcell/PCN channels are also carried on separate subcarries in a defined band. The head end unit 332 is interfaced with a base station unit 330, through a pair of fibers 331A and 331B. Base station unit 330 is interfaced to the switched telephone network 320 through a mobile telephone switching office (MTSO) 322.

The head end further includes a plurality of AM modulator/demodulators 338, which are coupled to microcell optical nodes 342 through fibers 340A and 340B. Optical nodes 342 each include an antenna for the transmission and reception of microcell or PCN traffic and are interfaced to a plurality of subscriber homes 343. POTS/data source 336, multiplexer 308 and head end 332 are each connected to the respective AM modulator/demodulators 338, as more fully illustrated in FIG. 20, to be explained further below.

Figure 18:
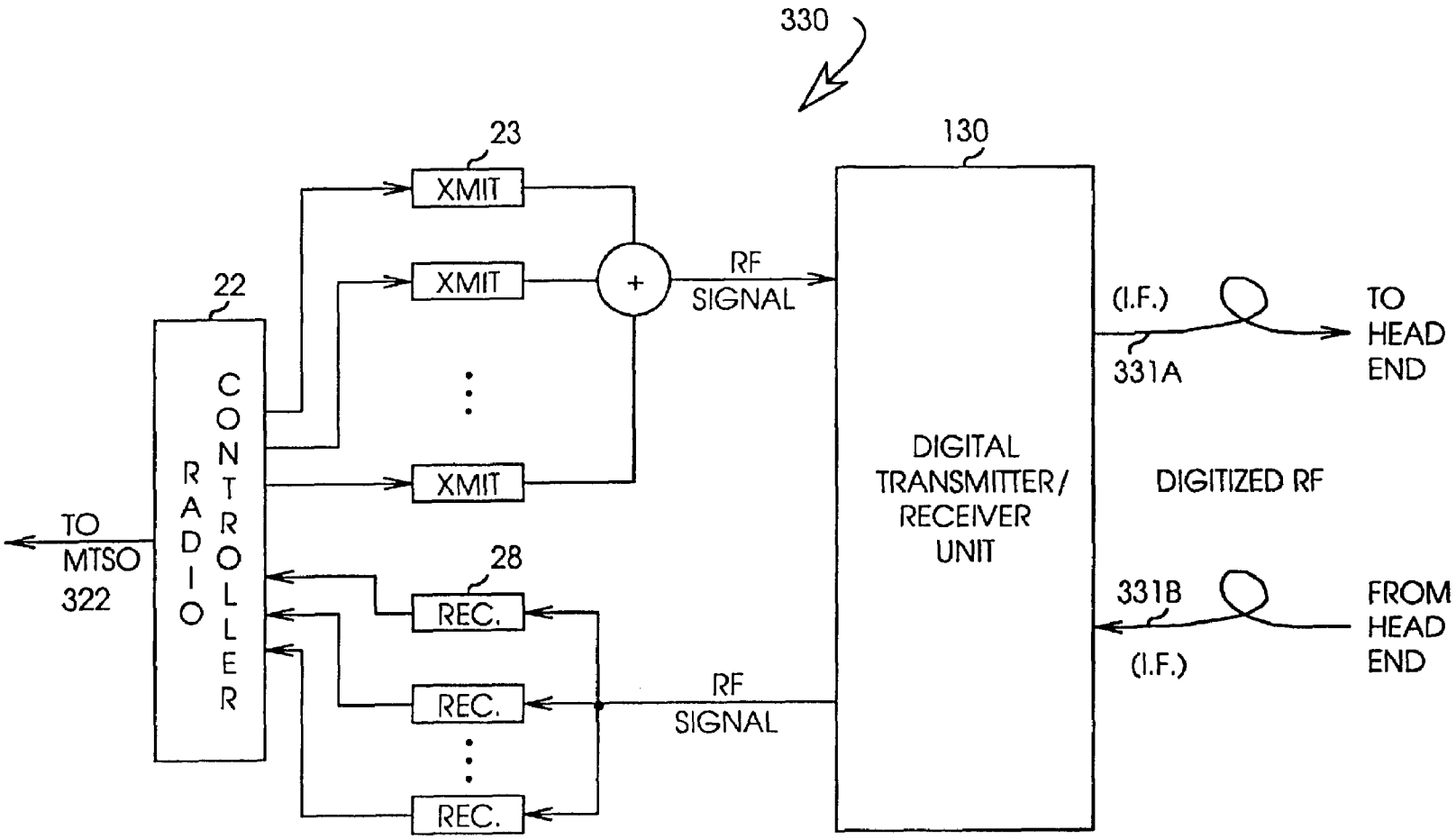
FIG. 18 is a block diagram of a base station unit of the exemplary embodiment of FIG. 17.

Base station unit 330 is shown in more detail in FIG. 18. Unit 330 functions identically to unit 106 as described above with reference to FIG. 3. The base station unit 330 may be positioned, as in the embodiment of FIG. 2, in a convenient location, remote from the head end. Alternatively, base station 330 could be located at the head end, with the elimination of the fiber link and other unnecessary components, such that the RF signal output of the transmitters may be filtered and applied directly to the AM modulator/demodulators 338 and in return the output of the AM modulators/demodulators 338 filtered and applied directly to the receivers 28. Digital transmitter/receiver 130 of base station 330 is configured as illustrated in FIG. 4.

Figure 19:
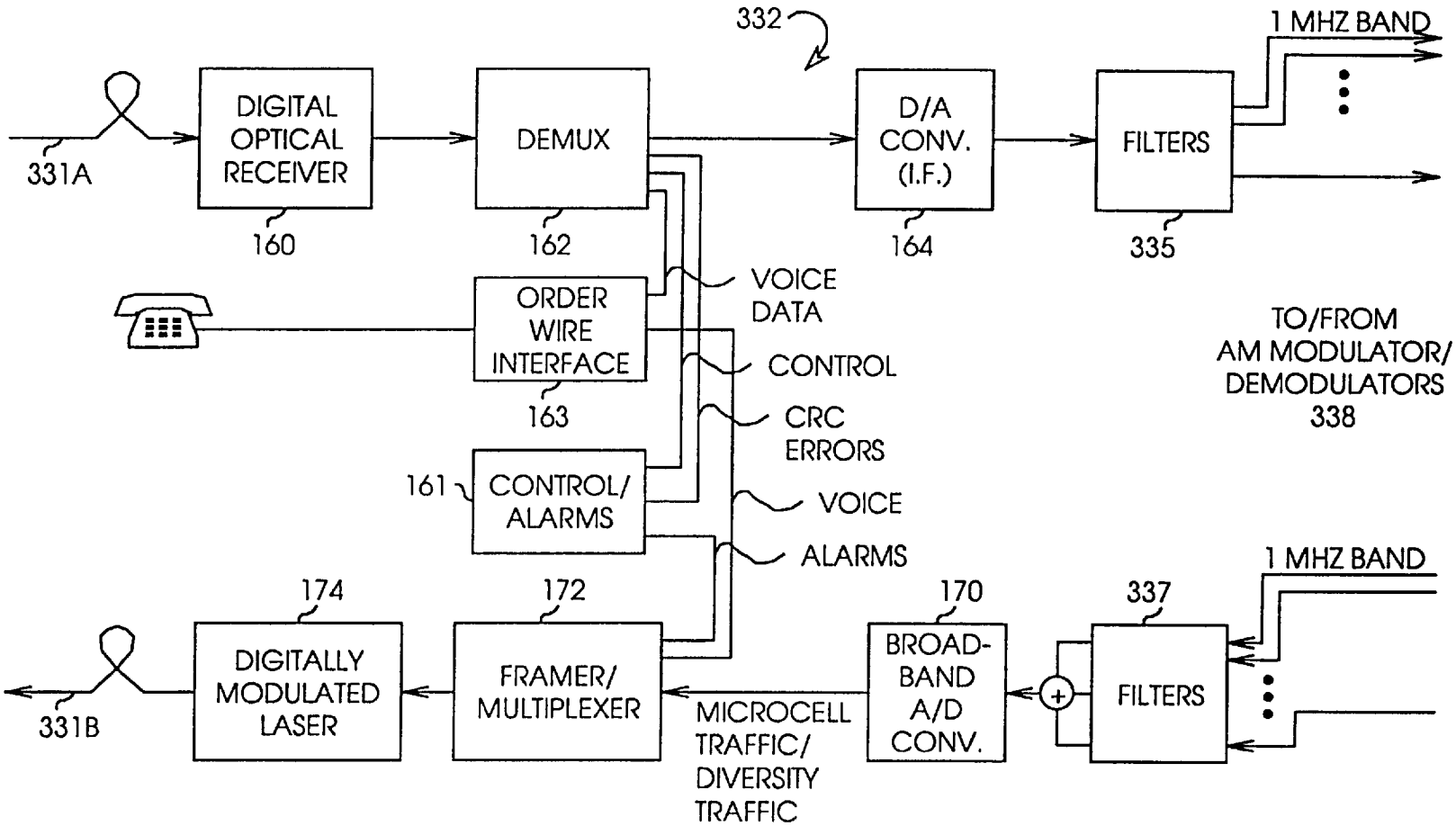
FIG. 19 illustrates the head end unit located at the head end of the cable system of the exemplary embodiment of FIG. 17.

As shown in FIG. 19, head end unit 332 is configured substantially the same as unit 102 from the embodiment of FIG. 2. RF digitization and framing for communication between the head end unit 332 and base station 330 is performed substantially the same as described above with regard to units 102 and 106. However, the output of digital-to-analog converter 164 is applied to filters 335, which filter the RF signal into a plurality of bands, each to be delivered to a particular microcell associated with a optical node 342. In the exemplary illustrative embodiment illustrated herein, the channels of the microcell or PCN system are divided into a plurality of 1 MHz bands, each containing a plurality of channels of microcell or PCN traffic (for example ten 100 KHz channels or approximately thirty 30 KHz standard channels). Each of the AM modulator/demodulators 338 (shown in detail in FIG. 20) receives a 1 MHz band of channels and conveys it to the microcell optical node 342 over the fibers 340A and 340B by AM modulation. In the reverse path, 1 MHz bands are received back from the microcell optical nodes 342 (over fiber 340B), demodulated in an AM modulator/demodulator 338, filtered by filters 337 and combined before application to broadband analog-to-digital converter 170, on a return path to the base station unit 330.

Figure 20:
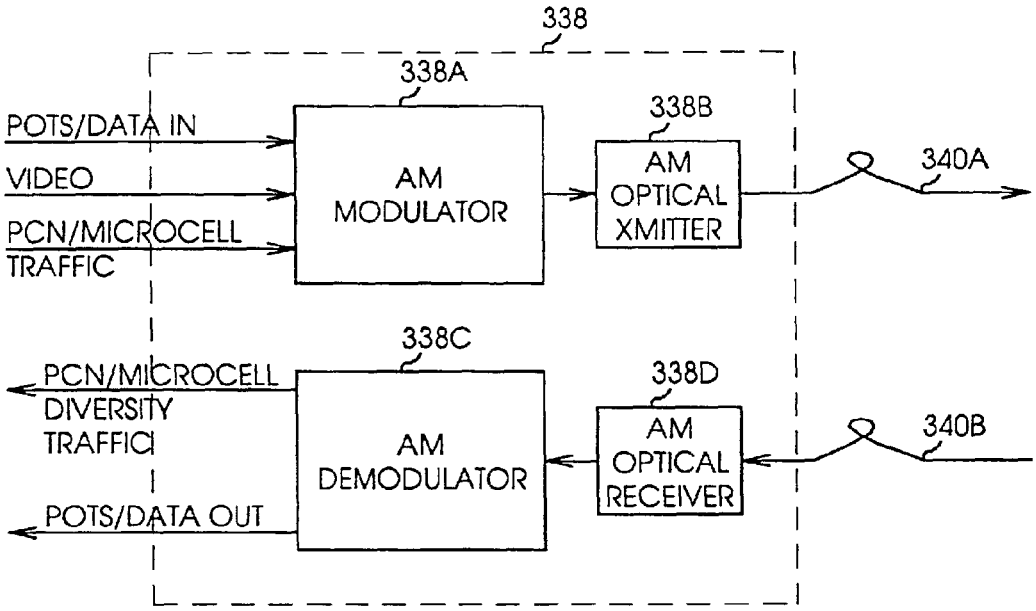
FIG. 20 is a more detailed block diagram of the AM modulator/demodulator, located in the head end of the cable system of the exemplary embodiment of FIG. 17.

Referring now to FIG. 20, there is illustrated in more detail a modulator/demodulator 338. Each unit 338 includes an AM modulator 338A, which receives a POTS/data input signal, a video input signal, and a PCN/microcell traffic input signal. AM modulator 338A combines the signal inputs and produces an AM modulated signal for application to AM optical transmitter 338B, which in turn applies its optical wavelength output to fiber 348. On the return path, AM demodulator 338C receives an input from AM optical receiver 338D, and provides an output of PCN/microcell and diversity traffic, together with a POTS/data output signal.

Figure 24:
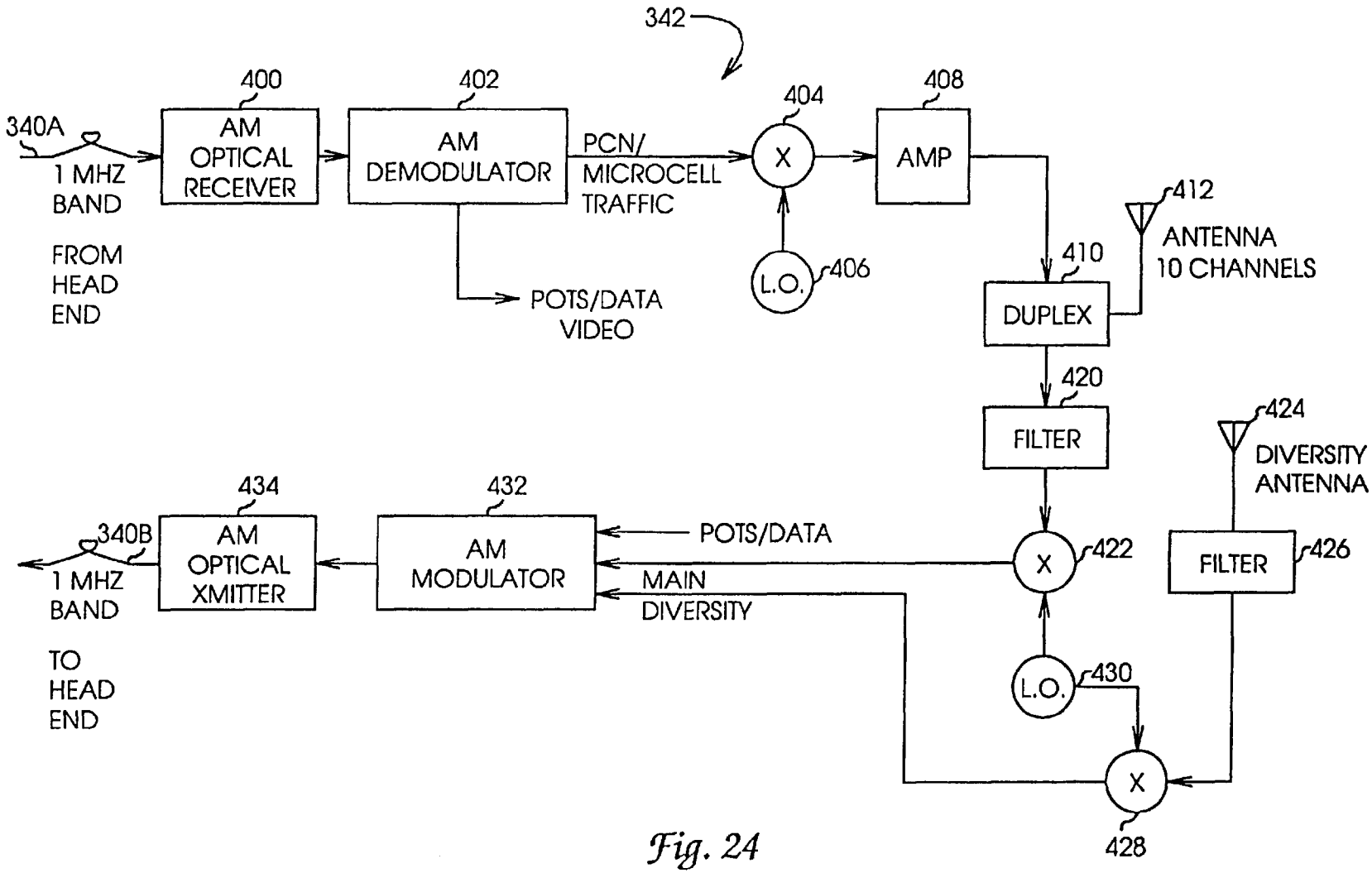
FIG. 24 is a more detailed block diagram of the microcell remote unit to be positioned at the optical node in the cable system embodiment of FIG. 17.

Referring now to FIG. 24, the microcell optical node unit 342 is shown in more detail. Unit 342 includes an AM optical receiver 400, which receives the AM modulated signal from an AM modulator/demodulator 338. The output of optical receiver 400 is applied to an AM demodulator 402, which outputs a POTS/data signal and a video signal. The POTS/data is to be delivered to subscriber homes over the optical node to home data transmission medium. The video signal is also supplied to subscriber homes over the transmission medium (usually coaxial cable, or possibly fiber). The PCN/microcell traffic is separately outputted from AM demodulator 402 and applied to an up-converter comprising mixer 404 and local oscillator 406, where it is restored to its operating frequency. The signal is amplified with amplifier 408 and applied through duplexer 410 for transmission into the microcell area via a main antenna 412. According to the exemplary embodiment disclosed herein, the channels carried in the 1 MHz band, are transmitted from the antenna unit at the optical node. RF signals received at antenna 412 are fed through duplexer 410 and are applied to filter 420. Diversity antenna 424 may optionally be provided with its output applied through filter 426 to a mixer 428. A local oscillator provides an input to mixer 422 and mixer 428, effecting a down-conversion of the received PCN or microcell traffic before application to AM modulator 432, together with return POTS/data traffic. AM modulator 432 combines the main channel, diversity channel and POTS/data signals and modulates them onto fiber 340B through AM optical transmitter 434.

Figure 25:
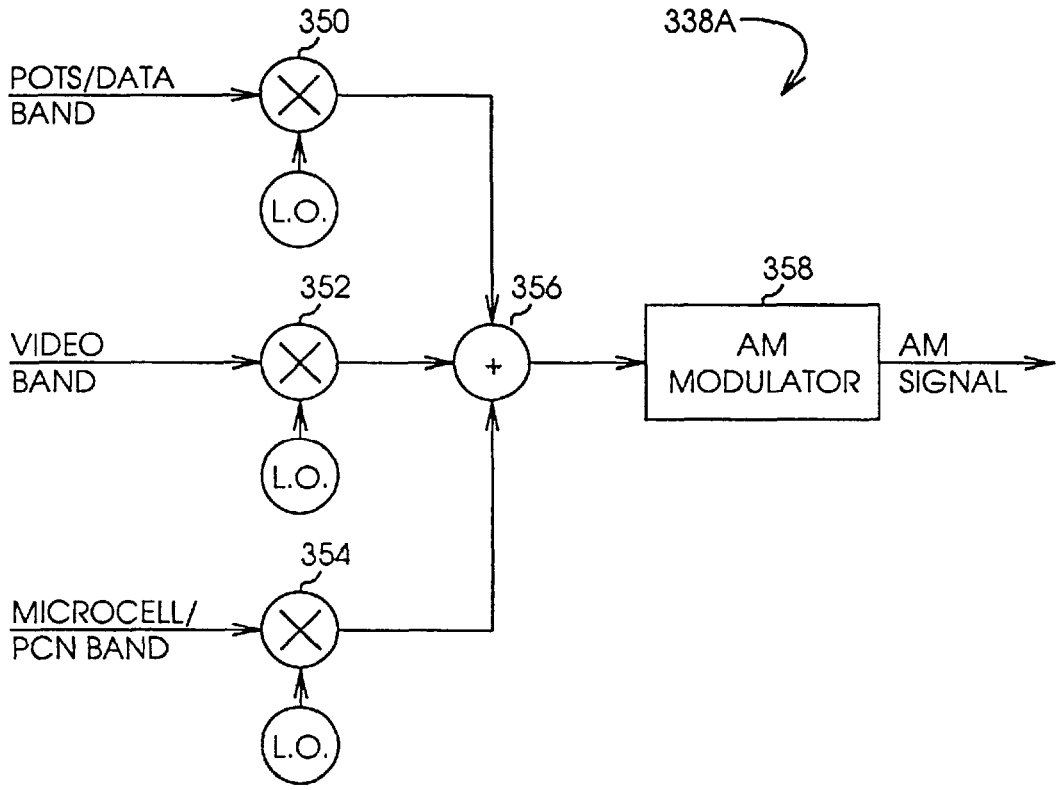
FIG. 25 is an illustration of the amplitude modulator as used in the embodiment of FIG. 17.
Figure 26:
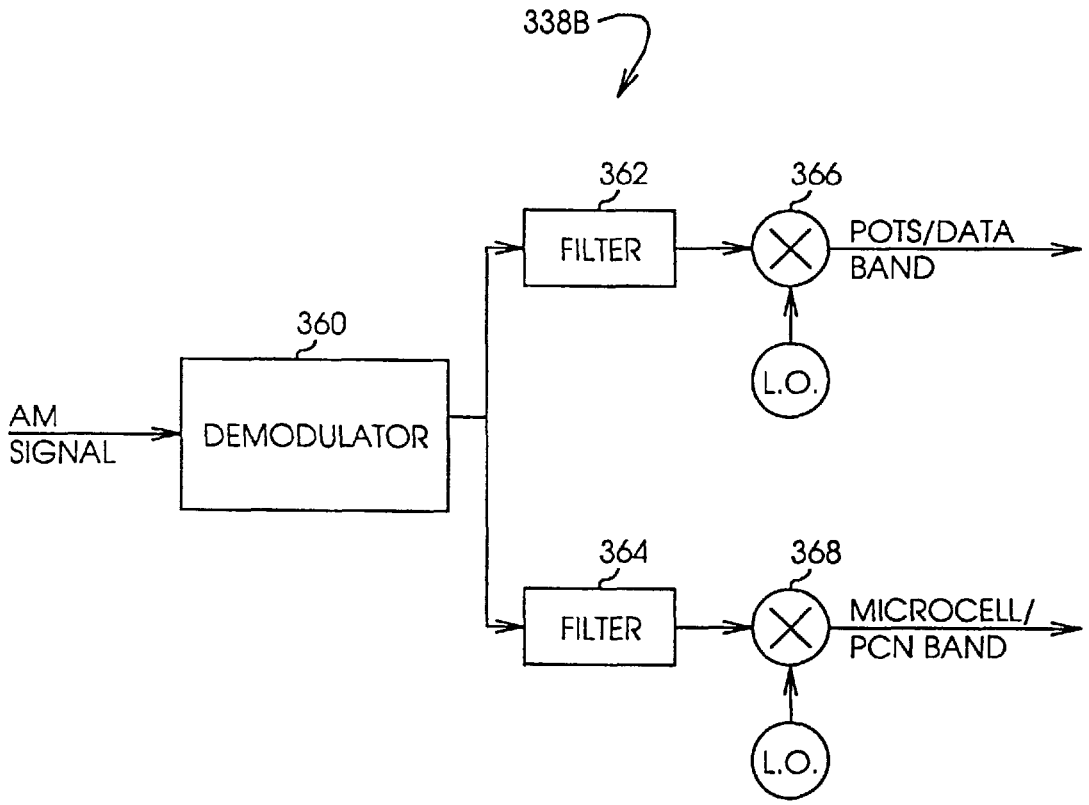
FIG. 26 is a more detailed illustration of the amplitude demodulator, as used in the embodiment of FIG. 17.

The AM modulators (338A, 432) and demodulators (338C, 402) are illustrated in more detail in FIGS. 25 and 26. Referring now to FIG. 25, there are shown in more detail AM modulator 338A. The POTS/data, video channel and microcell/PCN channel signal sources are applied to respective mixers 350, 352 and 354, where they are frequency shifted to a desired frequency for combination at combining circuit 356. The combined signals applied to a conventional modulator AM modulator 358.

As shown in FIG. 26, on the return path, the AM signal is applied to a conventional AM demodulator 360, the output of which is filtered by filters 362 and 364 for application to respective mixers 366 and 368, where the bands are restored to their desired carrier frequency.

Thus, as described above, the alternate embodiment illustrated generally in FIG. 17 provides that microcell or PCN traffic may be carried over the installed fiber distribution system of an existing cable TV system. In addition, the system illustrates the provision of POTS/data service utilizing the same system. However, the additional provision of POTS/data service is in no way essential for the invention.

Alternate Digital Modulation/Demodulation

Figure 27A:
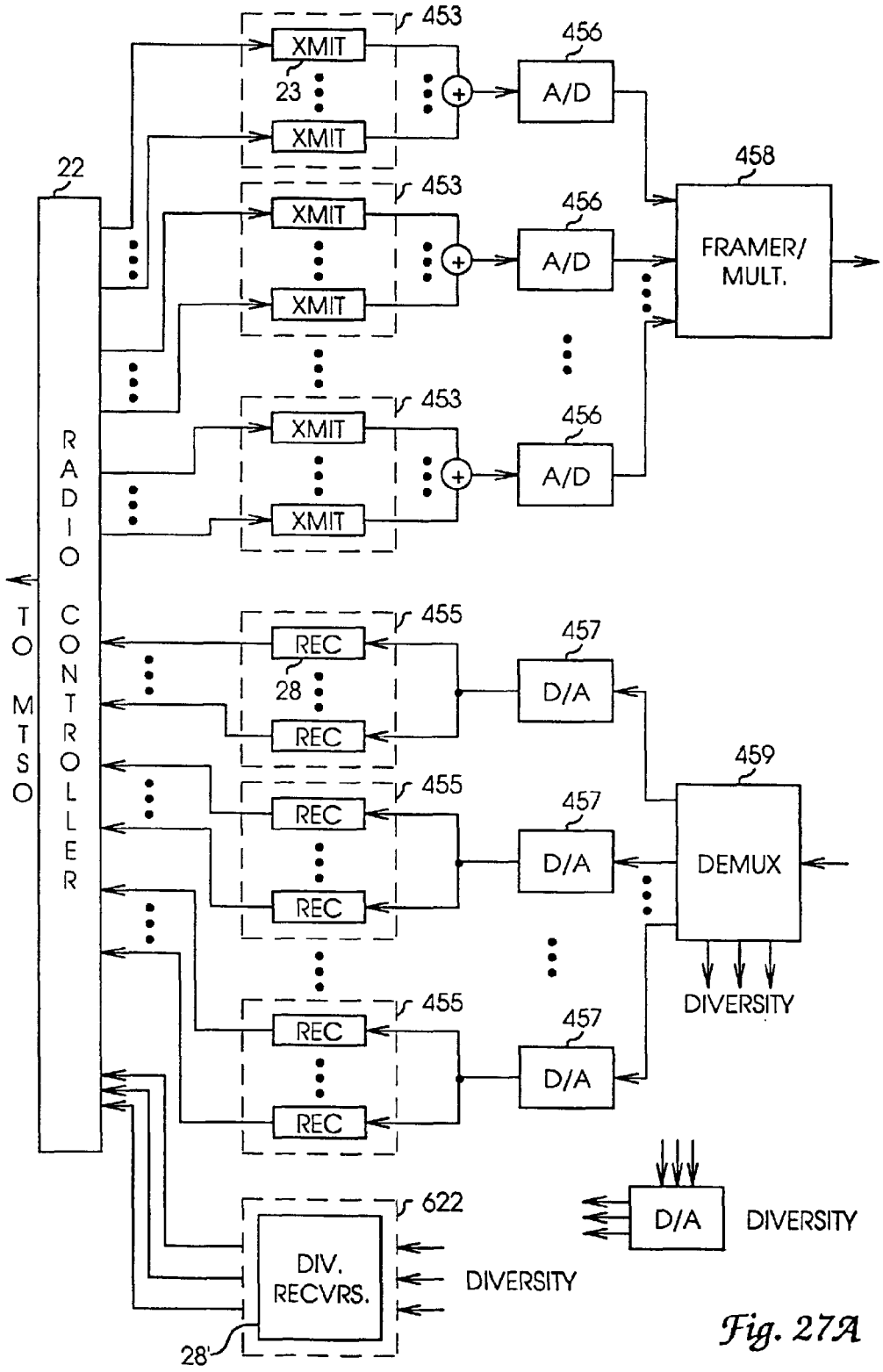
FIG. 27A is an illustration of a base station of an alternate exemplary embodiment of the system illustrated in FIG. 17, wherein the RF microcell or PCN signal is digitally modulated.
Figure 27B:
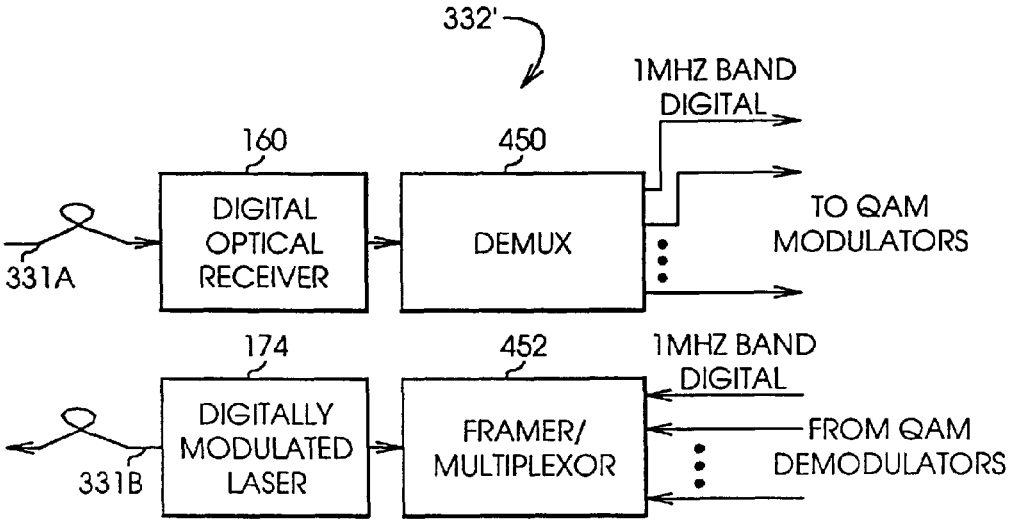
FIG. 27B is an illustration of an alternate embodiment of the system illustrated in FIG. 17, wherein the RF microcell or PCN signal is digitally modulated.
Figure 28:
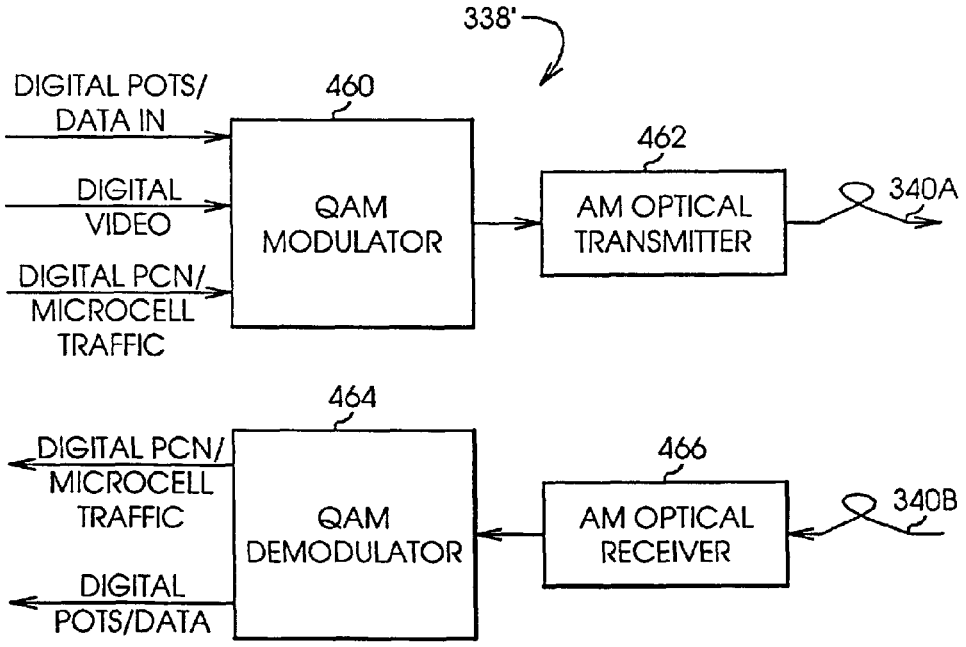
FIG. 28 is a further illustration of the alternate embodiment using digital modulation.

In the above-described system, the digitized RF signal is converted to an analog form prior to being transported to the remote optical node unit 342. According to the alternate exemplary embodiment now to be described, the digitized form of the RF signal may be maintained through to the remote optical node units 342 by use of digital modulation such as QAM modulation. In the alternate exemplary embodiment of FIG. 27A, groups 453 of transmitters apply a combined output to the input of corresponding analog-to-digital converters 456 (including down-conversion to an intermediate or baseband frequency), and the framer/multiplexer 458 frames the digitized transmitter group signals so that these groups may be extracted from the framing structure at the other end of the link. Similarly, a demultiplexer 459 demultiplexes a received signal and applies a corresponding digitized signal to each of analog-to-digital converters 457 (including up-conversion) for application to respective receiver groups 455. Diversity output is also optionally provided. The transmitter groups may, for example, contain up to ten transmitters, so that the combined digitized bandwidth is approximately 1 MHz, consisting of approximately 300 KHz of spectrum digitized at a 2+X rate, plus framing and control bits. The alternate digital modulation embodiment of the head end unit 332' is illustrated in FIG. 27B. Although this embodiment shall be described with respect to QAM modulation, it shall be understood that other forms of digital modulation are also within the scope of the present invention. According to this embodiment, the digitized RF received at the head end unit 332' is demultiplexed in demultiplexer 450, output group by group, and applied in digital form to a plurality of QAM modulators/demodulators 338', as illustrated in FIG. 28. The return traffic from a QAM demodulator 464 is applied to a framer/multiplexer unit 452, which in turn applies the digital signal back to fiber 331B through digitally modulated laser 174.

As illustrated in FIG. 28, QAM modulator 460 receives a digital POTS/data input signal, a digital video signal and a digital PCN/microcell traffic signal. QAM modulator 460 multiplexes the input signals and produces a QAM modulated output signal for application to AM optical transmitter 462, which is in turn applied to fiber 340A. On a return path, AM optical receiver 466 receives a QAM modulated signal from optical fiber 340B and applies an input to QAM demodulator 464. Demodulator 464 demultiplexes the received signal and in turn produces a digital microcell/PCN signal and a digital POTS/data signal.

Figure 29:
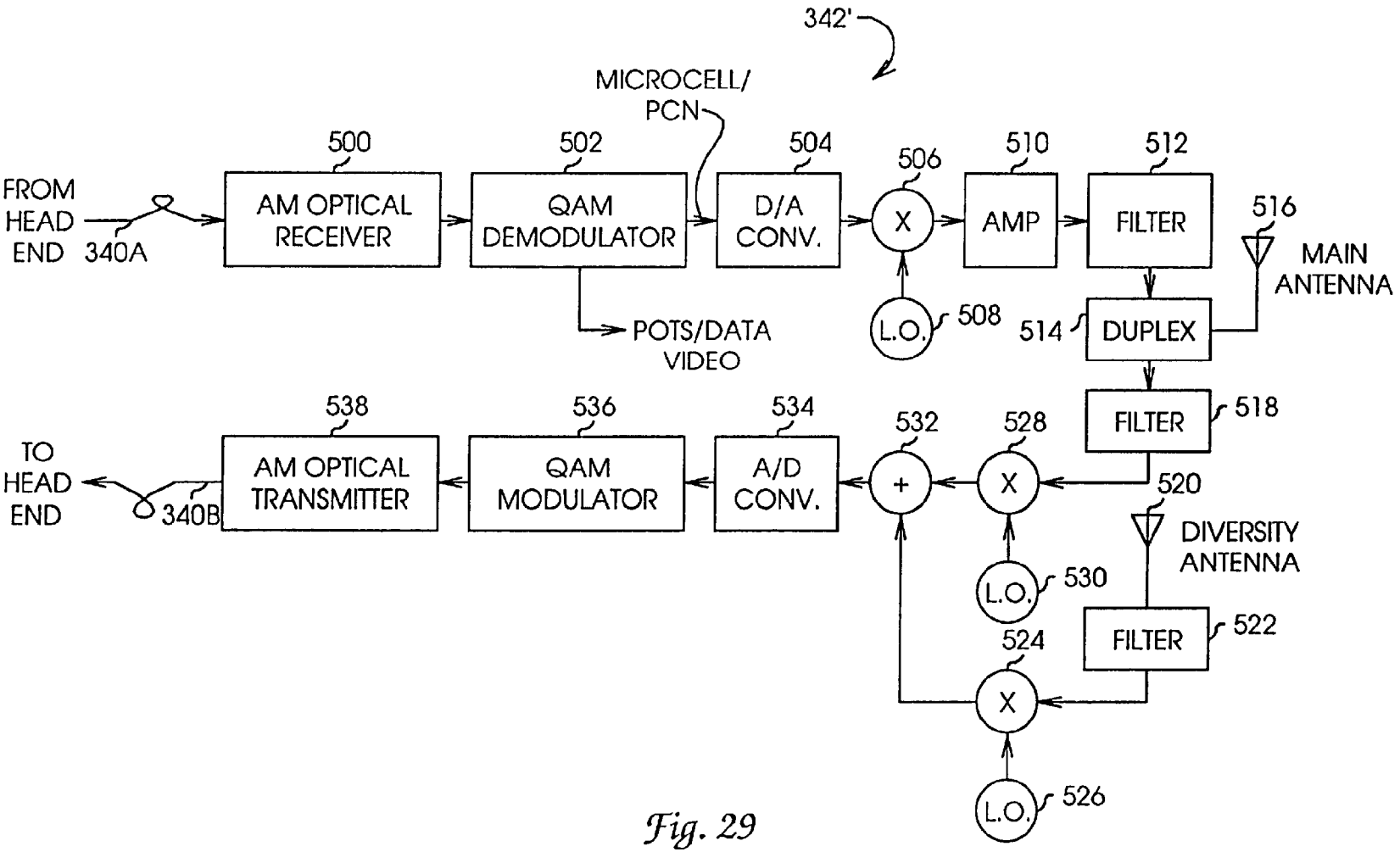
FIG. 29 further illustrates the construction of the optical node in the digital modulation embodiment.

Referring now to FIG. 29 there is shown the alternate QAM embodiment of microcell optical node 342'. Alternate optical node 342' includes an AM optical receiver 500 receiving its input from fiber 340A. QAM demodulator 502 receives an output from AM optical receiver 500 and demultiplexes and demodulates the signal for application to digital-to-analog converter 504. Converter 504 outputs an intermediate or baseband frequency signal which is up-converted with mixer 506 and local oscillator 508 to the transmission frequency. The signal is applied to amplifier 510, filtered with filter 512, passed through duplexer 514 and transmitted from the main antenna unit 516. On the return path, the RF signal is received at the main antenna unit 516, passed through duplexer 514, filtered at filter 518 and applied to a down-converter, comprising mixer 528 and local oscillator 530. A diversity antenna 520 is optionally provided together with filter 522 and a down-converter comprising a local oscillator 526 and mixer 524. The main antenna signal and diversity antenna signals are combined using combining circuit 532 and applied to analog-to-digital converter 534. The output of analog-to-digital converter 534 is applied to QAM modulator 536, which applies its output to AM optical transmitter 538, which in turn applies its output to fiber 340B for transmission to the head end.

Thus, as described above, this alternate exemplary embodiment provides a system for maintaining the RF or PCN signal in digital format all the way to the optical node unit 342. It thus can advantageously provide a higher quality signal than might otherwise be obtained with AM modulation schemes.

Transmission of Digitized RF Over Switched Telephone Network

Figure 30:
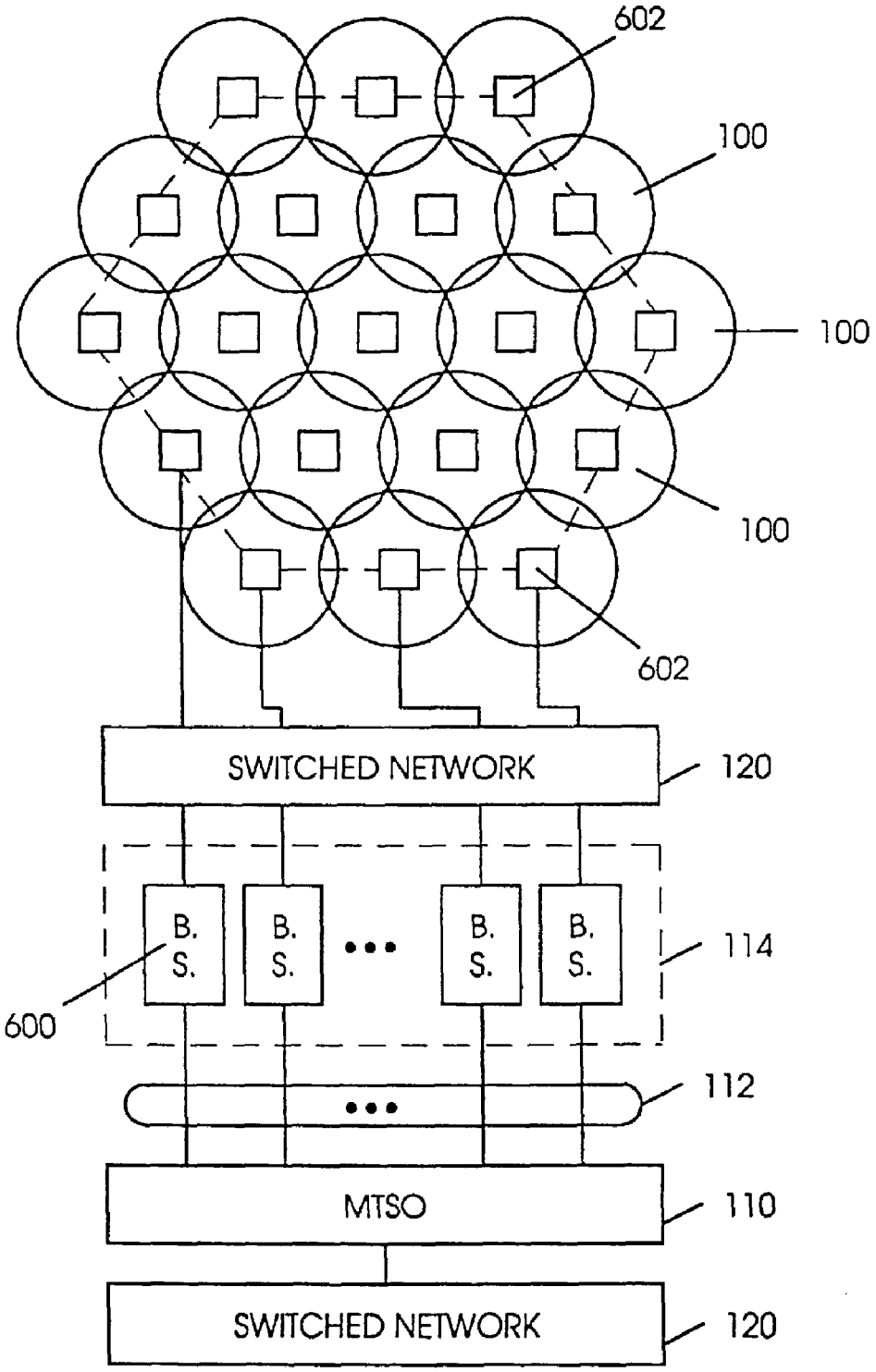
FIG. 30 is an overview diagram of yet another exemplary embodiment wherein digitized microcell or PCN RF traffic is framed and transmitted over a switched telephone network.
Figure 31A:
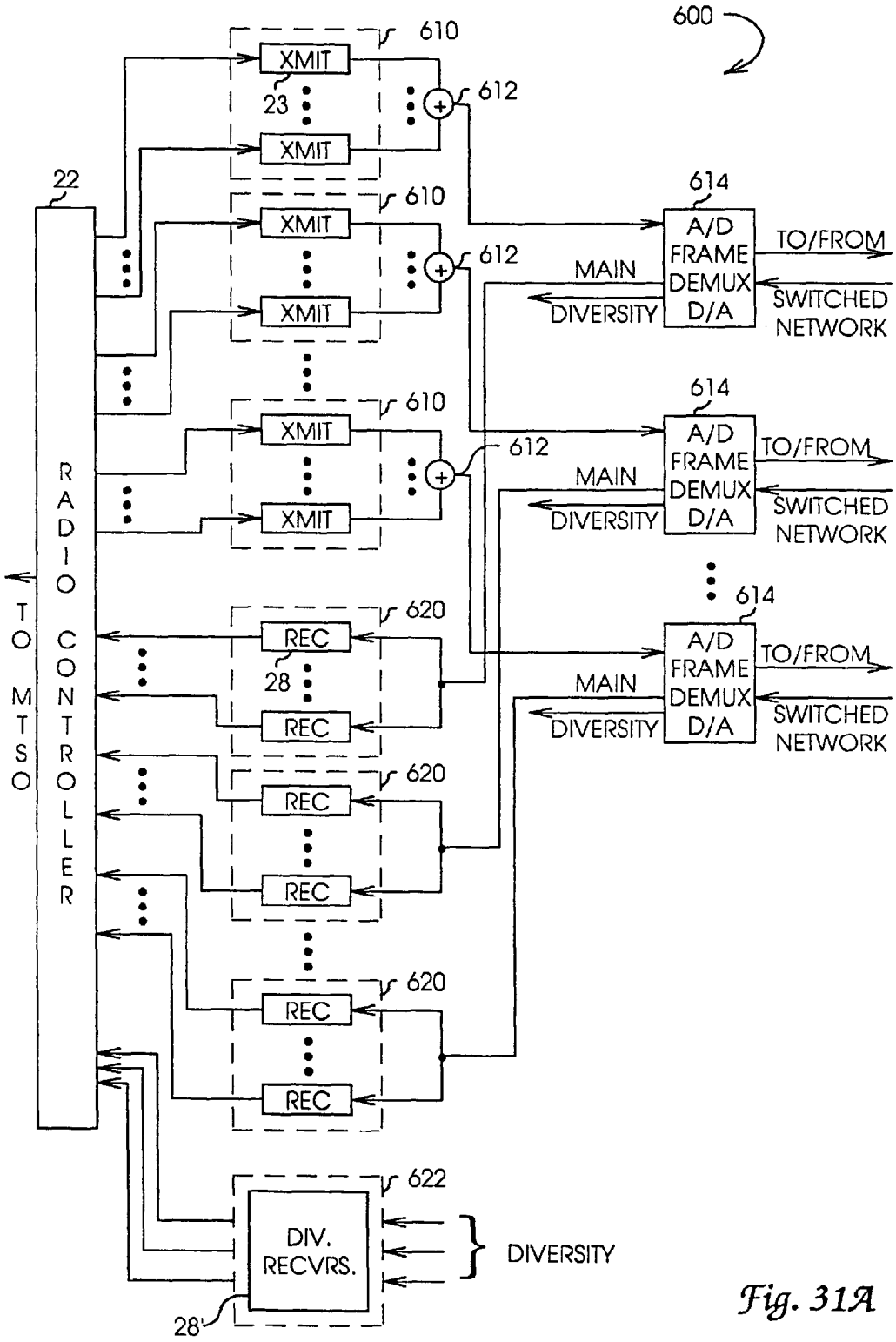
FIG. 31A is a more detailed block diagram of the base station units of the embodiment of FIG. 30.

Yet another alternate exemplary embodiment of the present invention is shown in FIG. 30. In FIG. 30, base station units 600 are connected to the remote antenna units 602 through a switched telephone network 120, as illustrated in more detail in FIGS. 31A, 32A, 33A and 34. As illustrated in FIG. 31A, each base station unit 600 includes radio controller and T1 interface circuitry 22 receiving a plurality of PCN or microcell channels from the MTSO. The output of each of a plurality of groups 610 of transmitters 23 are combined at combining circuit 612 for application to an analog-to-digital and digital-to-analog converter/framing/demultiplexing circuits 614. Groups 620 of receivers 28 receive an analog signal output from circuits 614. Each of circuits 614 also produces an analog diversity signal, which is applied to a group 622 of diversity receivers 28'.

Each of circuits 614 functions to convert the analog RF (after suitable down-conversion) to a digital signal which is framed and applied to the switched telephone network. In addition, each of circuits 614 receives a signal from the switched network, which it demultiplexes and converts back to a corresponding analog RF signal, for application to a respective receiver group 620 or diversity receiver 622.

In the exemplary embodiment illustrated herein, it is contemplated that approximately ten 30 KHz, PCN or AMPS cellular channels (given current 7 channel spacing requirements) may be digitized into a respective 1.05 or 1.25 MHz bandwidth which may be formatted as a 44.736 Mb/s DS-3 or OC-1 signal for application to the switched telephone network through a T1 line or optical fiber link, with bits available for control and error detection. AMPS, or Advanced Mobile Phone Service, is the original and standard format for cellular service consisting of frequency modulated (FM) channels at 30 KHz spacings. However, the system could carry 15 to 18 time division multiple access (TDMA) signals, or a combination of AMPS and TDMA signals could be carried. As is well known to those of skill in the art, TDMA is an alternative modulation technique for cellular which replaces each AMPS channel with three time-multiplexed digital signals. Hence 5 to 6 AMPS channels are 15 to 18 TDMA channels.

Figure 32A:
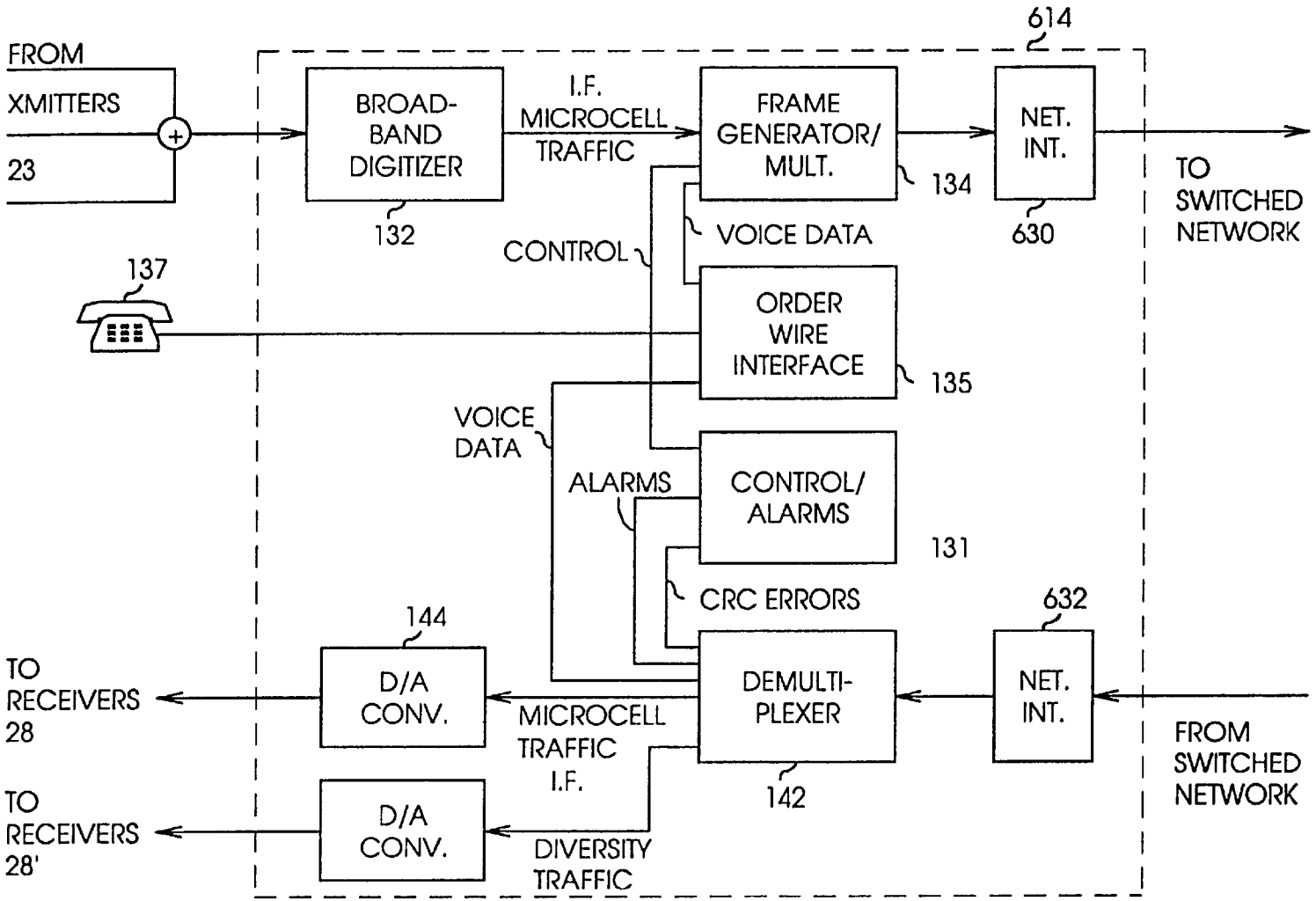
FIG. 32A is a more detailed block diagram of the analog-to-digital converter and framing circuits of the base station units illustrated in FIG. 31A.

Referring now to FIG. 32A, there is illustrated in more detail circuit 614. Circuit 614 is essentially identical to circuit 130, as illustrated with regard to FIG. 4, but includes a network interface circuit 630 and 632 in place of digitally modulated laser 136 and digital optical receiver 140, respectively. Interface circuits 630 and 632 provide the necessary T1 interface or interface to an optical path.

Figure 33A:
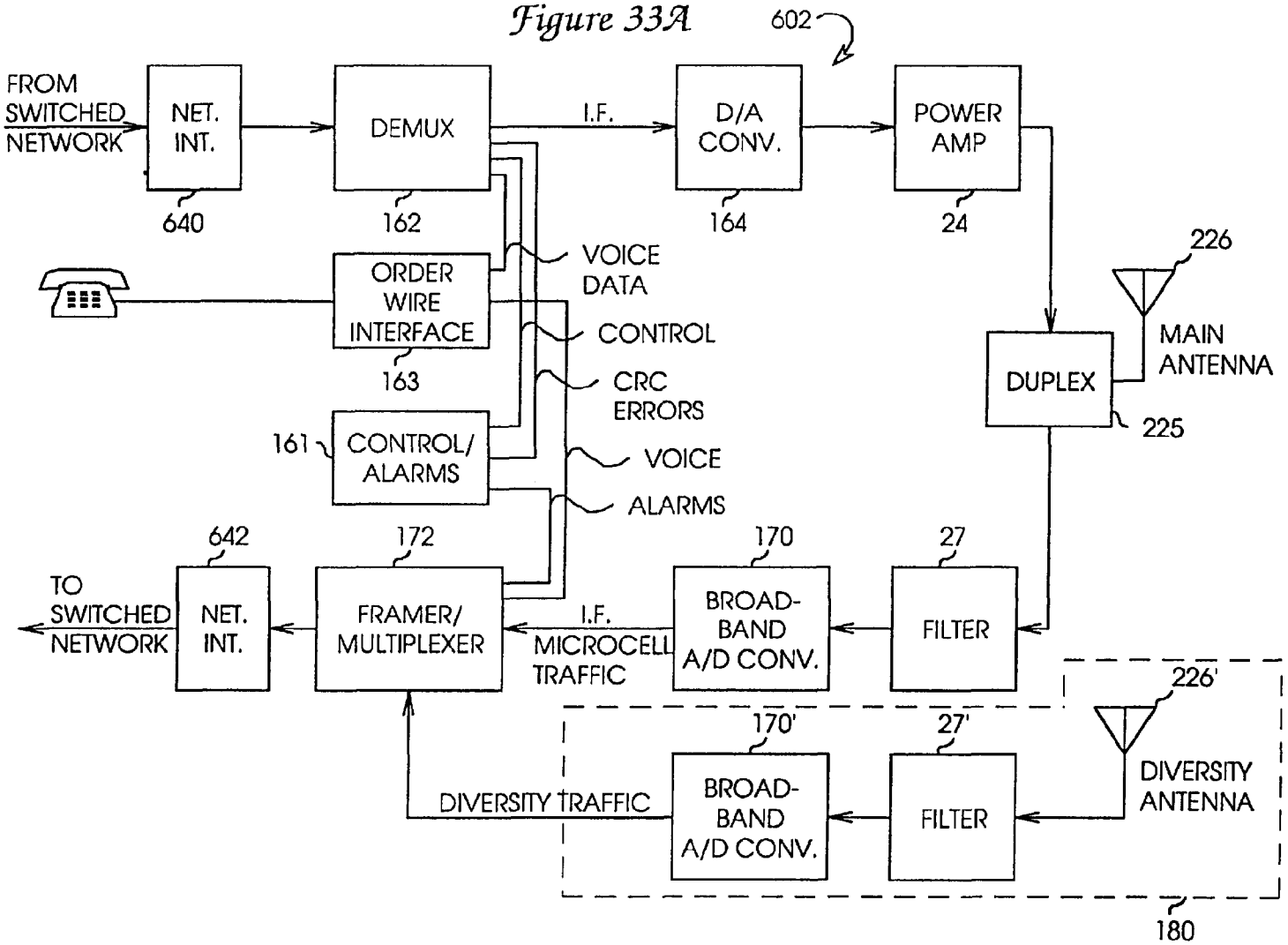
FIG. 33A is a more detailed block diagram of the remote antenna units of the system illustrated in FIG. 30.

The remote antenna units 602 are illustrated in more detail in FIG. 33A. Antenna units 602 are essentially identical in construction to the remote antenna units 102 as illustrated with respect to FIG. 8. However, in place of the digital optical receiver 160 and digitally modulated laser 174, there are provided network interfaces 640 and 642 for interfacing to the switched network 120.

The same framing structure illustrated above with respect to FIGS. 6,7,22 and 23 are applicable to this exemplary embodiment of the invention, except at lower speeds as necessary. In the case where the diversity function is provided, the return path would include additional DS-3 or OC-1 signals, requiring additional T1 or SONET line capacity on the return path.

Figure 31B:
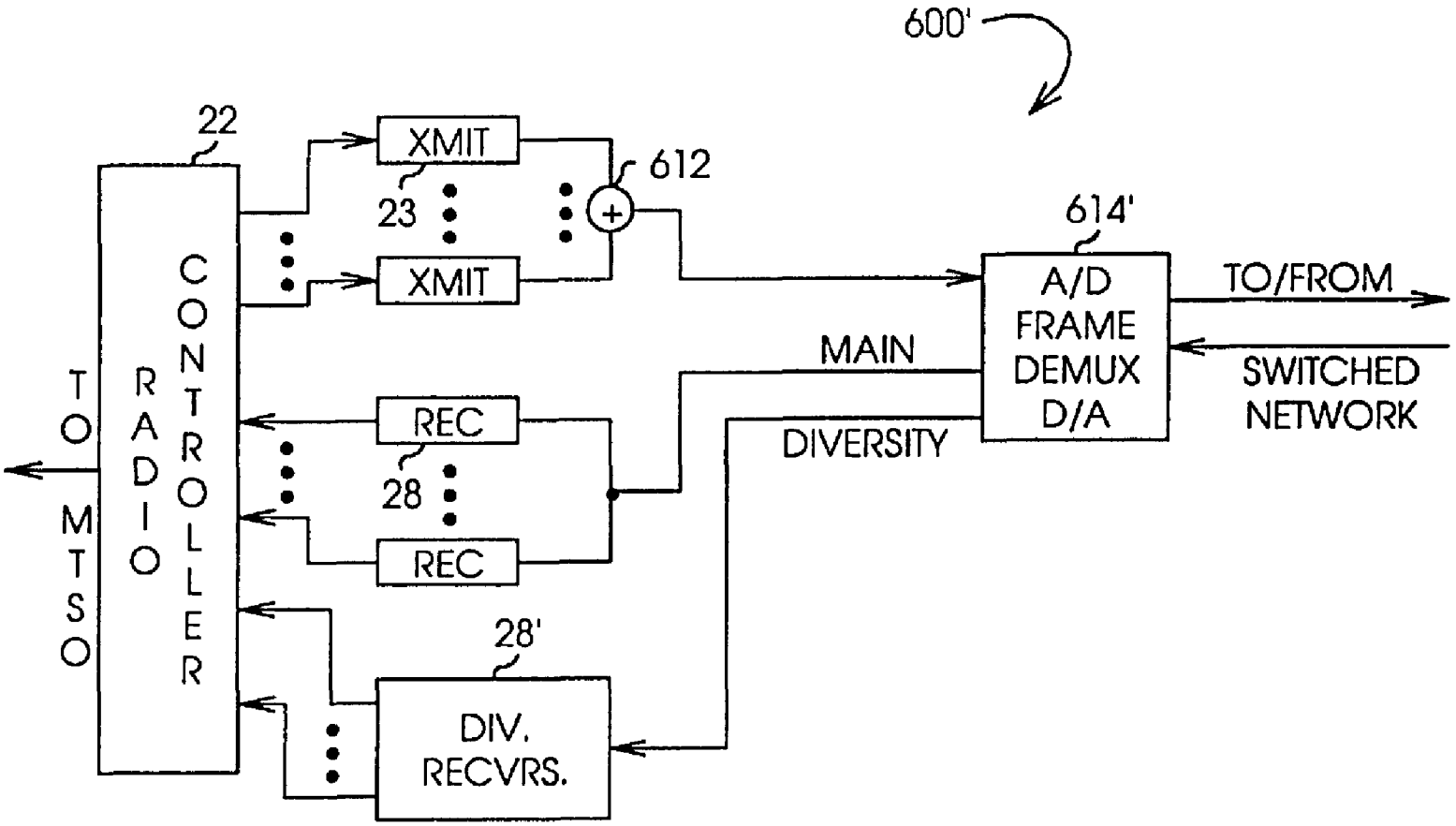
FIG. 31B is an alternate exemplary embodiment of the base station units of the embodiment of FIG. 30.
Figure 32B:
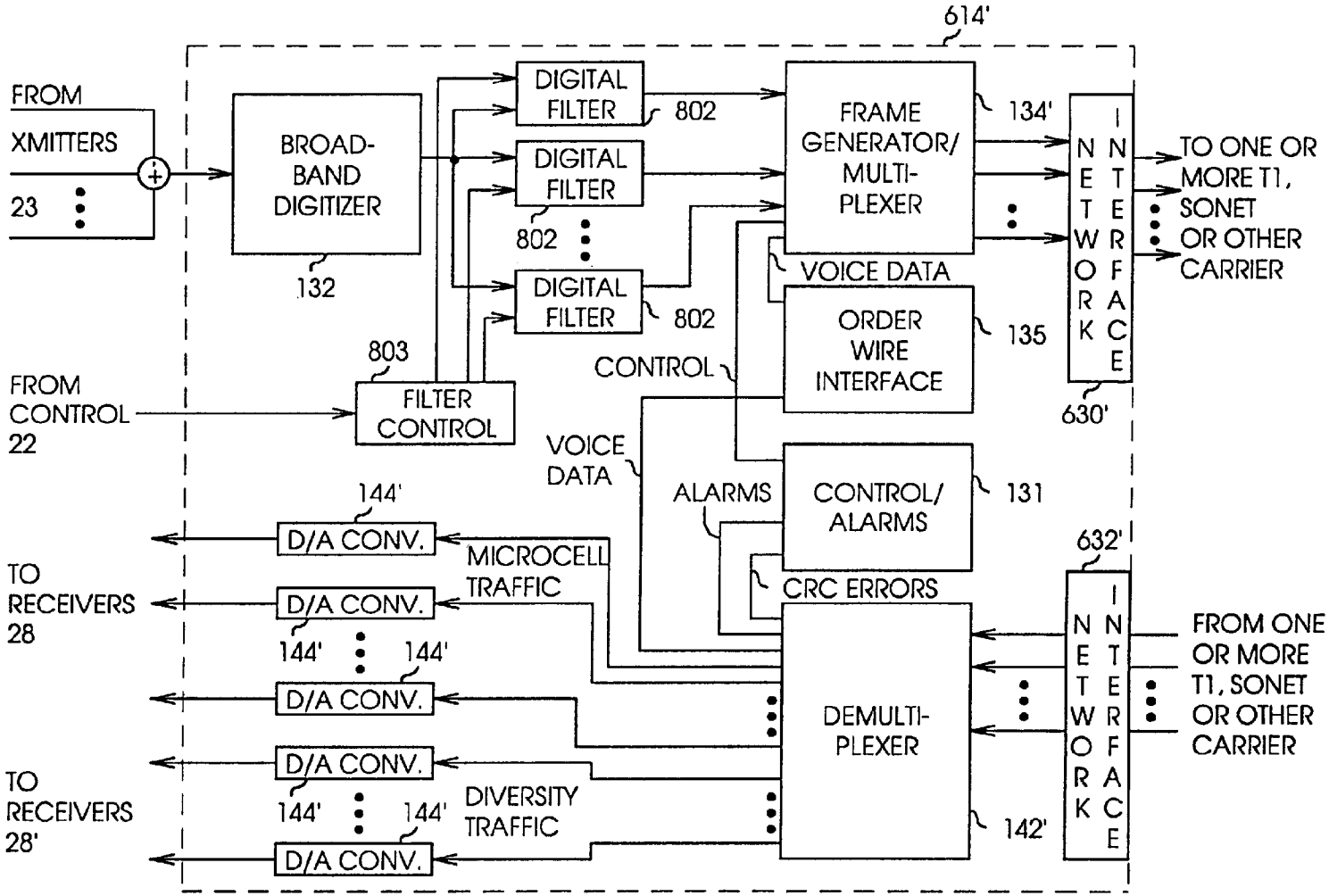
FIG. 32B is a more detailed block diagram of the analog-to-digital converter and framing circuits of an alternate exemplary embodiment of the base station units illustrated in FIG. 31B.
Figure 33B:
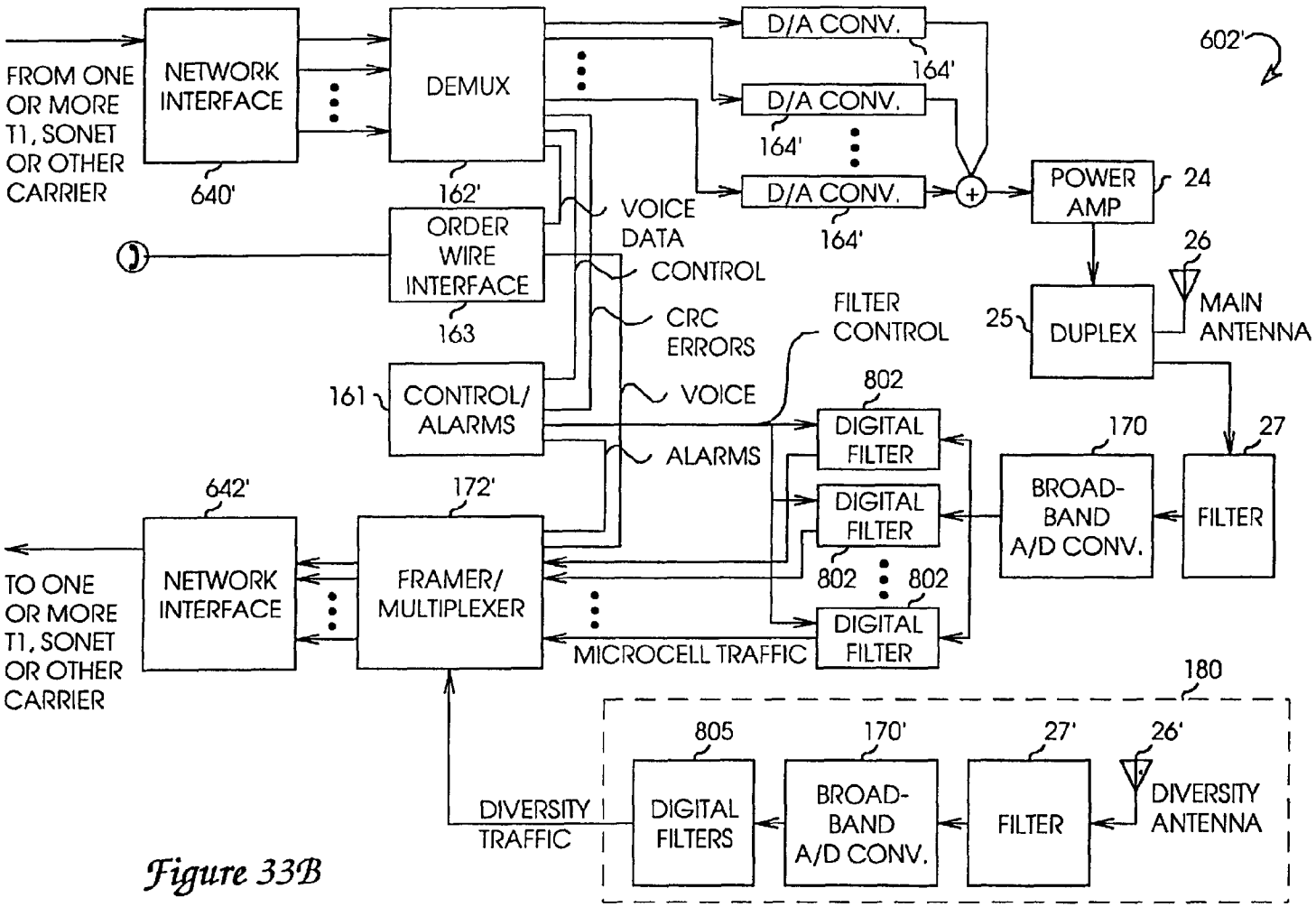
FIG. 33B is a more detailed block diagram of an alternate exemplary embodiment of the remote antenna units of the system illustrated in FIG. 30.

Referring now to FIGS. 31B, 32B and 33B, there is shown an alternate exemplary embodiment 600' of the base station 600 illustrated in FIG. 30. Alternate embodiment 600' provides that all the transmitters 23 in the base station are applied to unit 614', which is illustrated in FIG. 32B. Similarly, unit 614' services all of the receivers 28 and 28' in the base station. Thus, the embodiment of FIG. 31B differs from the embodiment of FIG. 31A in that a single unit 614' is provided for the base station, and the transmitters and receivers are ungrouped.

Referring now to FIG. 32B, there is illustrated analog-to digital and digital-to-analog converter/framing/demultiplexing unit 614'. Unit 614' receives the combined input from all the transmitters 23 in the base station 600'. A broadband digitizer 132 digitizes the combined signal. The output of broadband digitizer 132 is applied to the plurality of digital filters 802. Digital filters 802 each preferably include a decimation filter and a finite impulse response (FIR) filter. Decimation filter 802A receives the 30.72 MSamples/s (12-bit wide) data stream and produces a digitized data stream corresponding to the output of one of the transmitters 23 (i.e. one of the channels) consisting of an approximately 80 KSamples/s data stream, with 12-bit samples. The 80 KSamples/s rate corresponds to a sampling rate of 2.4×, of a 30 KHz signal (the channel width). However, any rate of at least 2× satisfying the Nyquist criterion can be used.

Decimation filter 802 is preferably, for example, a decimating digital filter, Part Number HSP 43220, available from Harris Semiconductor, Inc. of Melbourne Fla. Another vendor of such filters may be ESL, a division of TRW, Inc. Referring back to FIG. 32B, each digital filter 802 is programmed to filter out of the broadband signal from digitizer 132 a channel corresponding to one of transmitters 23. Accordingly, a base station installation with twenty transmitters would require twenty digital filters 802, to extract the digitized data stream corresponding to each transmitter. Broadband digitizer 132 digitizes the entire microcell traffic spectrum, which is, in the case of the original AMPS system, 12.5 MHz wide. In the case of twenty channels, the bandwidth to be transported can thus be greatly reduced to 600 KHz, from 12.5 MHz. Thus, digital filters 802 greatly reduce the amount of data to be transmitted over the switched network.

A frame generator/multiplexer of generally the same design as generator multiplexer 134', is provided to multiplex the data stream from each digital filter 802 onto one or more T1, SONET or other carriers. For instance, a single channel of 72 KSamples/s, with 12-bit samples, constitutes an 864 Kb/s serial data stream. Adding framing and control bits, as, for example, illustrate in FIG. 22 or 23 (with, for example, a 1-bit CRC channel, a 1-bit alarm-control/under wire channel and a frame word of 6 bits) produces a serial data stream of approximately 1.54 mb/s (20 bits×72 KHz).

Frame generator/multiplexer 134' can thus multiplex the output of one of digital filters 802 into a DS1 format on a T1 carrier with a capacity of 1.55 mb/s, or can combine multiple outputs of digital filters 802 on a 44.736 Mb/s DS-3 or OC-1 signal for application of the switched telephone network.

A filter control circuit 803 is also provided in unit 614', and has an input to each of digital filters 802. Filter control 803 allows digital filters 802 to be programmed, so that their filtering characteristics (and channel selection) may be selectively changed, if desired. Filter control 803 further includes an input from radio controller 22, which may provide control input, in order to specify the channels to be extracted from the data stream. A network interface circuit 630', interfaces frame generator/multiplexer 134' to the switched telephone network.

Referring now to FIG. 33B, there is shown alternate embodiment 602', which operates in conjunction with alternate embodiment 614'. A network interface circuit 640' receives one or more T1, SONET or other carriers from the switched telephone network, carrying digitized microcell traffic produced by frame generator/multiplexer 134'. The digitized data stream(s) are applied to demultiplexer 162', of generally the same design as demultiplexer 162, which extracts the digitized stream from each carrier, channel by channel, and applies each individual extracted channel to a separate one of digital-to-analog converters 164'. The outputs of converters 164' are combined, and applied to power amplifier 24, to be broadcast through antenna 26. Each of digital-to-analog converters 164' may be of the same design as digital-to-analog converter 164 of FIG. 21B. However, unlike digital-to-analog converters 164, digital-to-analog converters 164' need only handle a single channel, and thus may possibly be of less exacting design.

Alternate embodiment of remote unit 602' further includes a plurality of digital filters 802, which operate in the same manner as digital filters 802 of base station unit 614' to extract selected microcell digitized channels from the output of the broadband digitized signal from the output of broadband analog-to-digital converter 170. Framer/multiplexer 172', of generally the same design as multiplexer 172, operates in a manner similar to frame generator/multiplexer 134' to multiplex the extracted channels onto one or more T1, SONET or other carriers, applied to the switched telephone network through network interface 642'.

Referring again to FIG. 32B, demultiplexer 142', of generally the same design as demultiplexer 142, receives the multiplexed signals from remote unit 602' through network interface 632'. Unit 142' demultiplexes each of the channels and applies a single channel to each of digital-to-analog converters 144', which may be of similar design to digital-to-analog converters 164'. The output of digital analog converters 144' may be applied to receivers 28.

As illustrated in FIG. 33B, remote unit 602' may also include a diversity path with digital filters 805 provided to extract the diversity channels from the digitized diversity signal. The extracted channels may be multiplexed through framer multiplexer 172' onto the switched telephone network. In base station unit 614', a diversity path is provided from demultiplexer 142', whereby extracted diversity channels may be applied to diversity receivers 28'. Thus, as described above, the alternative embodiment illustrated in FIGS. 31B, 32B and 33B provides digital filters to extract selected microcell channels from the broadband digitized signal travelling to and from the remote units 602'. The extraction of selected channels provides that a much more limited bandwidth capacity is required to carry the signals from transmitters 23 to the remote units and return the received channels from the remote units to the base station.

In yet another alternate embodiment, the system of FIG. 11 is modified to transport the digitized signals over the switched telephone network, as for example illustrated herein above.

Network Interface to Cable System

Figure 34:
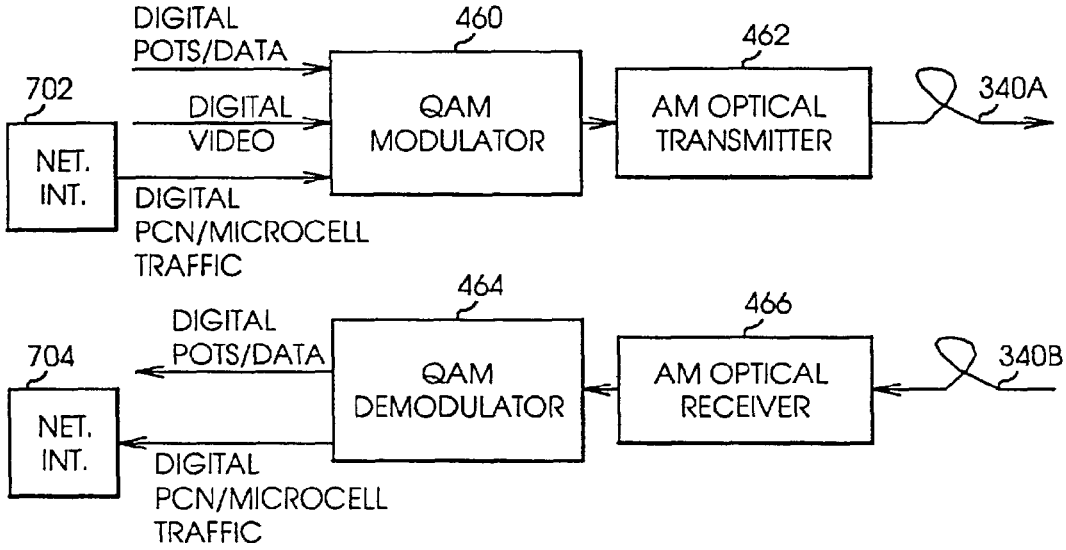
FIG. 34 illustrates yet another exemplary embodiment of the invention wherein digitized RF signals are transmitted over a switched telephone network and a cable system.

FIG. 34 illustrates yet another alternate exemplary embodiment of the present invention, wherein the transmission of digitized RF over the switched telephone network is combined with the transmission of the RF signal over the cable system. More specifically, as shown in FIG. 34, a network interface 702 is provided at the head end unit to receive digital PCN/microcell traffic off the switched telephone network. That traffic is applied to QAM modulator 460 and AM optical transmitter 462 (see FIG. 28). Similarly, network interface circuitry 704 provides for application of digital PCN or microcell traffic to the switched network, as it is received from QAM demodulator 464. Thus, signals originating from a base station 600 can be carried through the switched network to the cable system and back again.

Thus, as described above, this alternate exemplary embodiment of the invention provides that PCN or microcell traffic may be conveniently carried over a switched telephone network. This operation has obvious advantages, permitting rapid installation of additional capacity, rather than the necessity of installing additional transmission lines.

Thus, these alternate exemplary embodiments provide for an ability to transmit radio frequency microcell or PCN traffic through a switched network and through a cable system installation.

Various modifications and alternate configurations of the embodiments of FIGS. 17 through 34 are contemplated. An all digital configuration (similar to the embodiment of FIG. 10) of the embodiment of FIG. 17 or FIG. 27A eliminates the transmitters, receivers and analog-to-digital and reverse conversion in the base station 330. An all digital configuration for the embodiment of FIG. 30 eliminates these analog components from the base stations 600. The method of installing and upgrading from the analog embodiments to the all digital embodiments can be carried out substantially as described above with regard to the embodiments of FIGS. 2-15. Other modifications to the embodiments of FIGS. 17 through 35 include wave division multiplexing so that the fiber pairs may be replace with a single fiber.

Passive Handoff System

Figure 35A:
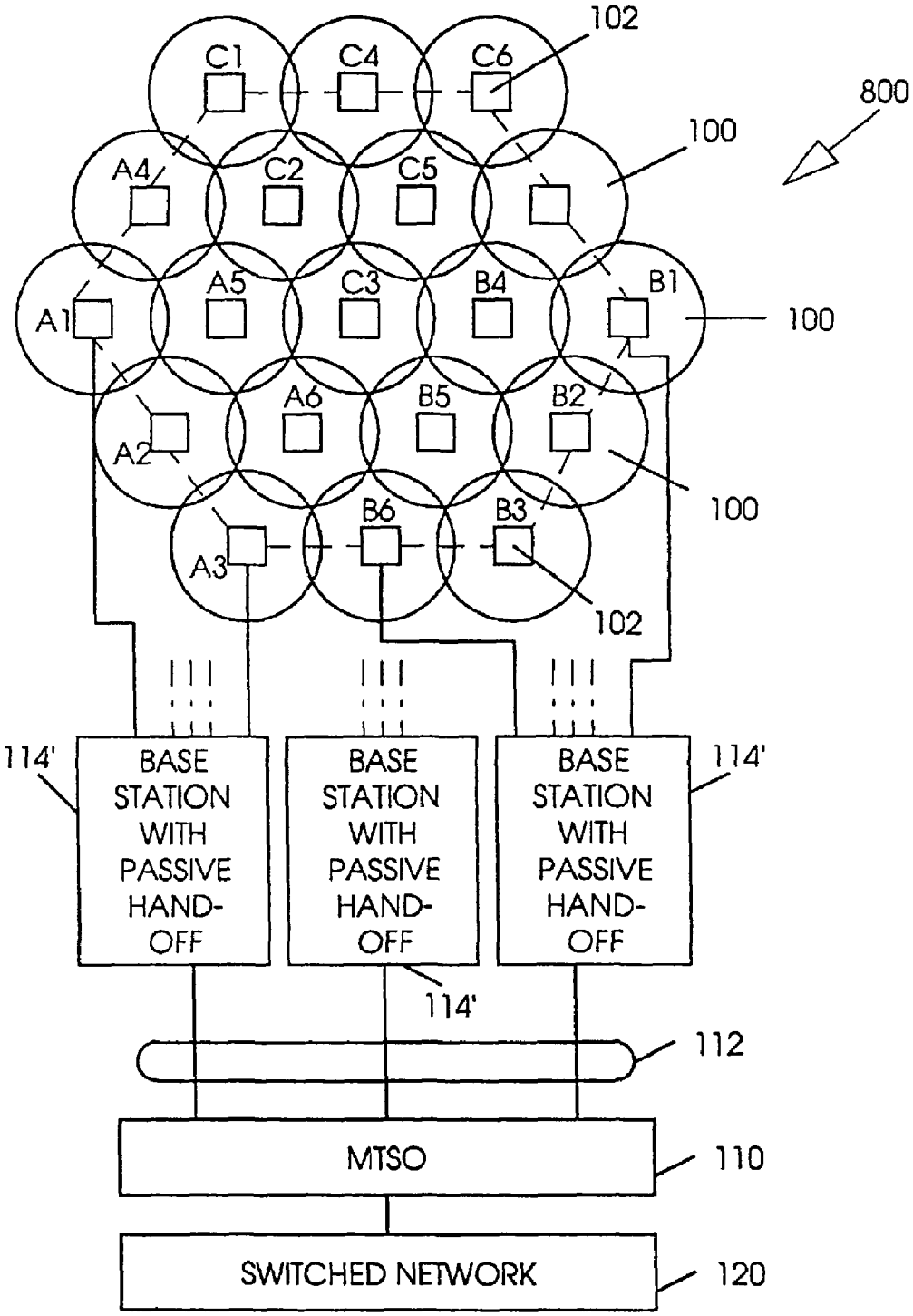
FIG. 35A is an overview functional block diagram of an exemplary embodiment of a microcell communications system, having passive handoff capability according to the present invention.

Referring now to FIG. 35A there is illustrated an exemplary embodiment of a passive handoff microcell telecommunications system 800. The system shown in FIG. 35A is of like construction to that of FIG. 2 with the exception of base station units 114', which are constructed as shown in FIG. 35B to provide passive handoff switching.

For the purposes of describing system 800, microcell areas 100 are referred to as "microcell zones," which zones are labeled for the purposes of one exemplary embodiment as A1-A6, B1-B6 and C1-C6. Each zone includes an independent antenna for transmitting to and receiving from mobile units. Zones A1-A6 collectively comprise "Cell A," zones B1-B6 collectively comprise "cell B," and zones C1-C6 collectively comprise "cell C." Each cell A, B and C has a set of reusable frequencies to be used within the cell, according to conventional cellular system design. Passive handoff system 800 provides that a transmission frequency or channel assigned to a mobile unit in a given cell may be broadcast from the remote unit 182 in any one of microcell zones 100 under the control of a unit 114' without interaction with or control from MTSO 110. A channel can thus follow a mobile telephone unit from one microcell zone to another within a given cell. Accordingly, multiple microcell zones may be served by the same set of channels (i.e. transmission frequencies) allowing the signal transmission power level within each zone to be minimized, and thereby avoiding undesirable interference with adjoining microcell zones or cells. The system also reduces the switching load on MTSO 110. However, when a mobile unit travels from one cell to another, MTSO 110 switches the unit to a new channel (and corresponding pair of transmit and receive frequencies) in the newly entered cell, in a conventional manner.

Figure 35B:
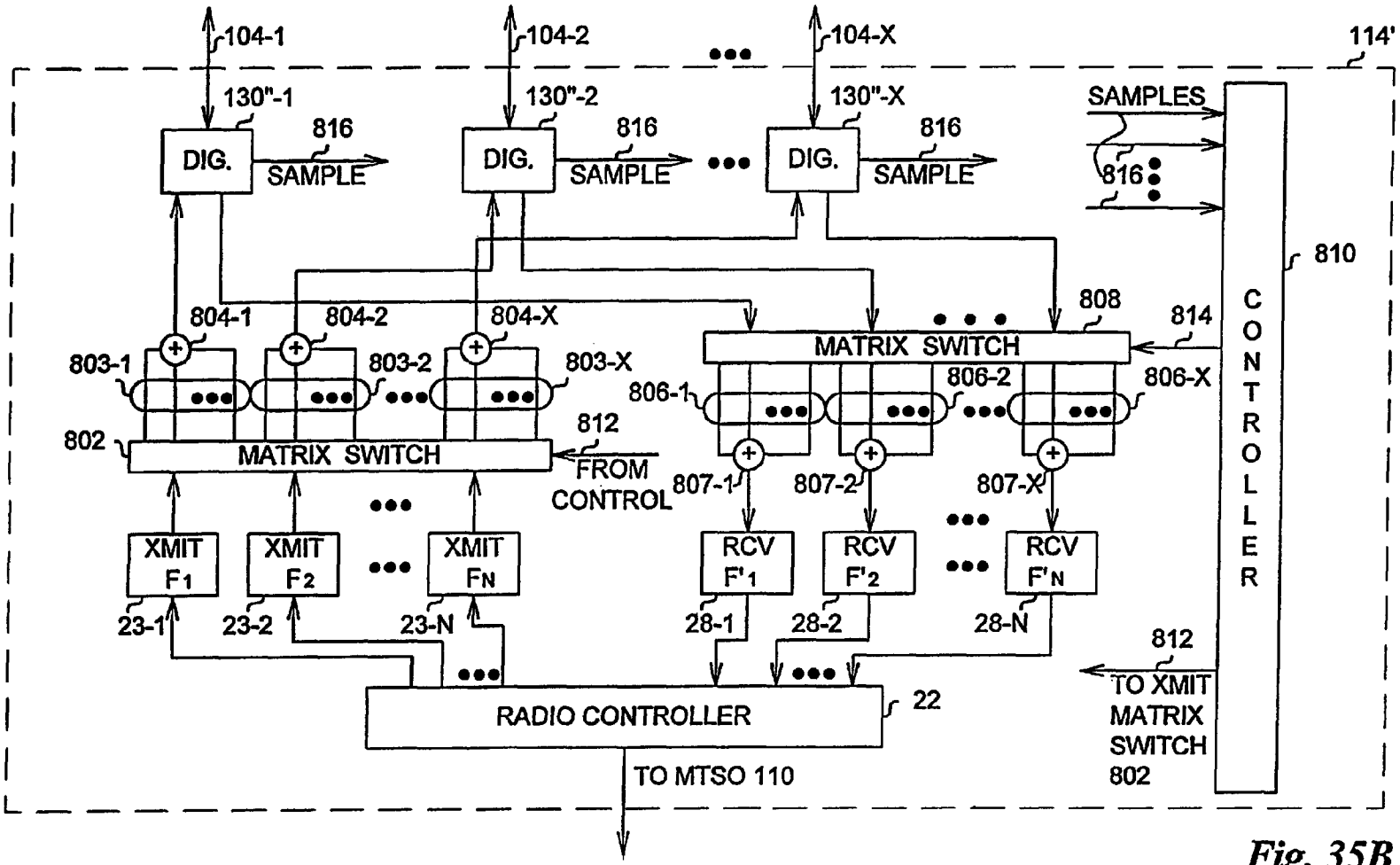
FIG. 35B is a more detailed block diagram of an exemplary base station unit 114' of the system of 35A according to the present invention.
Figure 35C:
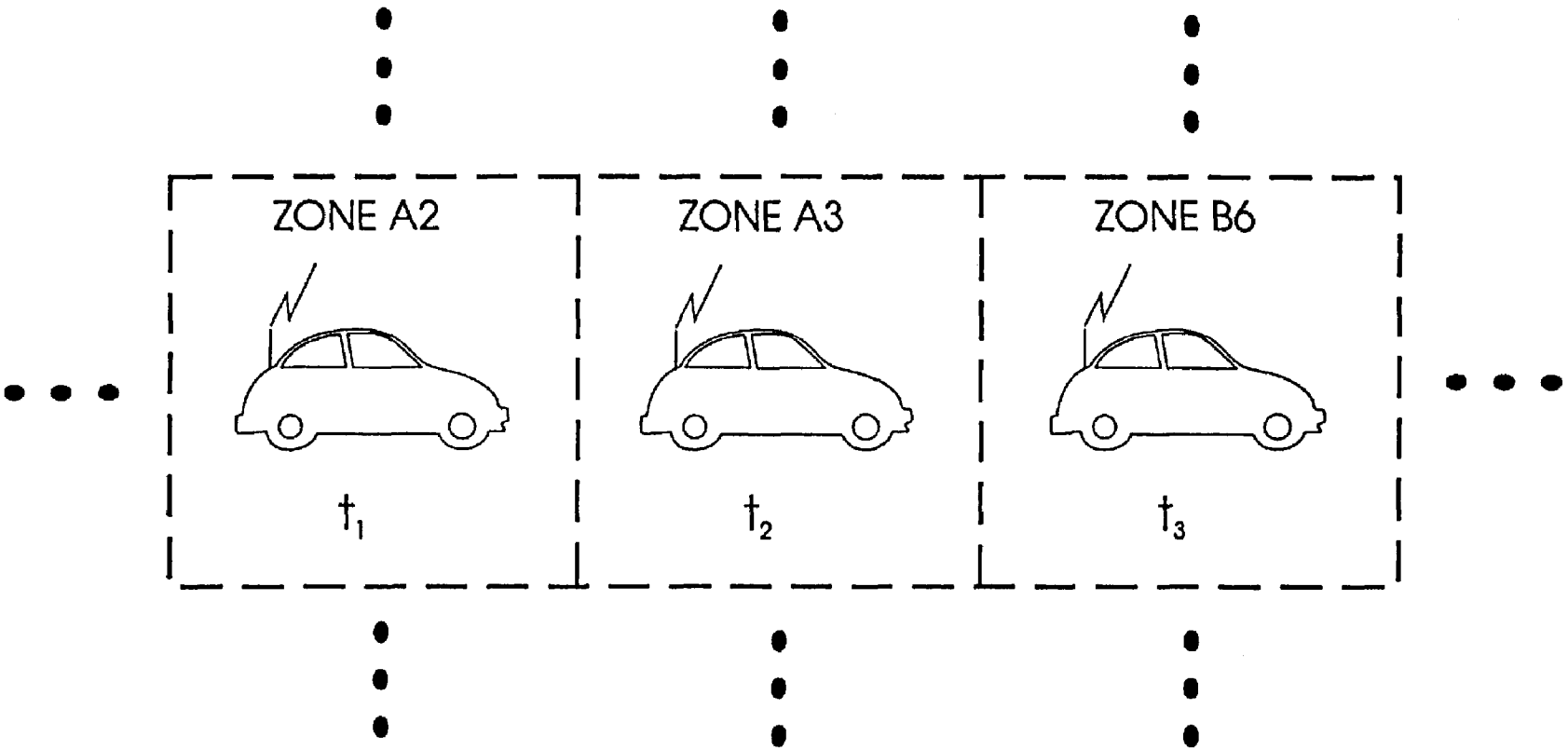
FIG. 35C is a schematic illustration of the movement of a mobile unit from one zone to another.

Referring now to FIG. 35B, there is shown in more detail a base station unit 114' according to the present invention. Unit 114' includes a radio controller 22 providing an interface between the T1 lines from the MTSO 110 and the base station radio equipment. Transmitters 23-1 to 23-N (where N is a positive integer) are connected to a matrix switch 802, the outputs of which are in turn connected to a plurality of combining circuits 804-1 to 804-X (where X is a positive integer), which are in turn connected respectively to a plurality of digital transmitting/receiving units 130"-1 to 130"-X. Units 130"-1 to 130"-X are connected to the microcell areas 102 over respective transmission paths 104-1 to 104-X, as illustrated in FIG. 35A.

The respective outputs of transmitter/receiver digitizing units 130" carrying the analog microcell traffic, are each applied to matrix switch 808. Matrix switch 808 selectively connects any input to any one of receivers 28-1 to 28-N through respective outputs 806-1 to 806-X, and combining circuits 807-1 to 807-X. A controller 810 controls matrix switch 802 and matrix switch 808 using respective control lines 812 and 814. Controller 810 receives a sample of digitized microcell traffic from each of the digitization units 130' over sample lines 816.

As described in more detail below, controller 18 continuously processes the digital samples received from units 130" and in response thereto controls matrix switches 802 and 808 in order to switch each of transmitter units 23 through to one (or more or none) of units 130" and to connect receivers 28 to one (or more or none) of units 130". For instance, in one exemplary switching configuration, matrix switch 802 might connect all three transmitters 23-1, 23-2 and 23-N through outputs 803-1 to combiner circuit 804-1, so that all three transmitter frequencies $F_1$, $F_2$, and $F_n$ are combined and applied to unit 130"-1 for digitization and transport to a microcell zone. In another configuration, transmitter 23-1 and might be connected to combiner 804-X through one of outputs 803-X, while transmitter 23-2 is connected to combiner 804-2 through one of outputs 803-2, and transmitter 23-X is connected to combiner 804-1, through one of outputs 803-1. Matrix switch 802 thus allows any one of transmitters 23 to be connected to any one of combiners 804, in any combination.

Switch 802 thus permits a transmission frequency to "follow" a mobile unit from one microcell zone to another. For example, with reference to FIG. 35C consider a mobile unit 820 which initiates a cellular telephone call at a time $T_1$ within zone A1. In the example, mobile unit 820 is located in a car. However, it can be hand-carried or otherwise transported from zone to zone. To set up calls and perform control, the control channel(s) for a cell A, B or C is simultaneously transmitted to and received from all zones in the respective cell, as accomplished by switches 802 and 808. Upon call set up, which is accomplished in a conventional fashion, as for example described in "Mobile Cellular Telecommunications Systems", by William C. Y. Lee, MTSO 110 assigns mobile unit 820 to a currently available channel, for example the frequencies handled by transmitter 23-1 and receiver 28-1 (assuming a transmitter/receiver pair is currently available for assignment). MTSO 110 is programmed to recognize that the channels associated with transmitters 23-1 to 23-N and receivers 28-1 to 28-N are assigned, collectively, to cell A, which in this example consists of zones A1-A6. During the initial set up the assigned transmit and receive channels can be transmitted to received from all zones in the cell, at least until it can be determined which zone can handle the call exclusively.

Thus, as initially set up, mobile unit 820 transmits and receives on frequencies $F_1$ and $F'_1$, respectively. Controller 810 constantly monitors the signal strength of transmissions from mobile units 820 in all zones in Cell A as received at the antenna units of the remote units 102 positioned in the zones. Signal strength in each zone is detected by sampling the digitized RF microcell traffic returning from remote units 102 to units 130". While mobile unit 820 is within microcell zone A1, the strength of the received signal $F'_1$ is likely the greatest because of the proximity of mobile unit 820 to the antenna unit of remote unit 102-1 in zone A1. Frequency $F'_1$ might, however, also be received at the antenna of remote unit 102 in zone A2, or in the more distant zone A3. Control unit 810 monitors the strength of received signal $F'_1$ in all of the digitized microcell traffic streams received from all of remote units 102 in the Cell A, and, according to at least one exemplary approach, identifies the remote unit 102 which receives the strongest signal at frequency $F'_1$. Assuming for this example, that the signal $F'_1$ received at the remote unit 102 in zone A1 is the strongest among the zones, controller 810 signals matrix switch 802 to connect transmitter 23-1 to combiner 804-1, which in turn applies its output to digitizing 130"-1. Unit 130"-1 in turn transmits the digitized microcell traffic stream containing the frequency $F_1$ to the remote unit in zone A1, which in turn broadcasts frequency $F_1$ in zone A1 (along with any other frequencies switched into the combiner 804-1). On the return path, controller 810 causes matrix switch 808 to connect the output of digitizing unit 130"-1, as received on line 806-1, to receiver 28-1. Preferably, transmitter 23-1 is connected to no other digitizing units 130", such that no other remote unit 102 is broadcasting at the frequency $F_1$, except for unit 102-1. Similarly, it is preferable that no other digitizing units 130" are connected through matrix switch 808 to receiver 28-1. As a result, interference between adjacent microcell zones caused by broadcasting the same frequency is avoided and interference resulting from a receiver 28 receiving the same frequency (at different phases and varying distortions) from more than one zone is avoided.

Extending the example further, consider now that mobile unit 820 moves from zone A1 to microcell zone A2 at a time $t_2$. As mobile unit 820 moves from microcell zone A1 to zone A2, controller 810 continues to sample and detect the received signal strength of transmission frequency $F'_1$ from all the remote units 102 in cell A. Upon movement from microcell zone A1 to A2, controller 810 should detect an increasingly stronger signal at frequency $F'_1$ in microcell area A2, and correspondingly a reduction in signal strength at that frequency in microcell area zone A1. When certain switching criteria are met, controller 810 performs a "passive handoff," by switching transmitter 23-1 from connection to combiner 804-1 to connection with combiner 804-2, and correspondingly switching receiver 28-1 to receive its input from digitizing 130"-2. As a result, transmission at frequency $F_1$ ceases at remote unit 102 in zone A1, and the signal received at that remote unit 102 is no longer applied through switch 808 to receiver 28. Thus, system 800 can passively switch a channel from one zone to another within a cell to follow a mobile unit.

The following example illustrates the operation of system 800 when the mobile unit moves from one cell to another. For example, if mobile unit 820 moves from microcell zone A3 to zone B1 at a time $t_3$, controller 810 again detects a corresponding reduction in signal strength received at the remote unit 102 in zone A3. However, no corresponding increase in signal strength in another zone in cell A is detected to trigger a passive handoff. Rather, the handoff from cell A to cell B is handed by MTSO 110 as MTSO 110 senses the movement of the mobile unit 820 between cell A and B. Prior to leaving the cell, as the signal strength decreases, transmission and reception may be achieved using all zones in the cell. As the unit 820 moves into the B cell, MTSO 110 operates to assign a new channel to the mobile unit, from frequencies assigned to cell B. The base station unit 114' serving cell B then operates in the same manner as described above to identify the initial zone to transmit and receive from, and to perform passive handoffs within cell B. Accordingly, switching between cells A, B or C is carried out independently of the passive handoff of assigned frequencies between zones in a cell. Cell B could, of course, be of conventional design with a single antenna serving the entire cell.

Thus, as described above, the present invention provides a passive handoff system, wherein a transmission frequency is assigned to a mobile unit, and that frequency tracks or follows the mobile unit from one microcell zone to another under the control of controller 810, and without intervention from or switching of transmission frequencies by the MTSO 110. This mode of operation is particularly advantageous in certain microcell applications, wherein multiple remote units 102 are required to cover an area, but there is not enough traffic density in a given zone within the area to support a conventional cell site installation. For example, a narrowed depression in the terrain, such as a ravine or along a road adjacent to a river bed may require multiple antenna installations to obtain adequate signal coverage, due to blockage from nearby terrain. Another example might be in an underground parking garage, or even in large office buildings where larger than normal signal attenuation results in unacceptable signal levels. Furthermore, cell sites in some cellular systems are not located close enough together, thus resulting in poor coverage areas between the cells. Still another example is along a traffic corridor between population centers. For these situations and others, it is advantageous to use a passive handoff system permitting an expansion of the area covered without assigning separate frequency sets and corresponding transmitters and receivers for each zone within the area.

Preferably, each switch 802 and 808 provides support for at least twenty (20) transmitters and twenty (20) receivers, respectively. In addition, each of switches 802 and 808 preferably permits connection of the transmitters and receivers to up to six digitizing units 130". Accordingly, matrix switch 802 may be used, for example, to connect up to twenty (20) transmitters (where N=20), through to any one of digitizing units 130". Similarly, the output from digitizers 130" may be selectively connected to any one of receivers 28, such that a single one of digitizers 130" may be connected to all of receivers 28, or all of the digitizing units 130" may be connected to a single one of receivers 28. However, it shall be understood that switches 802 and 808 may be adapted to handle more or less than twenty (20) receivers or transmitters, or more or less than six (6) units 114'.

Switches 802 and 808 are preferably matrix switches, wherein the combining function is integrated into the switch at the matrix nodes, in the form of Wilkinson combiners using nonreflective pin diode attenuators. Such components are available from Salisbury Engineering, Inc., of Salisbury, Md. The switches are preferably of the attenuator type, allowing linear control of rise and fall time. Switching is preferably make before break.

Figure 36:
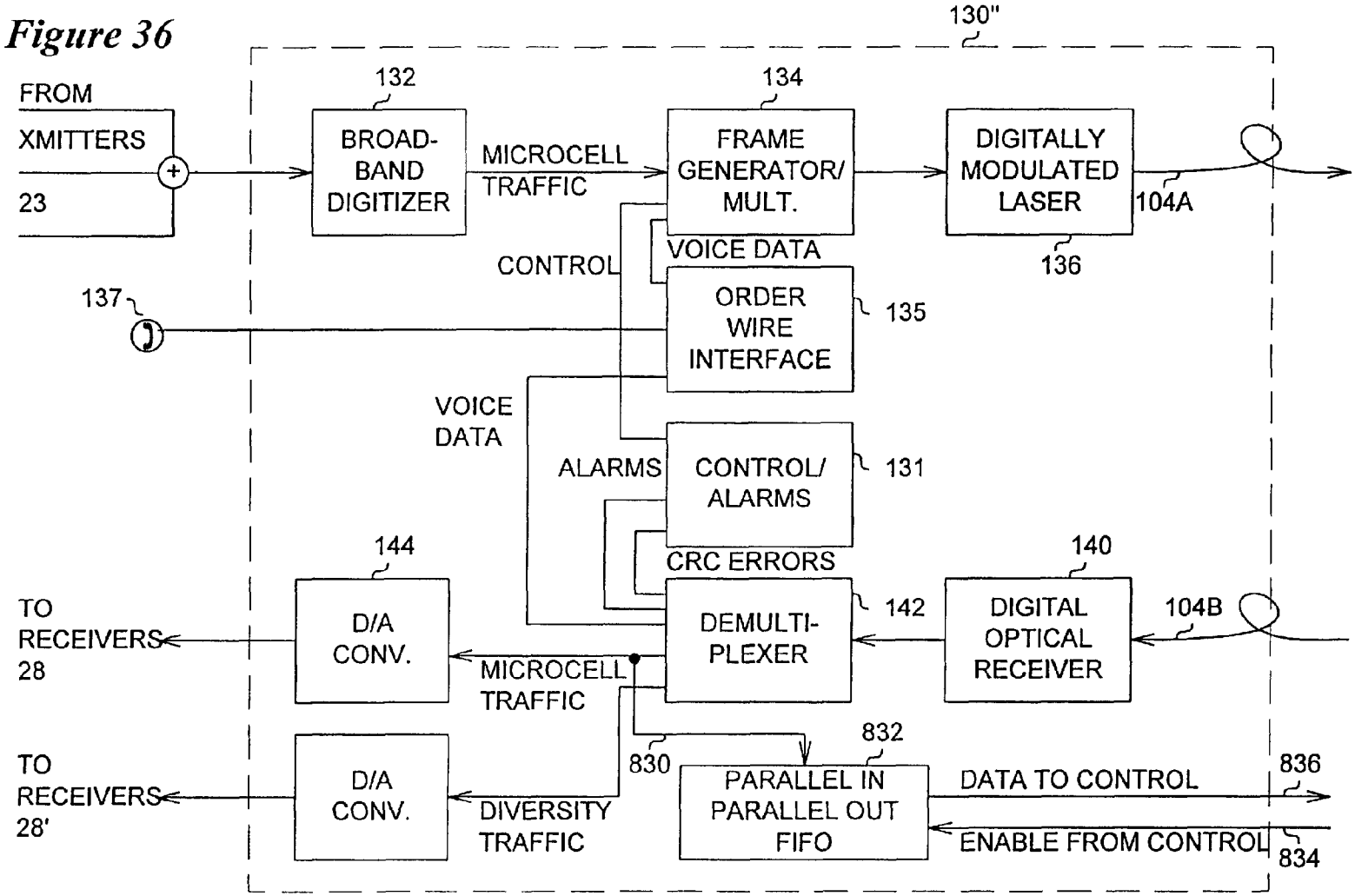
FIG. 36 shows an exemplary embodiment of digital transmitting/receiving unit 130" of the system of FIG. 35A.

Referring now to FIG. 36, there is shown a first exemplary embodiment of unit 130". Unit 130" is of the same design and operation as unit 130, except it additionally includes a data bus 830 connected to the bus carrying demultiplexed digitized microcell traffic from demultiplexer 142 to digital-to-analog converter 144. Bus 830 is applied to parallel-in parallel-out FIFO buffer 832, which has an output enable controlled by an enable line 834 received from a controller 810. When enabled, buffer 832 outputs a replica of the digitized microcell traffic on data bus 836.

Figure 37:
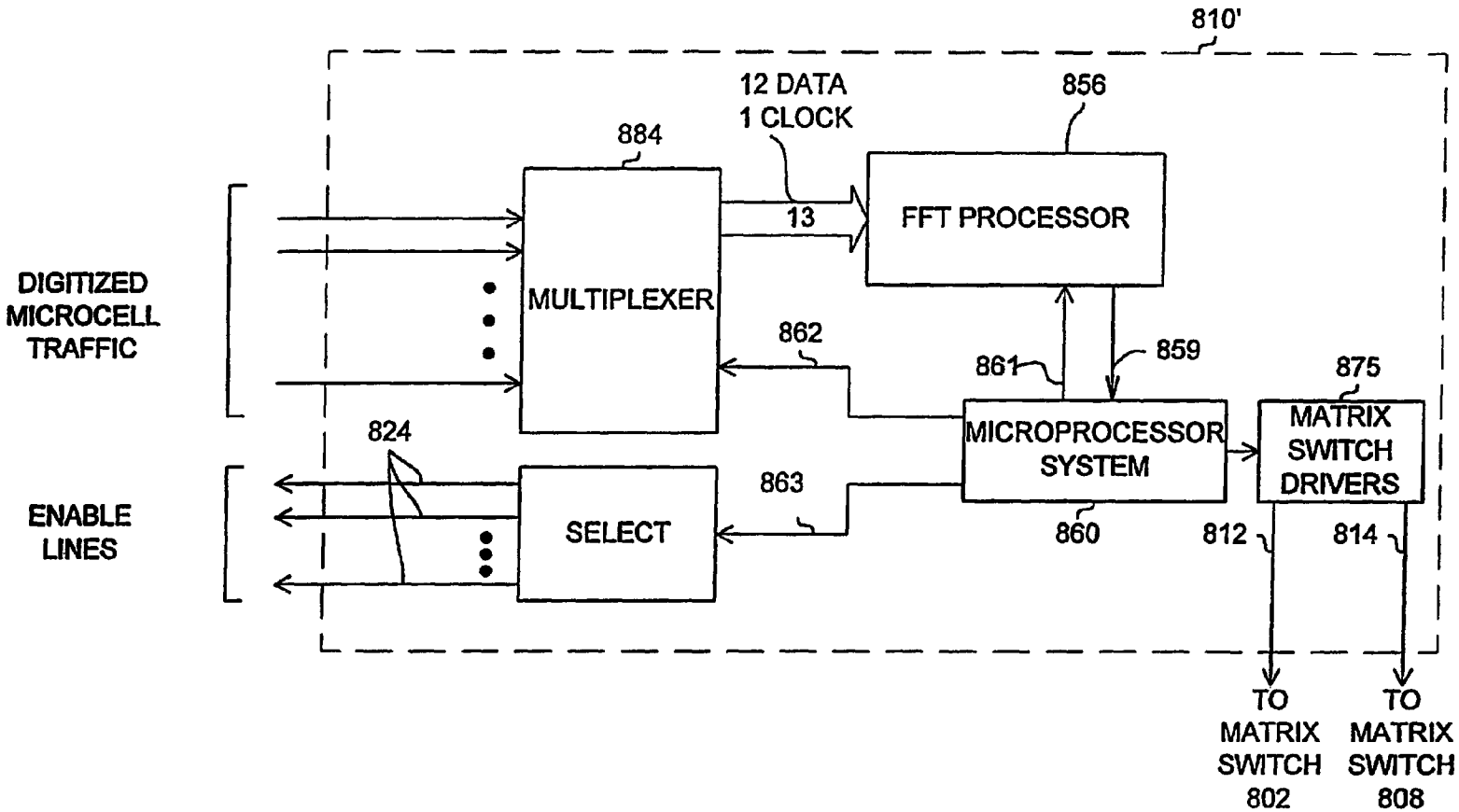
FIG. 37 illustrates an exemplary embodiment of controller 810 of the system of FIG. 35A.

Referring now to FIG. 37, there is shown an exemplary embodiment of controller 810 according to the present invention. Controller 810 of FIG. 38A is adapted for use with unit 130" shown in FIG. 36. Controller 810 includes a multiplexer 884 which is connected to the buffers 832 in each of units 130"-1 to 130"-X, through a twelve (12) bit data bus 836 with one (1) clock line. Multiplexer 884 (preferably tri-state) selects input from one of the busses 836, and supplies it to fast-fourier-transform (FFT) processor 856. Selection is made under control of microprocessor system 860, using control line 862. FFT processor 856 clocks in digitized microcell traffic samples consisting of 12 bit words. Digital FFT processor 856 preferably uses a Raytheon Part No. 3310, available from Raytheon, Inc.

The output of FFT processor 856 is a plurality of 16 bit words in bins, with each bin representing the strength or amplitude of a 30 KHz channel (or channel of a PCS or other service) within the digitized cellular data stream. The output of FFT processor 856 is applied to system 860 over data bus 859, using control line 861. A select circuit 886 receives a control signal 863 from system 860, and selectively generates signals on enable lines 834. Enable lines 834 are used to selectively enable the outputs of buffers 832, so that FFT processor 856 can be selectively filled with digitized microcell traffic samples from a selected source. Microprocessor system 860 is connected to a matrix switch driver 875, which drives matrix switches 802 and 808. The operation of controller 810 as shown in FIG. 37 will be described in more detail below.

Referring now to FIG. 38, there is shown a simplified flow diagram of the operation of programmed microprocessor system 860 and its corresponding control over the operation of system 800. FIG. 39 is representative of both the program 900 executed by microprocessor system 860 and the method of system 800. Program 900 include an initialization/configuration routine 910. System configuration provides for the identification of the channels serviced by base station 114'. Preferably, microprocessor system 860 includes magnetic storage media such as a hard drive or the equivalent for storage of the configuration information and other data, together with computer programs. Once configured, polling and switching operation may be invoked. In this mode of operation, microprocessor system 860 first selects (routine 912) the digitized traffic stream for a "first" zone in the cell. In the embodiment of FIG. 37, the selection is achieved using enable lines 834. A selected one of enable lines 834 is activated to enable the acquisition and output of the microcell traffic data from a corresponding one of buffers 832. The enabled buffer 832 applies a replica of the digitized microcell traffic stream from demultiplexer 142 in unit 130" to multiplexer 884, which applies the digitized traffic stream to FFT processor 856.

Routine 914 provides that FFT processor 856 is activated for loading of the digitized microcell traffic stream under the control of microprocessor system 860 using control line 861. A buffer 832 may load, for instance, 1024 samples of the digitized microcell traffic. As microcell traffic data is received from a buffer 832, FFT processor 856 clocks in digitized 12 bit microcell traffic samples or words. The output of FFT processor 856 comprising a series of 16 bit words specifying the signal strength of the respective channels carried in the digitized microcell traffic stream.

Microprocessor system 860 preferably employs an Intel brand "486" type microprocessor or better running at least 33 MHz. At this speed, the time between selection of the digitized microcell traffic stream and the receipt of the frequency spectrum analysis from FFT processor 856 can be less than 5 milliseconds. Once microprocessor system 860 has received (916) the frequency spectrum data from FFT circuit 856, which contains the signal amplitude for each frequency in the zone, the data is recorded for immediate or later analysis (routine 918). Optionally, the date and time of the signal measurement is also recorded, together with any other parameters of interest. The polling process continues if all zones in the cell have not yet been measured within the current polling cycle. If polling continues, the digitized microcell traffic stream for the next zone in the cell is selected (routine 924) in the above-described process of data acquisition analysis and storage is repeated.

Once all zones have been measured in a current cycle, microprocessor system 860 determines the channel (i.e., transmitter/receiver) zone assignments based on the signal levels recorded during the cycle. The particular manner in which this determination is made is not essential to the invention, but preferably may take one of the forms described below.

It is contemplated that the switching algorithms for the transmit and receive paths of unit 114' will be different. In the transmit path, it is contemplated that the method of switching will use the coverage received signal strength in a given zone over a period of ½ second to 3 seconds, with the zone with the greatest strength chosen as the active zone. Alternatively, a zone which is not currently fading, even if at a lower signal strength, may be chosen. If it doesn't matter which zone is used, for example, if signal strengths are comparable, a zone may be chosen which evens out the distribution of channel assignments in the cell. Where the optimum zone cannot be determined, several or all zones can be selected or active, for example, as might occur when a mobile unit is on the edge of a cell.

For switching receivers, instantaneous and average levels are tracked, and fades are tracked so that trends can be predicted and the switching from one zone to another on the receive side can be anticipated. If the received signal strength is below a threshold level, then a receiver may be connected for reception from all zones, for instance where a mobile unit is on the edge of a cell. Switching on the receive side is typically accomplished at a much faster rate of change, than on the transmit side owing to the greater problem of reception and fading from the relative low power transmitters in the mobile units.

Of course, other switching algorithms for both the transmit and receive channels are possible, and certainly those applicable to conventional cellular switching are good candidates.

Once the new channel (transmitter/receiver) assignment has been determined, system 860 switches the transmitters and receivers using switches 802 and 808, through matrix switch drivers 875.

As an alternative to the operation specified for program 900 described above, channel (transmitter/receiver) zone assignments may be determined on a continual basis after each new frequency spectrum measurement is obtained. For instance, program 900 of FIG. 38 may be modified by inserting steps 930 and 932 between step 920 and 924, and eliminating decision step 922. Thus, as described above, system 810 may complete an analysis of all channels in a given zone in under 2 ms. In a handoff system with 6 zones, all analysis can be done in under 12 ms. One advantage to such fast channel analysis is in the capability of base station receive diversity, which may improve signal quality in areas at the fringes of cell coverage or where signal is momentarily blocked on one zone. Since fading is a major problem in, for example, remote areas, the ability to quickly switch between receiver sources allows a form of diversity reception using the antennas in different zones as "diversity" antennas for each other.

A possible side advantage of fast analysis would be to accumulate statistical data on fading that might assist service providers in finding optimum antenna/microcell placement.

As mentioned above, microprocessor system 860 may optionally record the date and time of each measurement of the frequency spectrum of the digitized microcell traffic stream. Accordingly, a history of channel usage and signal strength within any given channel may be readily obtained, and later used for the purpose of reconfiguring the system, for example, by moving antenna units. Accordingly, the present invention further contemplates a method of recording the use of the channels within the zones and the corresponding signal strength, and later using this information to reconfigure the system.

As an alternate exemplary embodiment, the system of FIG. 35A (and FIG. 39 below) can be modified so that the digitized RF signal is carried to the zones over a switched telephone network, as for example illustrated in FIG. 30, or modified to transport the digitized RF over a cable system, as for example illustrated herein.

Figure 39A:
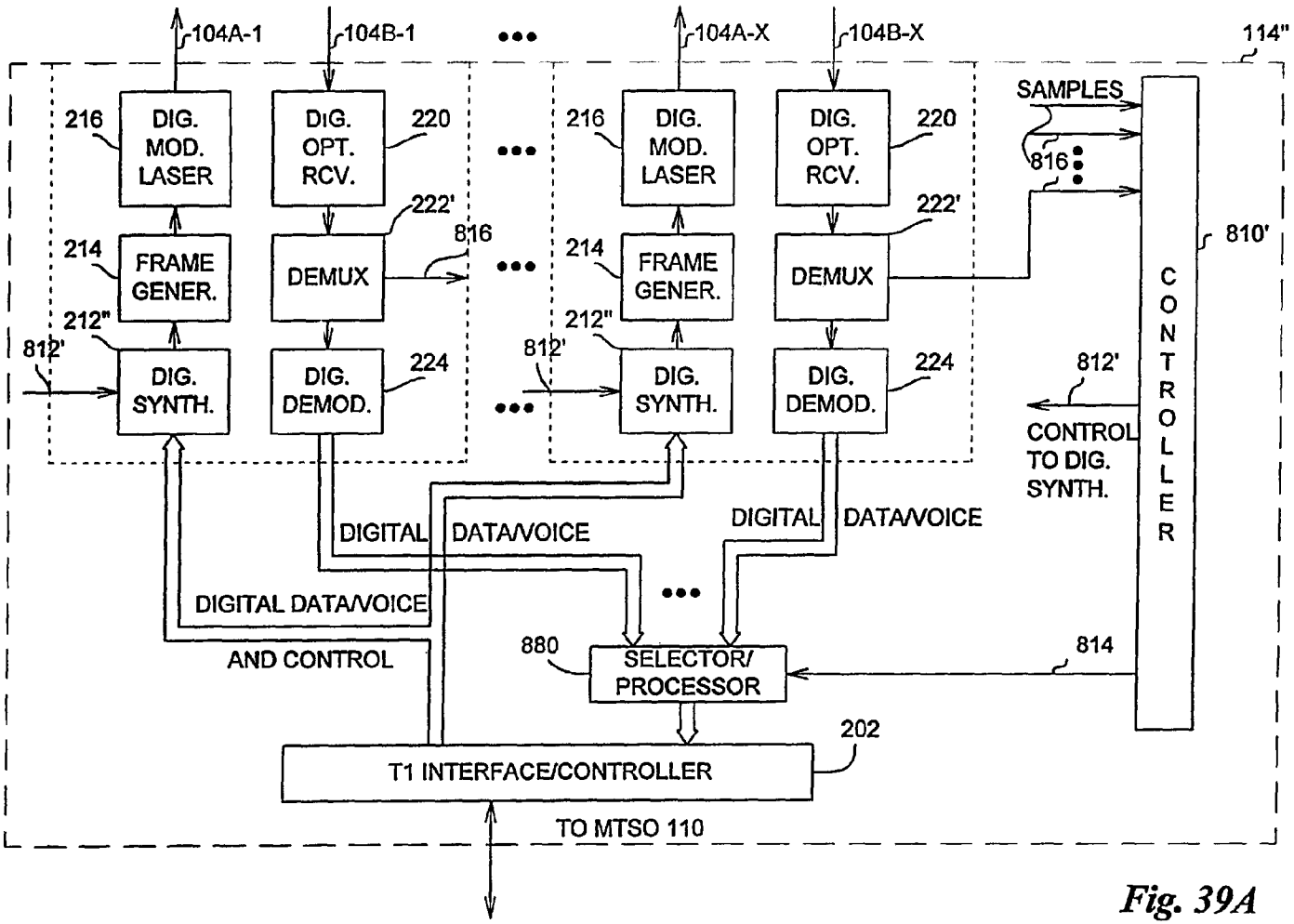
FIGS. 39A, 39B, 39C and 39D are still other alternate exemplary embodiments of passive handoff systems with all-digital base station units.

In the alternate embodiment of FIG. 39A, base station 114' is modified to provide all digital base station 114". All digital base station 114", like the system of FIG. 11A, uses a digital synthesizer 212' and digital demodulator 224 to replace the analog RF radio equipment in the base station. A T1 Interface 202 interfaces to MTSO 110, and applies a digital form of each telephone signal all control signal from the MTSO to each digital synthesizer 212'. Each synthesizer receives control signals from the controller 810' over line 812'. Each digital synthesizer 212' is responsive to controller 810' to create a synthesizer digital data stream for framing and transport to an associated unit 106 in a zone, so that any combination of the channels assigned to the cell can be broadcast in the cell.

On the return path, the digitized sample 816 is taken from the demultiplexed digital data stream returning from the units 106, and supplied to controller 810'. The digital samples are obtained from the demultiplexer 221' in a like manner as described above with respect to FIG. 36. Controller 810' in turn uses the sample data as described above with respect to control 810 to control switching. Selector 880 can be used to select the received signal for any desired channel from any one of demodulators 224, for application to T1 interface 202. Alternatively, selector/processor 880 is configured to process two or more of the incoming streams for each channel to create a reduced noise composite stream.

Figure 39B:
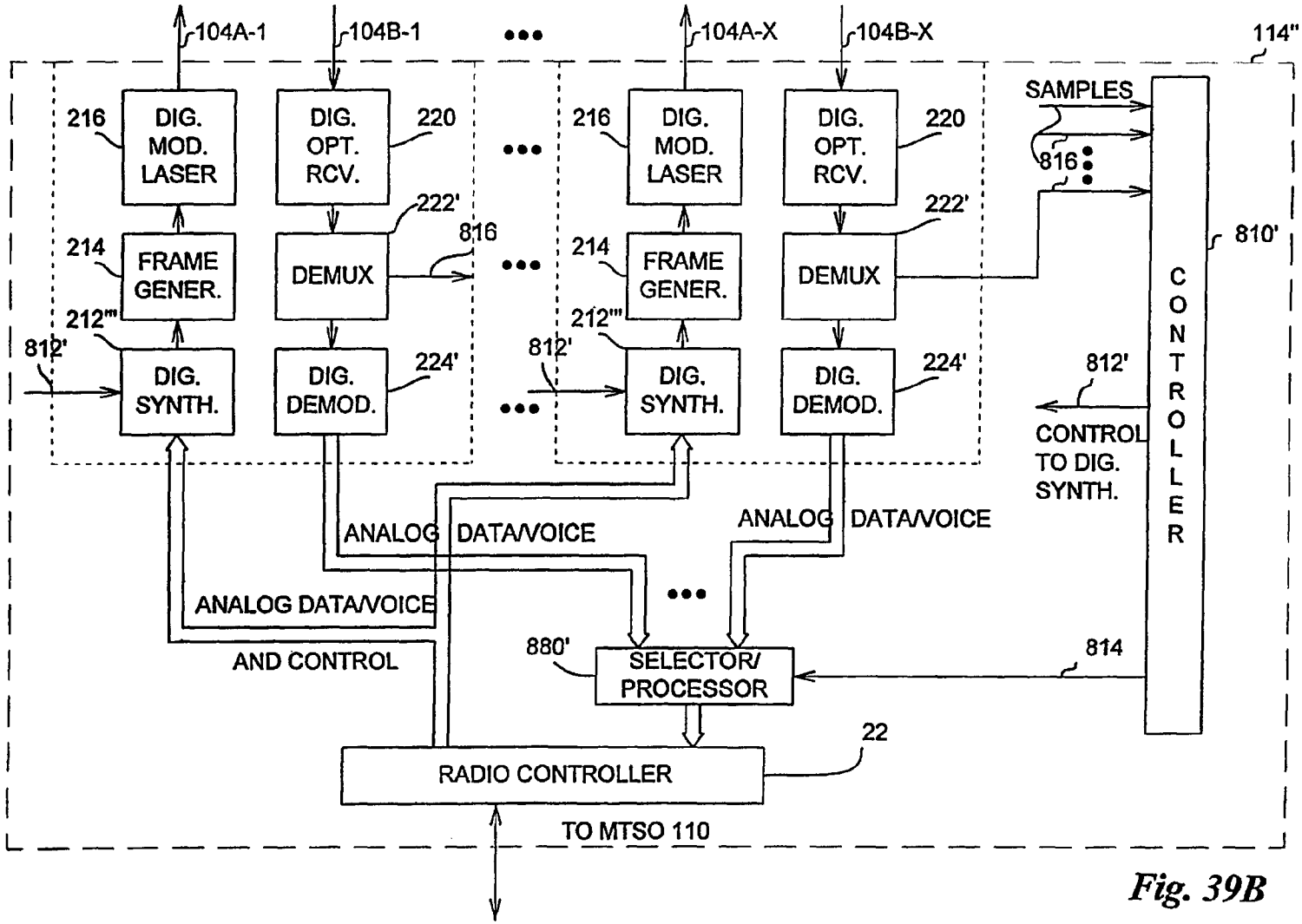

An alternate embodiment of the system of FIG. 39A is illustrated in FIG. 39B. The system of FIG. 39B is similar to the system of FIG. 11B, in that the digital synthesizer 212'" receives an analog telephone signal input from radio controller 22, and operates like synthesizer 212' of FIG. 11B. Similarly, digital demodulator 224' operates like demodulator 224' of FIG. 11B, delivering an analog signal to radio controller 22.

Figure 39C:
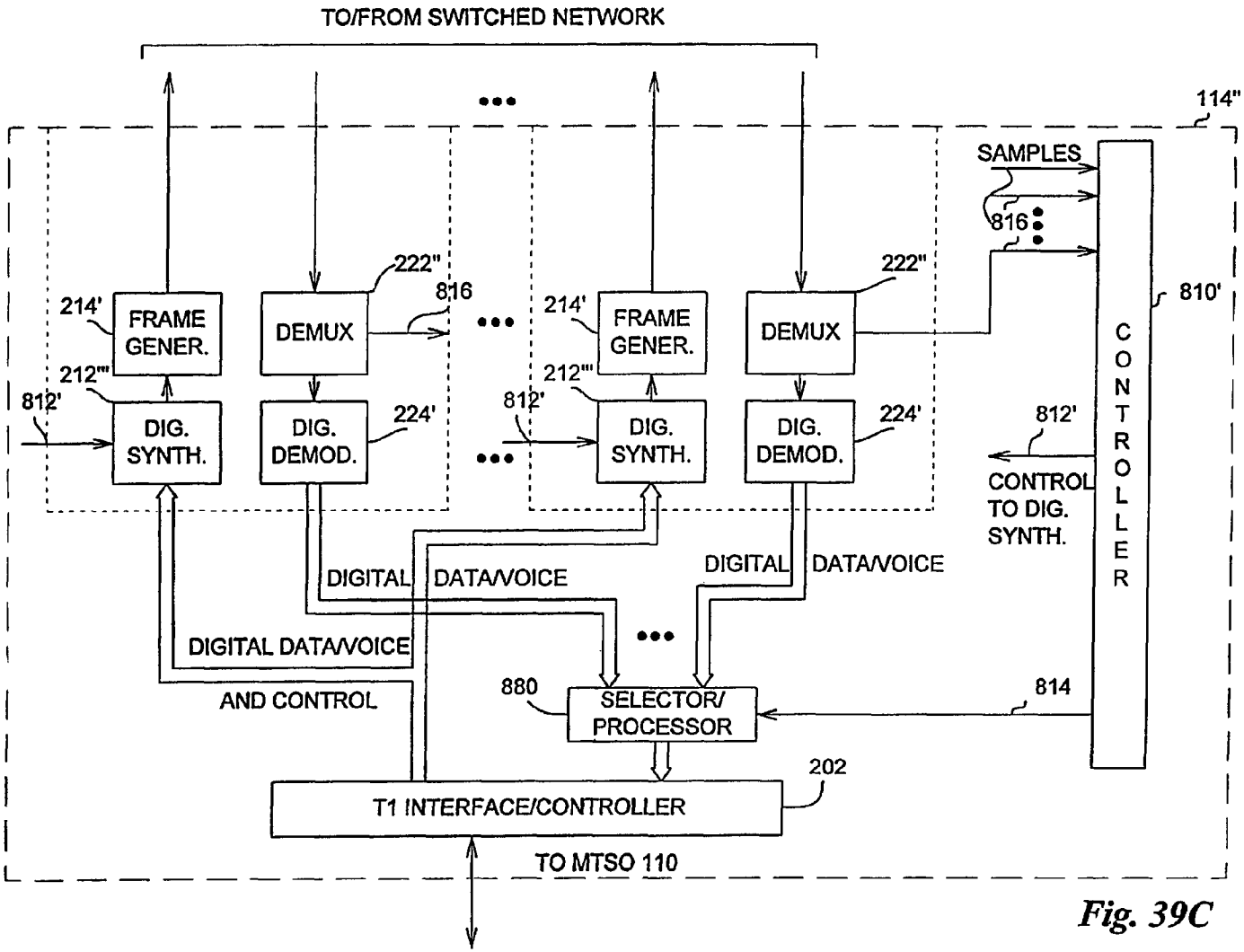
Figure 39D:
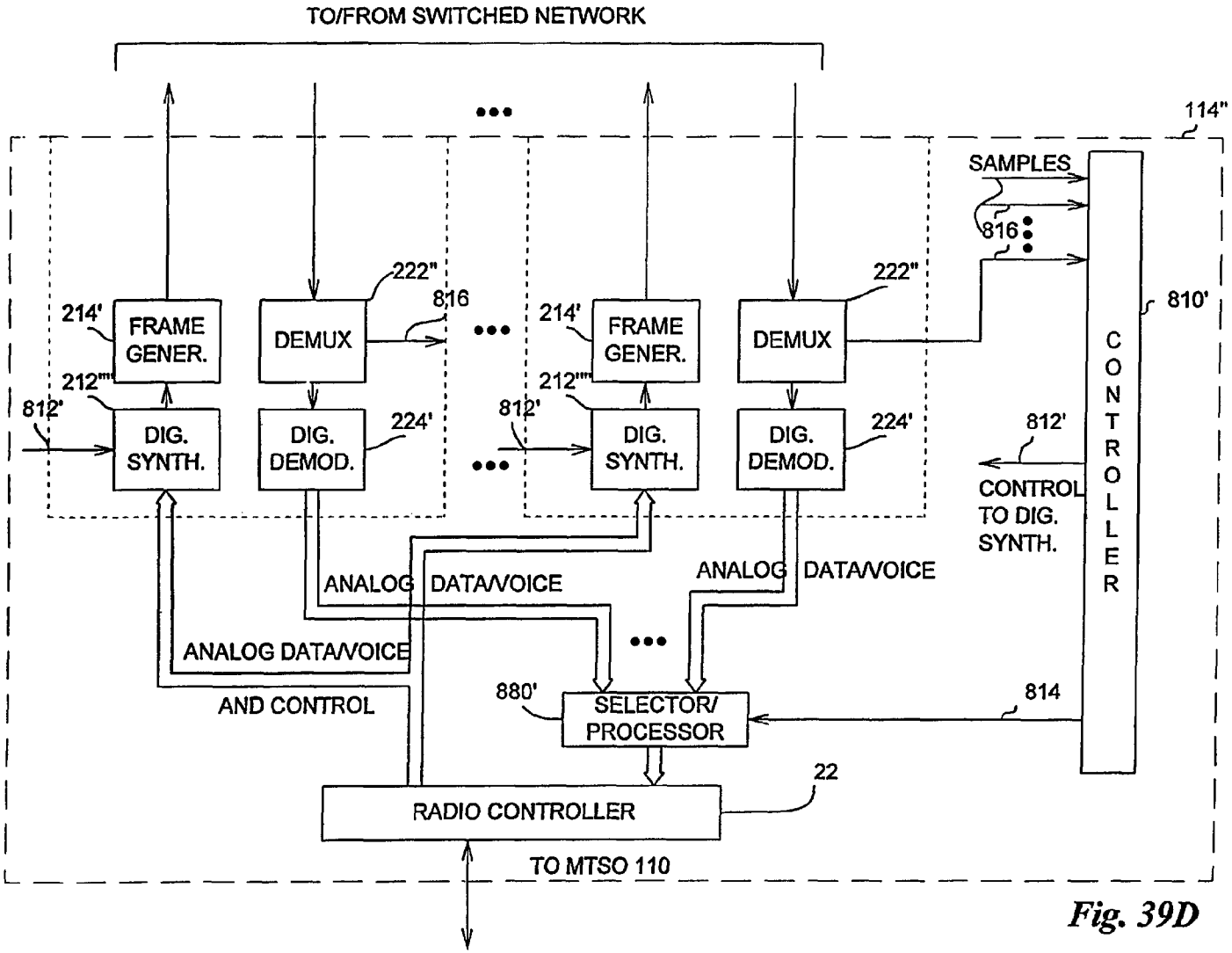

Yet another two alternate embodiments of the system of FIG. 35 are shown in FIGS. 39C and 39D, which are modified in a manner similar to the systems of FIGS. 11C and 11D, so that transport is over the switched network and the synthesizer produces individual digitized channels for application to the network.

Figure 40:
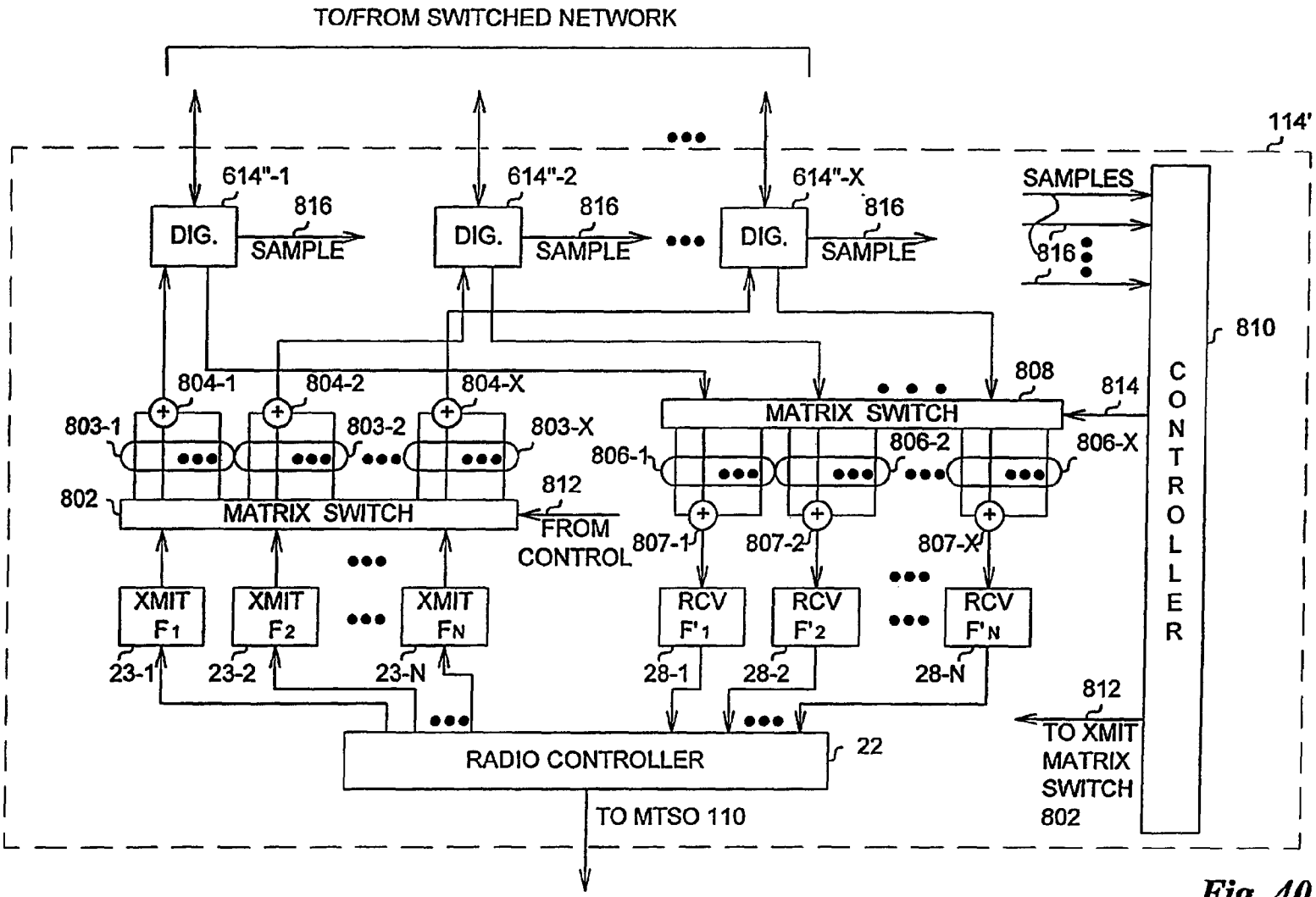
FIG. 40 is an alternate embodiment of the system of FIG. 35B.

Referring now to FIG. 40, there is shown yet another exemplary embodiment of the system of FIG. 35A, in this case modified to communicate through the switched telephone network by replacing units 130" with a modified version 614" (modified to obtain the samples of the digitized traffic stream) of circuit 614' of FIG. 32B. In this embodiment, only those channels actually used in the antenna units 106 are transported to the units, saving bandwidth in the same way as system 614'.

Figure 41A:
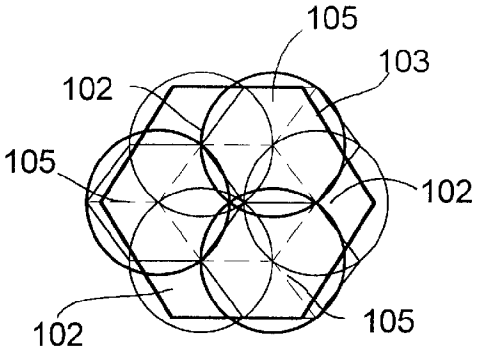
FIGS. 41A, 41B and 41C are exemplary embodiments of redundant microcell coverage.
Figure 41C:
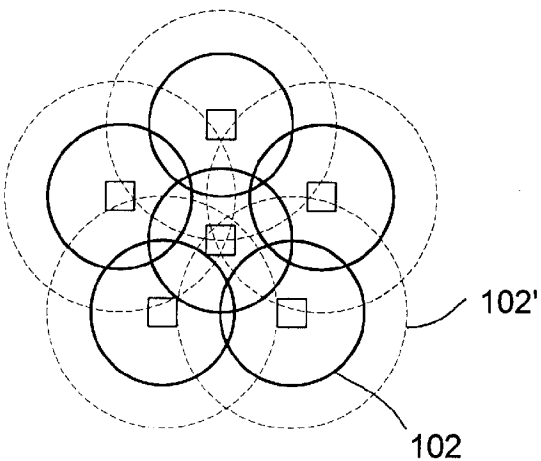
Figure 41B:
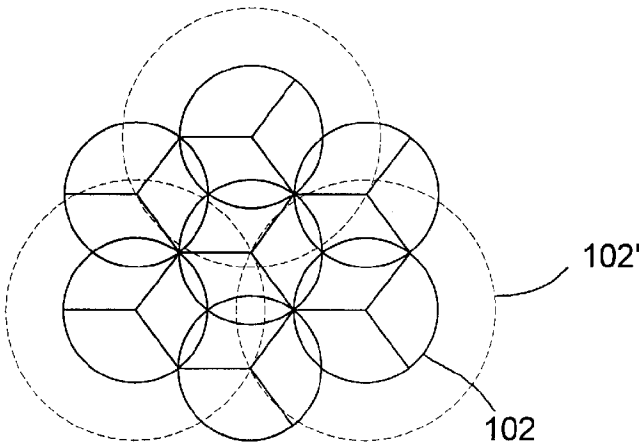

Referring to FIGS. 41A-C, there is illustrated other alternate exemplary embodiments of the passive handoff microcell system of the present invention. In the systems of FIGS. 41A-C, redundancy is achieved by arranging the microcell units 102 such that each area of the cell, or "macro cell", is covered by at least two microcell units. Accordingly, in the event of a failure of one of the units, the redundant microcells 103 are available to provide coverage in the area lost due to the failure.

In FIG. 41 A, a macrocell 103 is covered by three primary microcells 102 and by three secondary microcells 105. In the example shown secondary microcells 105 are placed in a distribution similar to that of primary microcells 102 but rotated 45 degrees around the center of macrocell 103. It should be apparent that other distributions could be used advantageously to provide similar redundant coverage.

In normal operation, primary microcells 102 provide full coverage over macrocell 103. In case of a failure in one of the microcells 102, however, the two adjacent microcells 105 can provide coverage over the region served by the failed primary microcell 102. In another embodiment, primary microcells 102 provide primary coverage to first regions of macrocell 103 and secondary coverage to second regions of macrocell 103 while secondary microcells 105 provide primary coverage to the second regions of macrocell 103 and secondary coverage to the first regions.

A second method of providing redundant coverage is illustrated in two embodiments shown in FIGS. 41B and C, respectively. In the embodiments shown in FIGS. 41B and 41C, each microcell 102 is provided with two power levels. In normal operation, each microcell 102 is operated at the power level necessary to provide microcell 102 coverage. In cases where, however, a microcell 102 fails, adjoining microcells 102 are raised to a higher power level (shown as 102'). As can be seen in FIGS. 41B and 41C, such an increase in power level provides coverage over the failed microcell 102. Although the microcells 102 of FIGS. 41A and 41B are shown divided into three sectors, it should be apparent that other sectorization, or no sectorization, can be used within the above-described redundancy scheme.

Sectorization

Sectorization will be discussed next.

Figure 1A:
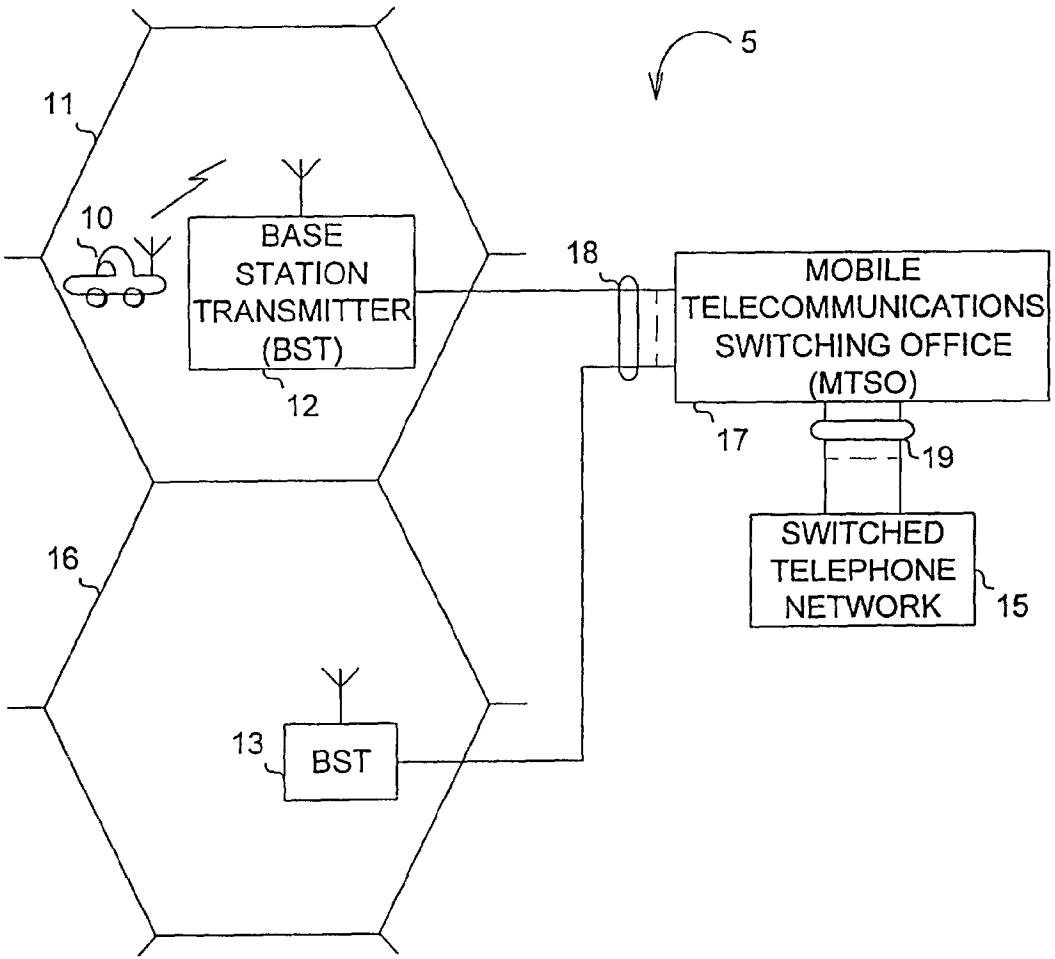
Figure 1A Prior Art
FIG. 1A is a functional block diagram of a first prior art mobile communications system.
Figure 1B:
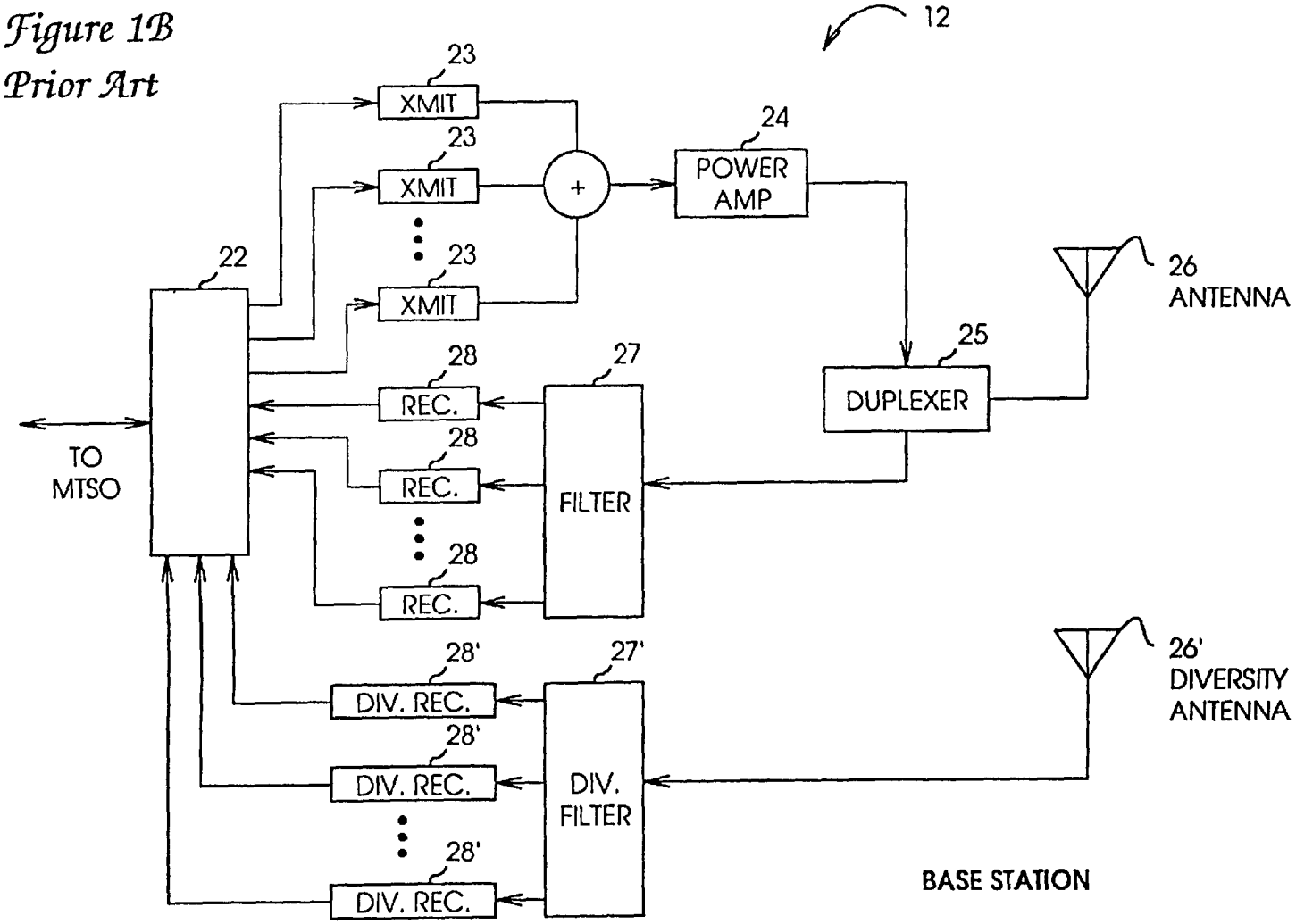
Figure 1B Prior Art
FIG. 1B is a functional block diagram of a prior art base station.
Figure 1C:
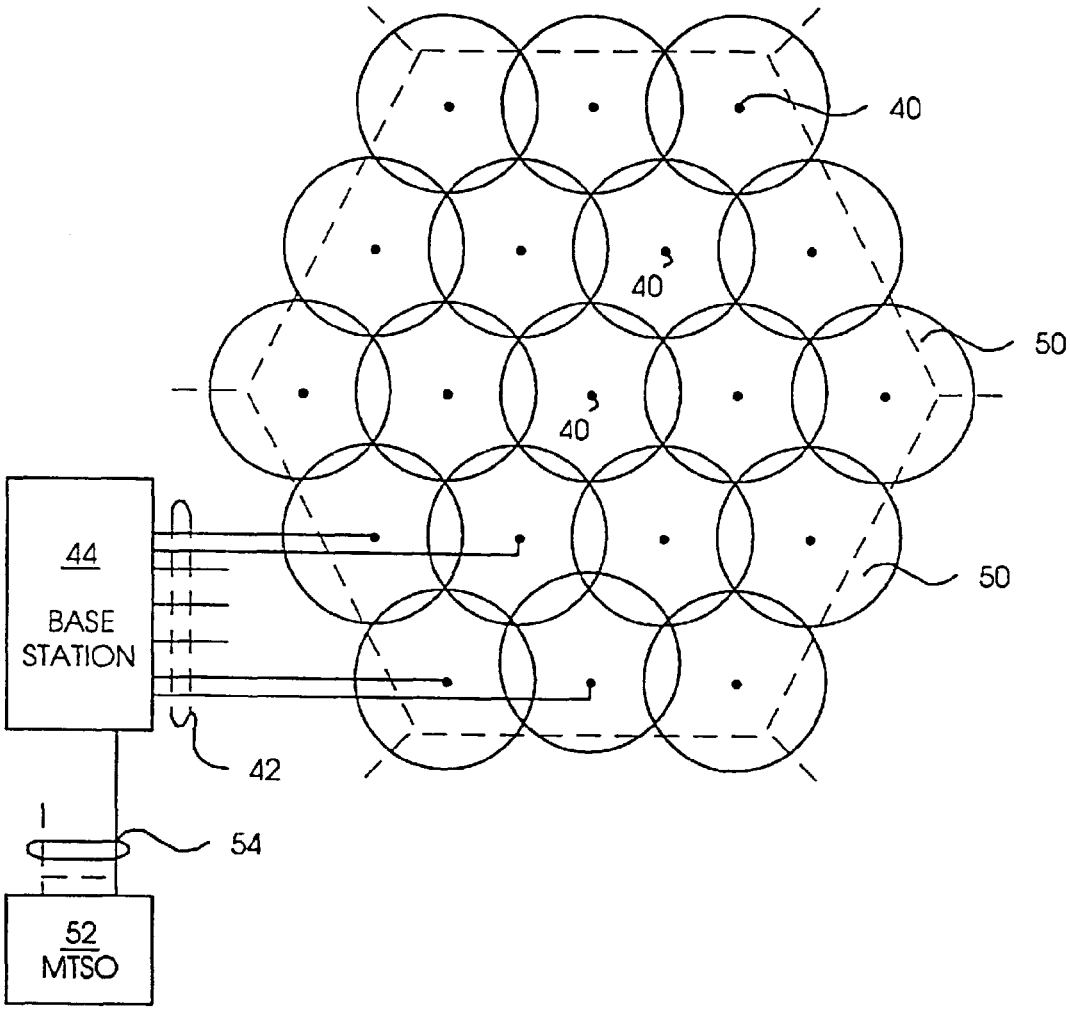
Figure 1C Prior Art
FIG. 1C is a functional block diagram of a prior art microcell mobile communications system.

According to yet another aspect of the invention, the microcell system of the present invention may be used to replace the conventional base station transmitter 12 in a conventional cell as for example shown in FIG. 1A. In addition, as can be seen in FIGS. 41A and 41B, each microcell could be split into a number of sectors, each sector driven by a directional microcell antenna unit. According to such embodiments, shown generally in FIG. 42, a sectorized antenna unit 900 having a plurality of transmit and receive antenna pairs 902 divides a micro or macrocell into a number of sectors. Each antenna pair 902 broadcasts and receives using a different channel set. For example, according to one preferred embodiment, a microcell 16 is divided into three 120-degree sectors with one antenna pair 902 assigned to each sector. Each antenna pair 902 utilizes ten transmit and receive channels for its sector, with a 21 channel separation between channels within the sector. In addition, according to one exemplary embodiment, there is provided seven channel separation between channels, between sectors.

The antenna pairs 902 in each macrocell are supported by a remote unit 904 which receives digitized RF for the channels in all three sectors, and converts the digitized RF into analog RF for transmission into the sectors covered by the antenna pairs 902. Remote units 904 further include analog-to-digital converters for digitizing RF received in each sector, and for transmitting the digitized RF to the sectorized base station units 906. Each of the sectorized base station units 906 is connected to the MTSO 17, which in turn is connected in turn to the switched telephone network 15.

Each sectorized base station unit 906 includes radio frequency transmitters and receivers for each of the channel sets used in each of the sectors of the macrocell, and digital-to-analog and analog-to-digital conversion units for transmitting digitized RF to the remote units and for receiving digitized RF and applying it to the receiver units. Sectorized base station units 906 are preferably connected to remote units 904 over a single fiber optic link 905 using wave division multiplexing as described above, although separate transmit and receive links could be used if desired.

Figure 43:
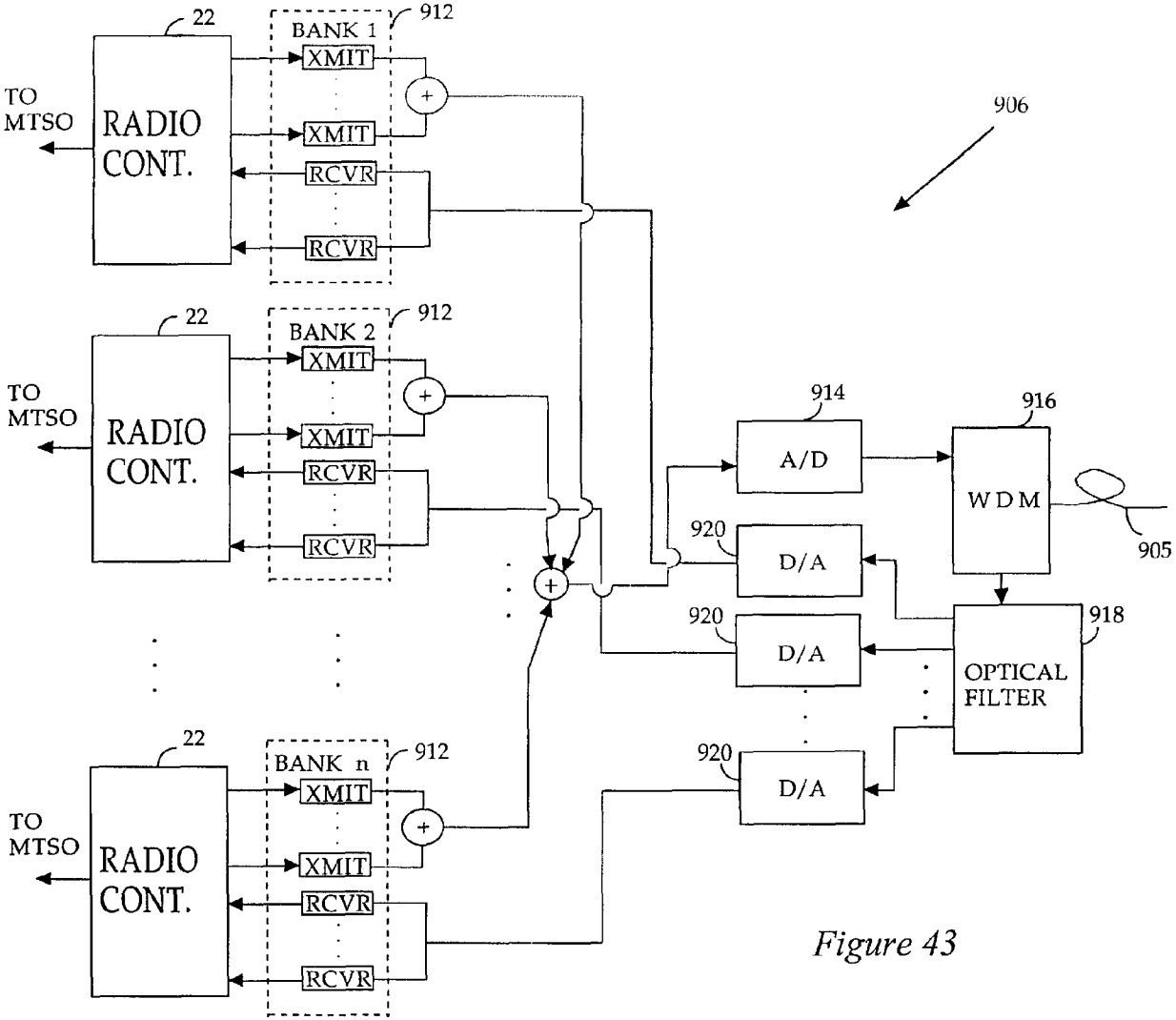
FIG. 43 is a more detailed block diagram of the base station embodiment shown in FIG. 42.

Referring now to FIG. 43, there is shown in more detail a sectorized base station unit 906. Each sectorized base station unit 906 includes a radio controller 22 for each of the sectors serviced by the base station unit 906. Each of the radio controllers 22 are connected to the MTSO 17. A corresponding number of transmitter and receiver banks 912 are provided, each with a plurality of transmitters and receivers. Preferably, according to the exemplary embodiment shown herein, each bank 912 includes ten transmitters and ten receivers. The output of the transmitters of each bank 912 is combined and applied to analog-to-digital conversion unit 914, which may be of a design similar to those described hereinabove, for example as shown in FIG. 4. Analog-to-digital conversion unit 914 digitizes and frames the digitized RF, and applies an optical output to wave division multiplexer 916, which is in turn connected to fiber 905. At the same time, optical information received from remote unit 904 is applied through wave division multiplexer 916 to an optical filter 918 which filters out the signal received from remote units 904 as distinct optical wavelengths, for example in the case of a three sector system, wavelengths of 1520, 1550, and 1580 nm can be used. Each of the filtered, separate wavelengths is applied to the input of one or more digital-to-analog conversion units 920, which demultiplex and convert from digital-to-analog form RF signals received from the remote units 904, for each of the sectors serviced by the remote unit 904. The analog output of digital-to-analog conversion units 920 is applied to the respective receivers in each bank 912.

Figure 44:
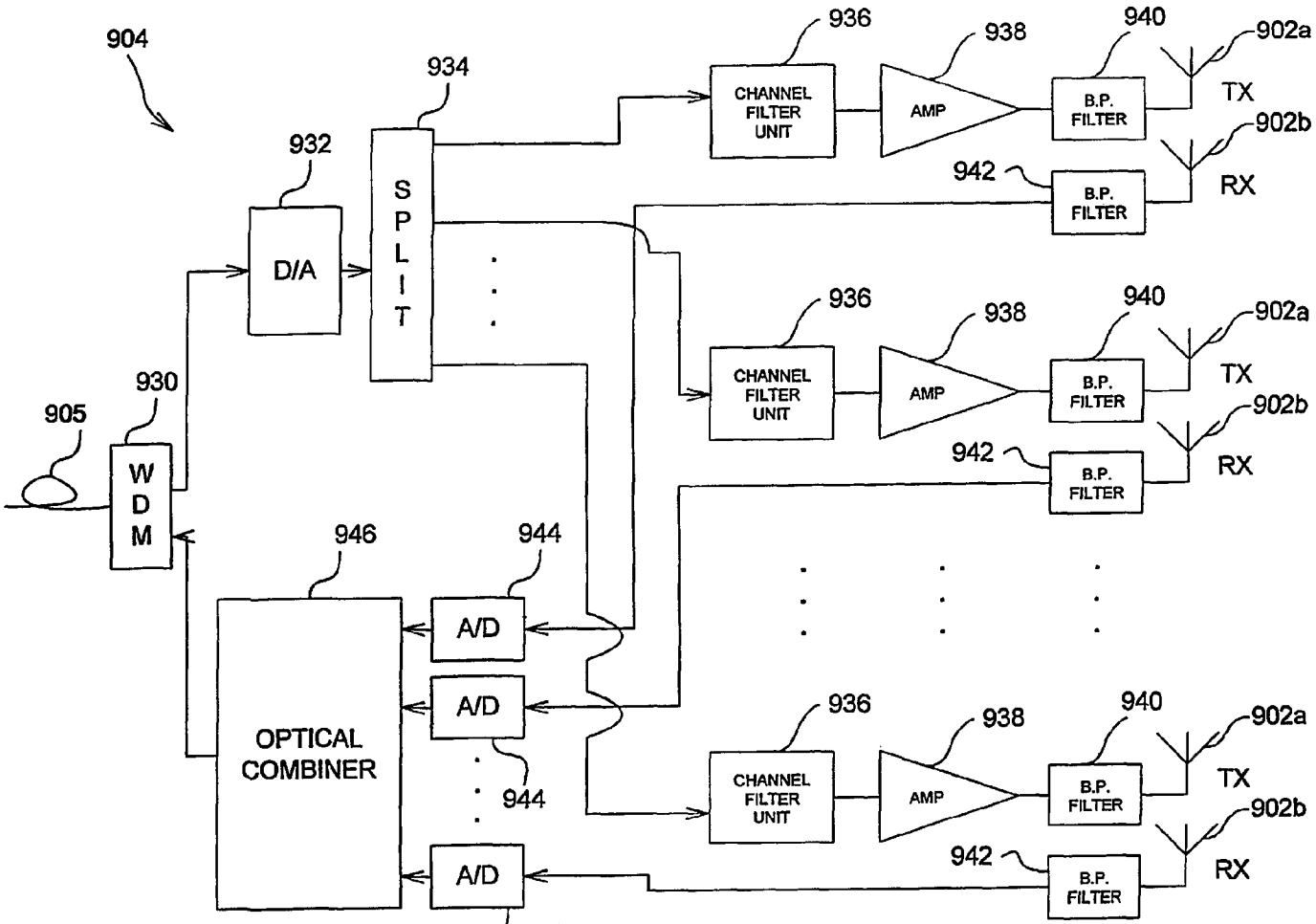
FIG. 44 is a more detailed block diagram of the remote unit embodiment shown in FIG. 42.

Referring now to FIG. 44, there is shown in more detail a remote unit 904. Each remote unit 904 includes a wave division multiplexer 930 connected to fiber 905. Wave division multiplexer 930 receives from sectorized base station unit 906 the digitized optical signal carrying the channels of all sectors serviced by remote unit 904, and applies the digital optical signal to digital-to-analog converter unit 932, the output of which is an analog RF signal representative of all channels represented in the sectors serviced by the remote unit 904. The analog output of conversion unit 932 is applied to splitter 934, which splits the analog RF signal into N paths (where N=the number of sectors) corresponding to channels assigned to each of the antenna pairs 902 applies the analog RF to channel filter units 936. Each antenna pair 902 has its own channel filter unit 936 to filter out of the RF signals from splitters 934, those channels to be transmitted in the respective sector. The output of channel filter unit 936 is applied to an amplifier 938, which is in turn applied to a band pass filter 940, which passes only those channels within the band assigned to the particular sector. The output of band pass filter 940 is applied to a transmitter antenna 902a of antenna pair 902. Meanwhile, a receiving antenna 902b of that antenna pair 902, receives RF signals predominantly from within the same sector, and applies the received signals to a band pass filter 942. Band pass filter 942 passes only those channels within the band, and applies the filtered radio frequency signal to analog-to-digital conversion unit 944, which converts the analog RF signal to a corresponding digitized optical output signal at a unique optical wavelength, for example, one of the optical wavelengths noted above. Each of analog-to-digital conversion units 944 may be of generally the same design shown with respect to unit 102 shown in FIG. 8. The optical outputs of each of the units 944 is applied to optical combiner 946, which in turn applies its output to wave division multiplexer 930. Digital-to-analog conversion units 932 are preferably of generally the same design shown with respect to unit 130 in FIG. 4.

Figure 45:
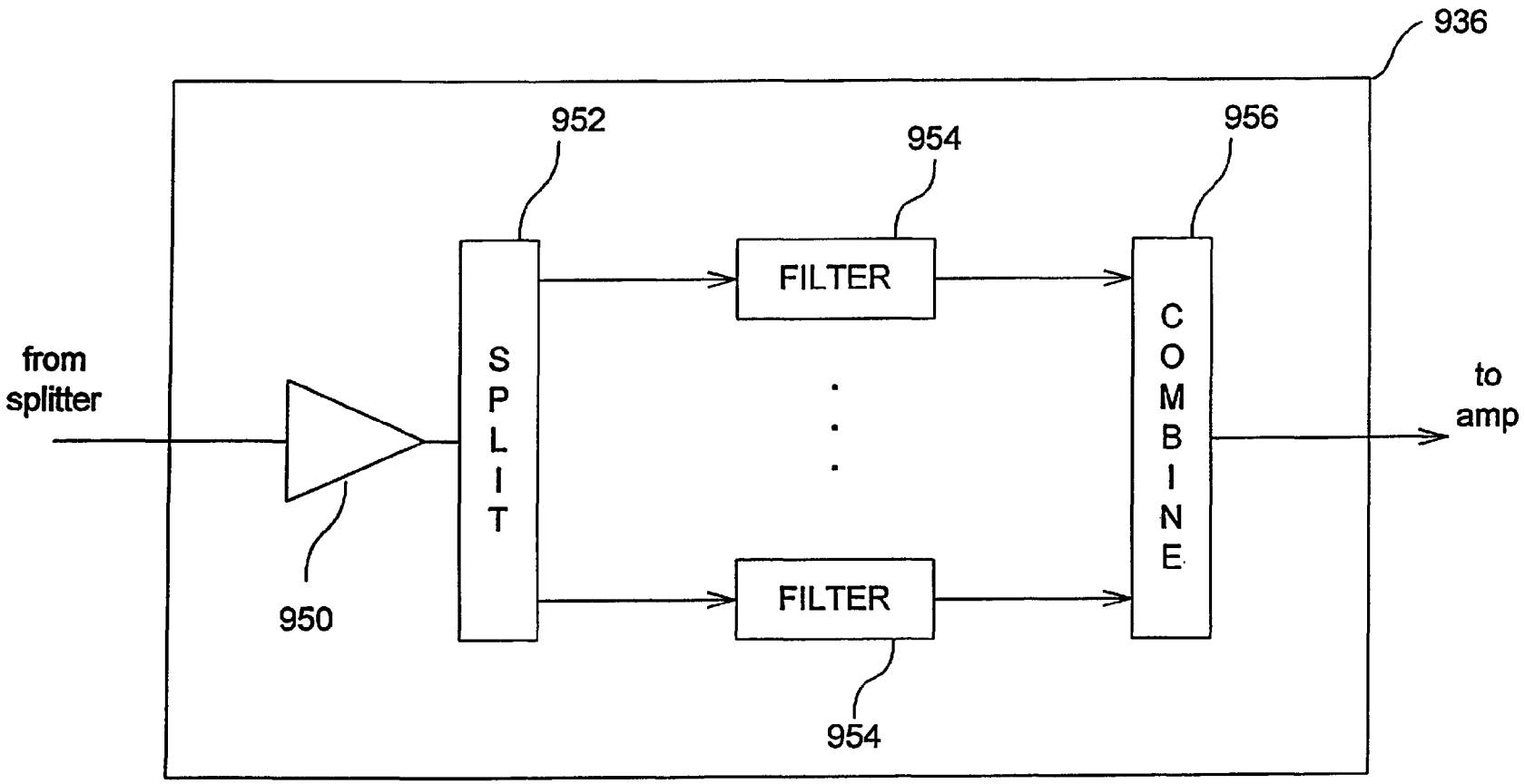
FIG. 45 is a more detailed block diagram of one example of a channel filter unit which can be used in the remote unit shown in FIG. 44.

Referring now to FIG. 45, there is shown in more detail one of channel filter units 936. Each unit 936 preferably includes a linear programmable pre-amplifier 950, which is used to provide the gain needed to compensate for the losses of the splitters and combiners. The output of amplifier 950 is applied to splitter 952, which splits the analog signal into M paths (where M=the number of transmit channels assigned to a sector) a plurality of paths. Each path in turn passes through a narrow band filter 954 tuned to the particular channel. Each narrow band filter 954 is preferably programmable, and designed to maintain a bandwidth of 30 KHz over temperature. Preferably, this is accomplished by first downconverting the required RF channel to a 70 MHz IF signal. The 70 MHz signal is then passed through a crystal filter in a manner known in the art to achieve the narrow filtering required. The IF frequency is then upconverted to the required RF frequency. Preferably, the frequency is microprocessor controlled, and the RF frequency can be set in 1 Hz increments to the required frequency using a computer, such as a laptop unit. Frequency stability is preferably achieved using a clock recovered from the encoded signal sent over fiber link 905. Ideally, narrow band filter 954 should be narrow enough that an adjacent channel within the sector will be greater than 50 dB down a master clock generated at base station unit 906. The output of each of the narrow band filters 954 is applied to a combiner 956, which in turn provides its output to the amplifier 938. In the exemplary embodiment of the present invention, amplifier 938 preferably constitutes a 25 watt PA.

In the preferred embodiment, frequency offset will be minimized by synchronizing remote unit 904 with sectorized base station unit 906. In one such embodiment, sectorized base station unit 906 transports the RF spectrum by downconverting from RF to an IF (in, for example, the 0-30 MHz range), and then digitizing. After being transported to the other end, the IF signal is reconstructed, and then up-converted back to RF.

The down-conversion and up-conversion are implemented by mixing the signal with a local oscillator (LO). In order for the original frequency of the signal to be restored, the signal must be up-converted with an LO that has exactly the same frequency as the LO that was used for down conversion. Any difference in LO frequencies will translate to an equivalent end to end frequency offset. In the embodiment described above, the down conversion and up conversion LO's are at locations remote from one another. Therefore, in one preferred embodiment, frequency coherence between the local and remote LO's is established as follows: at the host end, there is a 552.96 MHz master clock which establishes the bit rate over the fiber. This clock also generates a 30.72 MHz clock (30.72=522.96÷18), which serves as a reference to which the host digitizer LO's are locked.

At the remote end, there is another 552.96 MHz clock, which is recovered from the optical bit stream with the help of a phase lock loop. Because this clock is recovered from the bit stream generated at the host, it is frequency coherent with the master clock. A 30.72 MHz clock is then generated to serve as a reference for the remote local oscillators. Because the 552.96 MHz clocks are frequency coherent, so are the 30.72

MHz references, and any LO's locked to them, thus ensuring that host and remote LO's are locked in frequency.

Figure 46:
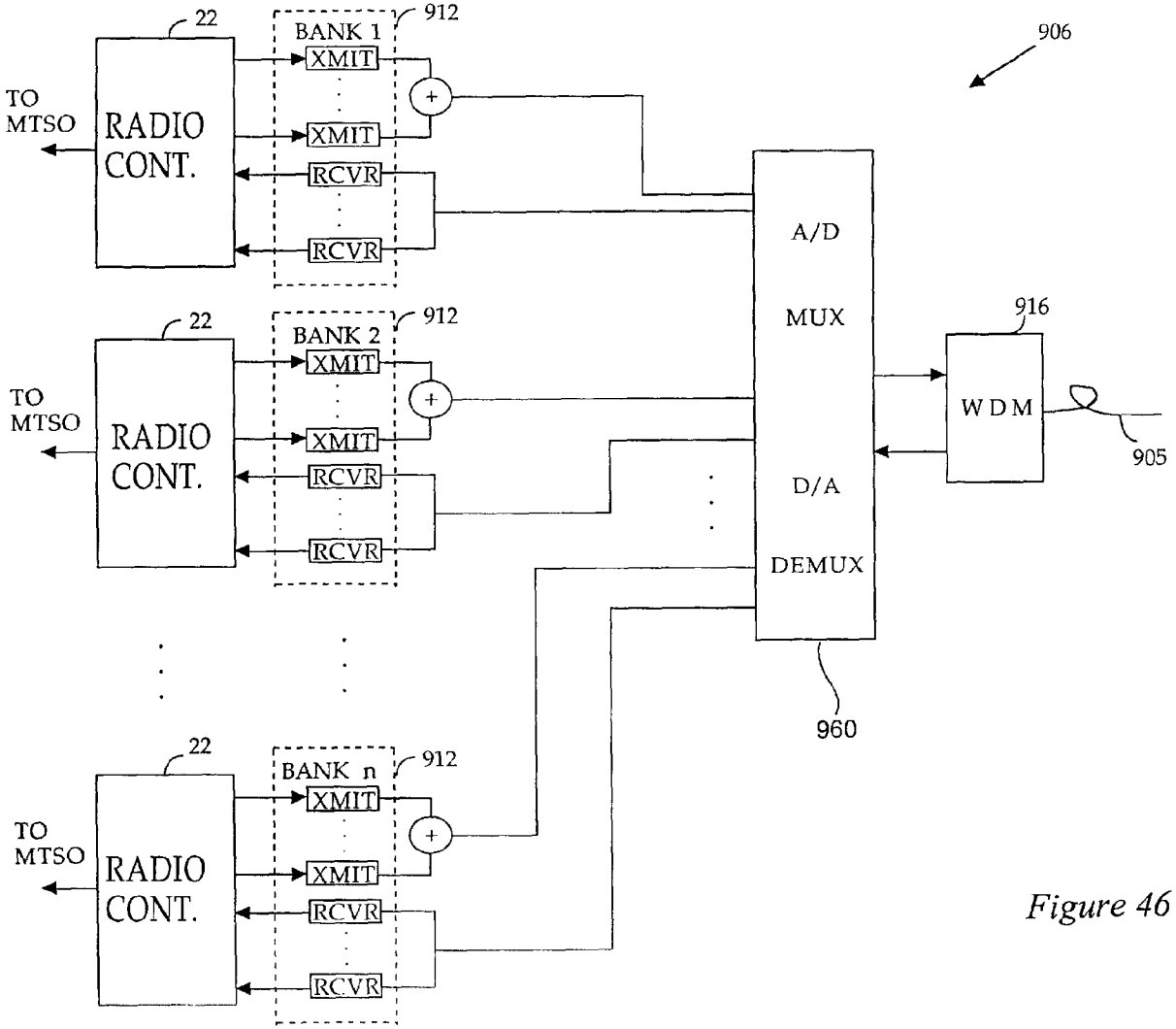
FIG. 46 is an alternate embodiment of the base station embodiment shown in FIG. 42.
Figure 47:
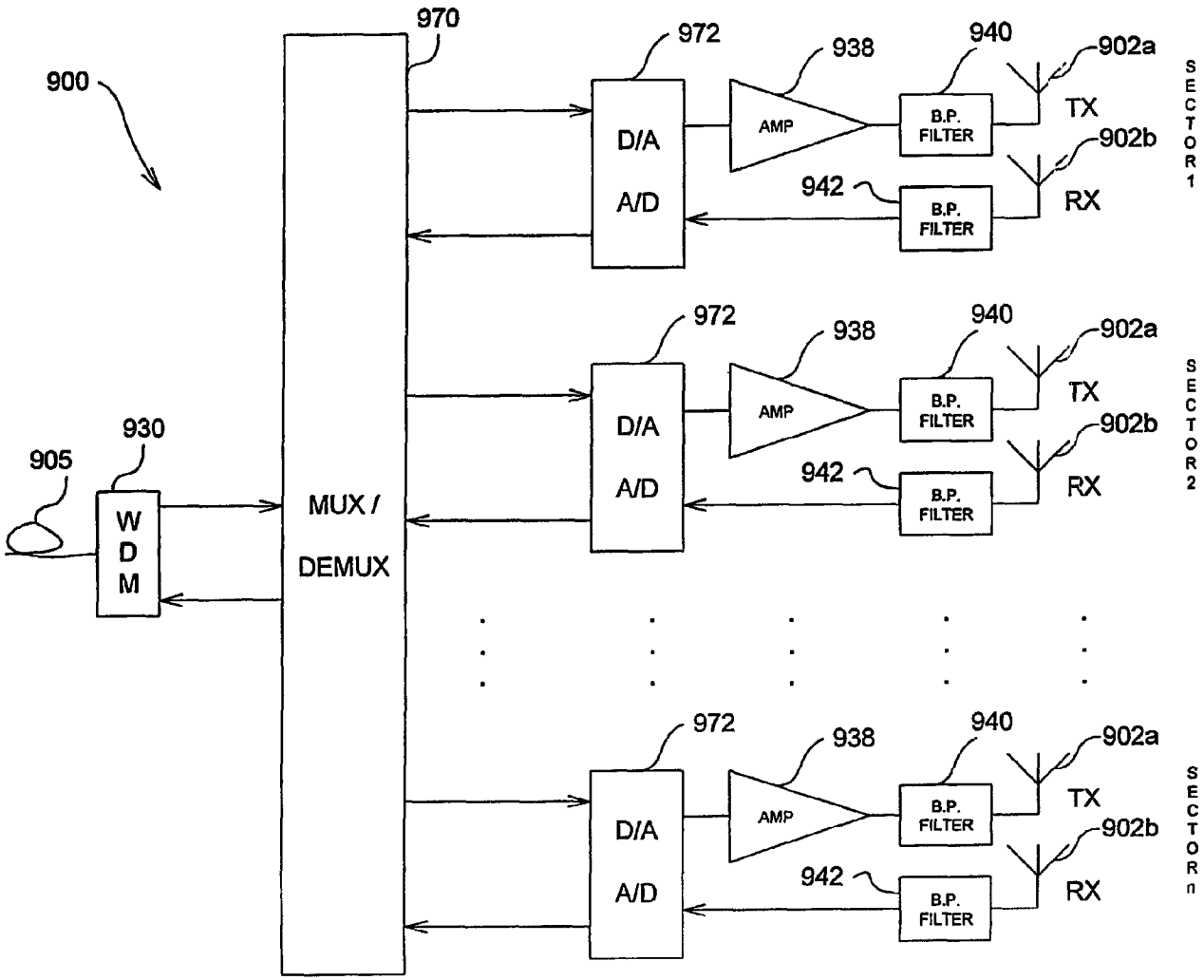
FIG. 47 is an alternate embodiment of the remote unit embodiment shown in FIG. 42.

Referring now to FIGS. 46 and 47, there is shown yet another alternate exemplary embodiment to the sectorized microcell system according to the present invention. In this embodiment, sectorized base station unit 906, provides that an analog-to-digital multiplexer and digital-to-analog demultiplexer unit 960 receives a separate input from each of the channel banks 912, and separately converts each of the RF composite signals from the channel banks to a corresponding digitized RF stream. This digitized RF stream is in turn multiplexed into a single digitized stream, which is output in optical form for application to wave division multiplexer 916. In the reverse direction, a single digitized RF stream is received from wave division multiplexer 916, and demultiplexed into N separate digital streams, each corresponding to one of N sectors (where N=3 in the example shown in FIG. 42). Each of the digital streams represents a desynchronized of the analog RF received by the respective sector antenna in pair 902. The demultiplexed digital stream is then converted from digital-to-analog form, and applied to each of the respective receivers in the channel banks 912.

Figure 42:
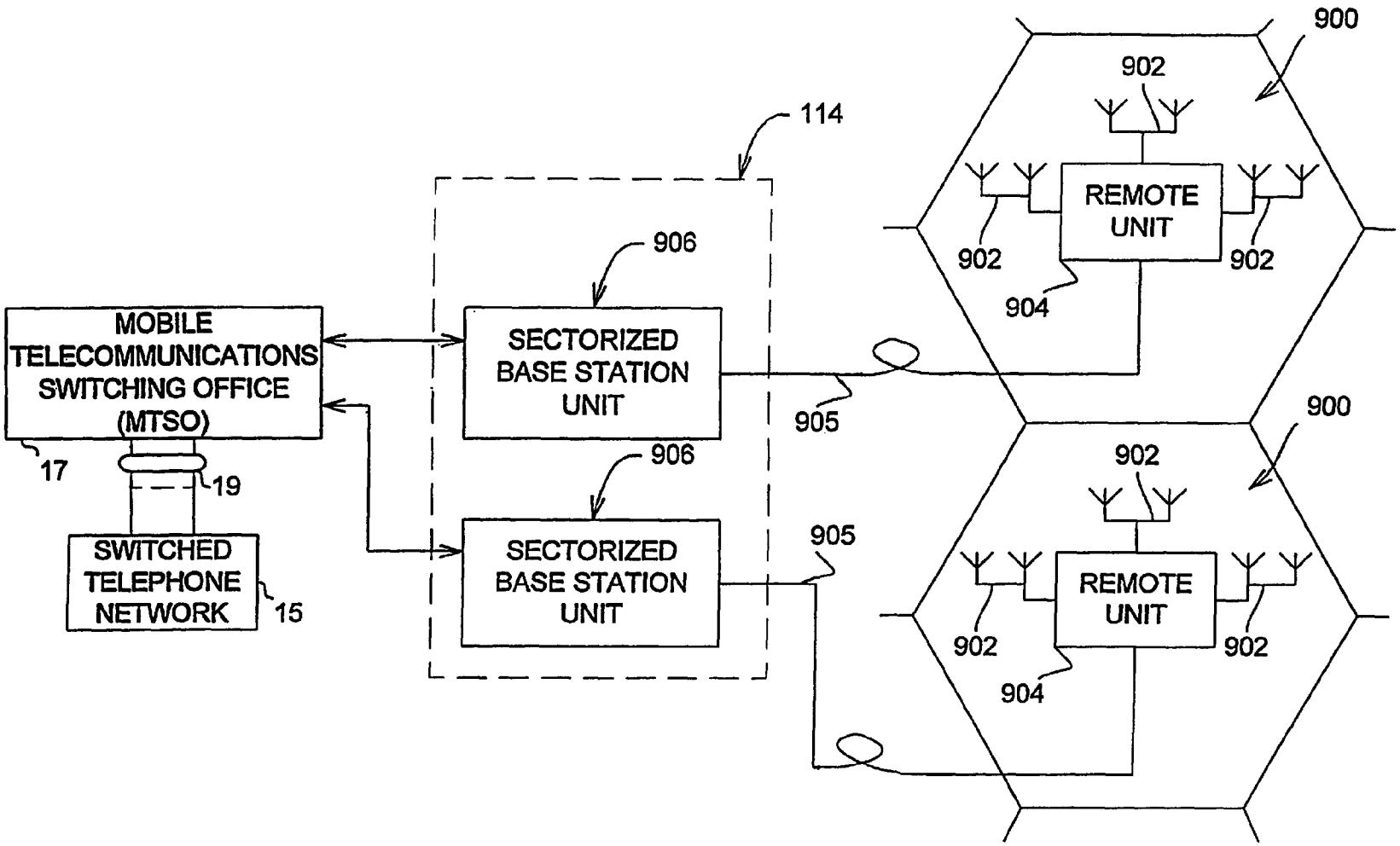
FIG. 42 is a simplified block diagram of an exemplary embodiment of a sectorized microcell communications system according to the present invention.

FIG. 47 illustrates an alternate embodiment of remote unit 904 of FIG. 42. Remote units 900 of FIG. 47 include a multiplexer/demultiplexer unit 970, which receives the digitized stream from wave division multiplexer 930, and converts the multiplexed digitized signals from each of the respective banks in the sectorized base station unit 906 shown in FIG. 46. The demultiplexed data streams for each of the banks is applied to respective digital-to-analog and analog-to-digital conversion units 972 which convert the digitized signal to a corresponding analog RF signal. The analog RF signal is applied to an amplifier 938, which is in turn applied to band pass filter 940 and to transmitter antenna 902a, in a manner similar to that described for FIG. 44. Similarly, RF receiving antenna 902b is applied to band pass filter 942, which in turn applies its output to unit 972, wherein the analog signal is converted to a digital form for application to multiplexer/demultiplexer 970. The digitized data streams from each of units 972 is multiplexed in unit 970, converted to an optical output, and applied to wave divisional multiplexer 932, for transmission over fiber 905 to sectorized base station unit 906 of FIG. 46. The digitized data stream is received by wave division multiplexer 916, in sectorized base station unit 906 of FIG. 46, applied to unit 960. Unit 960 demultiplexes the digitized stream into a digital stream associated with each sector and converts each sector digital stream to a sector RF signal. The sector RF signal is applied to the receivers of the respective channel banks for the sectors.

Thus, the sectorized microcell system of the present invention allows for the replacement of the conventional cell site base station in a convention macrocell. In the above described embodiments, the antennas used for each sector are directional, and are all located in the same place. Each directional antenna, one transmit and receive for each sector, is then directed outwardly across the sector serviced by them. For instance, the sectors may be pie-shaped, with the directional antennas positioned at the center of the pie. Alternatively, nondirectional antennas could be used and positioned at different locations in the cell site. In such a case, the antennas are coupled to the cell site through coaxial cables. In addition, though the above sectorization examples have been described using antenna pairs, it should be obvious to one skilled in the art that sector units having one antenna, or even units having three or more antennae may be used advantageously within such a system. Furthermore, although the examples described entail only the digitization of RF signals generated from the telephone signal received from the MTSO, it should be apparent that the techniques of digital synthesis described in the context of FIG. 10 et al. also apply to a sectorized microcell system. Diversity channels may also be implemented as described above.

Finally, although each of the examples above describes the use of an analog RF signal transmitted and received by each remote unit, it should be obvious that the above system and method can be applied advantageously to a digital RF cellular system in a manner well known in the art.

Thus, as described above, the sectorized cell replacement system provides for greater reuse of channels, by dividing conventional cells or even microcells into a plurality of sectors. Furthermore, the system provides all the benefits and advantages of the microcell systems described hereinabove, wherein the transmitters and receivers for all the channels in the cell are centrally located in a convenient and inexpensive location.

Thus, as described above, the present inventions provide a variety of digital systems and methods for transporting cellular traffic to and from antenna units, and for passively switching. Although the invention(s) has been described in its preferred form, those of skill in the art will recognize that many modifications and changes may be made thereto without departing from the spirit and the scope of the claims appended hereto.

We claim:

[1. A method of sectorizing coverage over a cellular communications area divided into a plurality of microcells each covering a subarea of the communications area and being divided into a plurality of angular sectors having separate transmitters and receivers, the method comprising performing the following steps:

receiving a number of information-bearing telephone signals from a mobile telecommunications switching office at a common base station serving the microcells within the cellular communications area;

modulating the information-bearing telephone signals onto a plurality of different analog radio-frequency carriers representing a plurality of different channel sets for respective sectors of the microcells at the base station;

combining the analog radio-frequency signals for all of the sectors into a single outbound analog signal within a predetermined radio-frequency band, representing all of the channel sets for all of the sectors;

converting the single outbound analog signal directly to a single outbound digital representation at the base station;

sending the outbound digital representation of the radio-frequency signal via a transmission means to a remote unit located in or near the subarea of at least one microcell;

at the remote unit, converting the outbound digital representation directly to a single analog representation of the entire outbound single radio-frequency signal within the same radio-frequency band and containing each of the plurality of channel sets;

sending each of the plurality of channel sets to a different one of a plurality of antenna units for the microcell, each of the antenna units being positioned so as to cover a different angular sector of the microcell;

at the antenna unit covering each sector of the microcell, receiving telephone signals within the radio-frequency band for the channel set of that sector;

sending the received telephone signals to the remote unit;

at the remote unit, combining all the received telephone signals from all the sectors to a single combined analog radio-frequency received signal containing all the channel sets for the microcell;

converting the single combined radio-frequency received signal directly to a received digital representation of the radio-frequency band of the channel sets for the sectors;

sending the received digital representation via the transmission means to the base station; and at the centrally located base station, converting the received digital representation directly to a received analog representation;

demodulating the received analog representation to recover the individual inbound telephone signals.]

[2. The method of claim 1, wherein:

the step of sending the digital representation of the radio-frequency signal to the remote unit includes modulating it onto a transmit optical signal at a transmit wavelength on an optical fiber; and the step of sending the received digital representation to the base station includes modulating it onto a receive optical signal on an optical fiber.]

[3. The method of claim 2, wherein the transmit and receive optical signals are sent on the same optical fiber, the transmit and receive wavelengths being different from each other.]

[4. The method of claim 1, wherein all the antenna units are located near the remote unit, and wherein the distance from the centrally located base station to the remote unit is greater than the distance from the remote unit to its antenna unit.]

[5. A method of sectorizing coverage over a cellular communications area divided into a plurality of microcells each covering a subarea of the communications area, and each divided into a plurality of sectors, the method comprising performing the following steps for each microcell:

receiving a number of information-bearing telephone signals from a mobile telecommunications switching office at a common base station serving the microcells within the cellular communications area;

generating from the information-bearing telephone signals one of a plurality of different channel sets of signals for each sector of that microcell at the base station;

combining the plurality of different channel sets into a single analog signal in a predetermined radio-frequency band;

converting the single analog signal directly to a single digital representation;

sending the digital representation via a transmission means to a remote unit located in or near the subarea;

at the remote unit, converting the digital representation directly to an analog representation of the radio-frequency signal for all channel sets within the same predetermined radio-frequency band; and sending the radio-frequency signal for each of the plurality of channel sets to a different one of a plurality of antenna units, each of the antenna units being positioned so as to cover a different angular sector of that microcell.]

[6. The method of claim 5, wherein the step of sending the radio-frequency signal for each of the channel sets includes:

splitting the channel sets to form multiple parallel paths each carrying a signal representation for a different one of the channel sets; and filtering each of the paths differently based upon the channel set carried on that path.]

[7. A method of sectorizing coverage over a cellular communications area divided into a plurality of microcells each covering a subarea of the communications area, each microcell being divided into a plurality of sectors, the method comprising:

at a plurality of antenna units each covering a different sector of a microcell, receiving analog telephone signals within a predetermined radio-frequency band for a channel set assigned to that sector;

sending all the analog telephone signals to a remote unit serving the sectors of the microcell, the remote unit being located in or near the subarea of the microcell;

at the remote unit for the microcell, combining all the analog telephone signals from all sectors of the microcell into a single analog signal within the same radio-frequency band as the channel sets for the sectors of the microcell;

converting the single combined analog signal directly as a whole to a received digital representation;

sending the received digital representation via the transmission means to a common base station serving the microcells of the communications area;

at the base station, converting the received digital representation to an inbound analog signal within the radio-frequency band;

demodulating the inbound analog signal to recover a plurality of information-bearing signals representing received analog telephone signals; and sending the information-bearing signals to a mobile telecommunications switching office.]

[8. The method of claim 7, wherein the antenna unit for said each microcell includes one or more diversity antenna(s) covering one or more sector(s) of that microcell.]

[9. The method of claim 8, further comprising the steps of:

at each diversity antenna, receiving analog diversity signal(s) within the radio-frequency band for the channel set of its sector;

sending all diversity signals for said each microcell to the remote unit for said each microcell;

at the remote unit for said each microcell, converting the diversity signals from all sectors in that microcell to a diversity digital representation within the radio-frequency band; and sending the diversity digital representation via the transmission means to the base station.]

*10. A method of transmitting an RF signal between an optical node and a head end, the method comprising:*

*generating a digitized representation of the RF signal at the optical node, wherein the RF signal is a combined analog signal representing a plurality of transmissions for a set of channels; and*

*transmitting the digitized representation to the head end.*

*11. The method of claim 10, wherein generating a digitized representation of the RF signal comprises sampling the RF signal to produce a stream of digital samples.*

*12. The method of claim 10, wherein transmitting the digitized representation to the head end comprises transmitting the digitized representation over a path selected from the group consisting of a fiber optic cable and a coaxial cable.*

*13. The method of claim 11, wherein the path is a single fiber optic cable or a single coaxial cable.*

*14. The method of claim 11, wherein the fiber optic is part of a cable television system.*

*15. A method of transceiving RF signals between a head end and at least one optical node, the method comprising:*

*generating a digitized representation of a first RF signal at the head end, wherein the first RF signal is a combined analog signal representing a plurality of transmissions for a set of channels;*

*transmitting the digitized representation to the optical node;*

*receiving a second RF signal at the at least one optical node;*

*generating a digitized representation of the second RF signal at the optical node, wherein the second RF signal is a combined analog signal representing a plurality of transmissions for a set of channels; and*

*transmitting the digitized representation to the head end.*

*16. The method of claim 15, wherein the optical node is coupled to a cable television system.*

*17. The method of claim 15, wherein generating a digitized representation of the first and second RF signals comprises:*

*sampling the RF signal to produce a stream of digital samples.*

*18. The method of claim 15, wherein transmitting the digitized representation of the first and second RF signals comprises transmitting the digitized representation over a path selected from the group consisting of a fiber optic cable and a coaxial cable.*

*19. The method of claim 18, wherein the path is a single fiber optic cable or a single coaxial cable.*

*20. A method of communicating an RF signal from an at least one optical node to a head end, the method comprising:*

*receiving an RF signal at an at least one optical node;*

*generating a digitized representation of the RF signal at the at least one optical node, wherein the RF signal is a combined analog signal representing a plurality of transmissions for a set of channels; and*

*transmitting the digitized representation to the head end.*

*21. The method of claim 20, wherein generating a digitized representation of the RF signal comprises sampling the RF signal to produce a stream of digital samples.*

*22. The method of claim 20, wherein transmitting the digitized representation to the head end comprises transmitting the digitized representation over a path selected from the group consisting of a fiber optic cable and a coaxial cable.*

*23. The method of claim 22, wherein the path is a single fiber optic cable or a single coaxial cable.*

*24. The method of claim 22, wherein the fiber optic is part of a cable television system.*

*25. A communications system for transmission of an RF signal from an optical node to a head end, comprising:*

*an optical node coupled to a carrier medium, wherein the optical node digitizes a received RF signal and transmits the digitized RF signal on the carrier medium, where the RF signal is a combined analog signal representing a plurality of transmissions for a set of channels; and*

*a head end coupled to the carrier medium.*

*26. The communications system of claim 25, wherein digitizing the RF signal comprises sampling the RF signal to produce a stream of digital samples.*

*27. The communications system of claim 25, wherein transmitting the digitized RF signal on the carrier medium comprises transmitting the digitized representation over a carrier medium selected from the group consisting of a fiber optic cable and a coaxial cable.*

*28. The communications system of claim 25, wherein the carrier medium is a single fiber optic cable or a single coaxial cable.*

*29. The communications system of claim 25, wherein the fiber optic is part of a cable television system.*

*30. A communications system for transceiving RF signals from an optical node to a head end, comprising:*

*at least one optical node coupled to a carrier medium, wherein the at least one optical node digitizes an first RF signal and transmits the digitized first RF signal on the carrier medium, where the first RF signal is a combined analog signal representing a plurality of transmissions for a set of channels; and*

*a head end coupled to the carrier medium, wherein the head end digitizes a second RF signal and transmits the digitized second RF signal on the carrier medium, where the second RF signal is a combined analog signal representing a plurality of transmissions for a set of channels.*

*31. The communications system of claim 30, wherein digitizing the first and second RF signals comprises sampling the RF signal to produce a stream of digital samples.*

*32. The communications system of claim 30, wherein transmitting the digitized first and second RF signals on the carrier medium comprises transmitting the digitized representation over a carrier medium selected from the group consisting of a fiber optic cable and a coaxial cable.*

*33. The communications system of claim 30, wherein the carrier medium is a single fiber optic cable or a single coaxial cable.*

*34. The communications system of claim 30, wherein the fiber optic is part of a cable television system.*

*35. A method of transmitting an RF signal between an optical node and a head end, the method comprising:*

*generating a digitized representation of the RF signal at the optical node; and*

*transmitting the digitized representation to the head end.*

*36. The method of claim 35, wherein generating a digitized representation of the RF signal comprises sampling the RF signal to produce a stream of digital samples.*

*37. The method of claim 35, wherein transmitting the digitized representation to the head end comprises transmitting the digitized representation over a path selected from the group consisting of a fiber optic cable and a coaxial cable.*

*38. The method of claim 37, wherein the path is a single fiber optic cable or a single coaxial cable.*

*39. The method of claim 37, wherein the fiber optic is part of a cable television system.*

*40. A communications system for transmission of an RF signal from an optical node to a head end, comprising:*

*an optical node coupled to a carrier medium, wherein the optical node digitizes a received RF signal and transmits the digitized RF signal on the carrier medium; and*

*a head end coupled to the carrier medium.*

*41. The communications system of claim 40, wherein digitizing the RF signal comprises sampling the RF signal to produce a stream of digital samples.*

*42. The communications system of claim 40, wherein transmitting the digitized RF signal on the carrier medium comprises transmitting the digitized representation over a carrier medium selected from the group consisting of a fiber optic cable and a coaxial cable.*

*43. The communications system of claim 40, wherein the carrier medium is a single fiber optic cable or a single coaxial cable.*

*44. The communications system of claim 40, wherein the fiber optic is part of a cable television system.*

*45. A first unit for communicating with a remote unit over a communication medium, the first unit comprising:*

*a framer that frames a digital representation of a base station signal from a base station in order to produce a framed signal, the base station signal comprising a single signal that includes a plurality of channels, the plurality of channels including information being transmitted to a plurality of remote wireless communication units;*

*wherein the first unit transmits a transmission signal over the communication medium to the remote unit;*

*wherein the transmission signal is derived from at least a portion of the framed signal; and*

*wherein the remote unit is physically remote from the first unit.*

*46. The first unit of claim 45, wherein the base station signal is output from the base station.*

*47. The first unit of claim 45, wherein the digital representation of the base station signal is generated at the first unit.*

*48. The first unit of claim 45, wherein the base station is communicatively coupled to the first unit.*

*49. The first unit of claim 48, wherein the base station is directly connected to the first unit.*

*50. The first unit of claim 45, wherein the first unit comprises the base station.*

*51. The first unit of claim 45, wherein the plurality of channels comprises a plurality of carriers, wherein each of a plurality of baseband signals is modulated onto at least one of the plurality of carriers, wherein the plurality of baseband signals conveys the information.*

*52. The first unit of claim 51, wherein each of the plurality of carriers comprises at least one of a radio frequency carrier and an intermediate frequency carrier.*

*53. A first unit for communicating with a remote unit over a communication medium, the first unit comprising:*

*a framer that, in order to produce a framed signal, frames a representation of a wireless signal, the wireless signal for wirelessly communicating with a plurality of remote wireless communication units, the wireless signal comprising a plurality of channels, the plurality of channels comprising a plurality of carriers on which information being transmitted to the plurality of remote wireless communication units is modulated;*

*wherein the first unit transmits a transmission signal over the communication medium to the remote unit;*

*wherein the transmission signal is derived from at least a portion of the framed signal; and*

*wherein the remote unit is physically remote from the first unit.*

*54. The first unit of claim 53, wherein the representation of the wireless signal comprises a digital representation of the wireless signal.*

*55. The first unit of claim 53, wherein the plurality of channels comprises a plurality of baseband signals that comprise the information, wherein each of the plurality of baseband signals is modulated onto at least one of the plurality of carriers.*

*56. The first unit of claim 53, wherein the framed signal comprises a plurality of frames, each frame comprising a digital sample of the plurality channels.*

*57. The first unit of claim 56, wherein each frame comprises at least one of control data and monitoring data.*

*58. The first unit of claim 56, wherein each frame comprises error detection and correction data.*

*59. The first unit of claim 56, wherein each frame comprises data associated with multiple services.*

*60. The first unit of claim 53, wherein the plurality of carriers comprises at least one of a plurality of radio frequency carriers and a plurality of intermediate frequency carriers.*

*61. The first unit of claim 53, wherein the communication medium comprises an optical communication medium and the transmission signal comprises an optical transmission signal.*

*62. The first unit of claim 53, wherein the first unit receives, from a base station in the form of an analog combined signal, the plurality of channels.*

*63. The first unit of claim 62, wherein the first unit is at the base station.*

*64. A remote unit for communicating with a first unit over a communication medium, the remote unit comprising:*

*a demultiplexer to extract, from a framed signal derived from a transmission signal transmitted from the first unit to the remote unit via the communication medium, a digital representation of a plurality channels, the plurality of channels comprising a plurality of carriers on which information being transmitted to a plurality of remote wireless communication units is modulated; and*

*a converter to output a radio frequency signal from the digital representation for wireless radio frequency transmission to a plurality of wireless communication devices;*

*wherein the remote unit is physically remote from the first unit.*

*65. The remote unit of claim 64, wherein the framed signal comprises a plurality of frames, each frame comprising a digital sample of the plurality of channels.*

*66. The remote unit of claim 65, wherein each frame comprises at least one of control data and monitoring data.*

*67. The remote unit of claim 65, wherein each frame comprises error detection and correction data.*

*68. The remote unit of claim 65, wherein each frame comprises data associated with multiple services.*

*69. The remote unit of claim 64, wherein the plurality of carriers comprises at least one of a plurality of radio frequency carriers and a plurality of intermediate frequency carriers.*

*70. A remote unit for communicating with a first unit over a communication medium, the remote unit comprising:*

*a framer that frames a digital representation of a radio frequency signal from an antenna in order to produce a framed signal, the radio frequency signal comprising a plurality of radio frequency channels, the plurality of radio frequency channels including information being transmitted from a plurality of remote wireless communication units;*

*wherein the remote unit transmits a transmission signal over the communication medium to the first unit;*

*wherein the transmission signal is derived from at least a portion of the framed signal; and*

*wherein the remote unit is physically remote from the first unit.*

*71. The remote unit of claim 70, wherein the framer frames a digital representation of a second analog radio frequency signal.*

*72. The remote unit of claim 71, wherein the second analog radio frequency signal is a diversity signal from a diversity antenna.*

*73. A first unit for communicating with a remote unit over a communication medium, the first unit comprising:*

*a demultiplexer to extract, from a framed signal derived from a transmission signal transmitted from the remote unit to the first unit via the communication medium, a digital representation of a radio frequency signal from an antenna, the radio frequency signal comprising a plurality of radio frequency channels; and*

*a converter to output a base station signal from the digital representation for communication to a base station unit, the base station signal comprising a representation of at least a subset of the plurality of radio frequency channels;*

*wherein the remote unit is physically remote from the first unit.*

*74. The first unit of claim 73, wherein the first unit is located at the base station.*

*75. The first unit of claim 74, wherein base station is connected to the first unit.*

*76. A method of communicating from a first unit to a remote unit over a communication medium, the method comprising:*

*producing a framed signal from a digital representation of a base station signal originating from a base station, the base station signal comprising a single signal that includes a plurality of channels, the plurality of channels including information being transmitted to a plurality of remote wireless communication units; and*

*transmitting a transmission signal from the host unit to the remote unit over the communication medium;*

*wherein the transmission signal is derived from at least a portion of the framed signal; and*

*wherein the remote unit is physically remote from the first unit.*

*77. The method of claim 76, wherein the base station signal is output from the base station.*

*78. The method of claim 76, further comprising generating the digital representation of the base station signal at the first unit.*

*79. The method of claim 76, wherein the base station is communicatively coupled to the first unit.*

*80. The method of claim 79, wherein the base station is directly connected to the first unit.*

*81. The method of claim 76, wherein the first unit comprises the base station.*

*82. The method of claim 76, wherein the plurality of channels comprises a plurality of carriers, wherein each of a plurality of baseband signals is modulated onto at least one of the plurality of carriers, wherein the plurality of baseband signals conveys the information.*

*83. The method of claim 82, wherein each of the plurality of carriers comprises at least one of a radio frequency carrier and an intermediate frequency carrier.*

*84. A method of communicating from a first unit to a remote unit over a communication medium, the method comprising:*

*producing a framed signal from a representation of a wireless signal, the wireless signal for wirelessly communicating with a plurality of remote wireless communication units, the wireless signal comprising a plurality channels, the plurality of channels comprising a plurality of carriers on which information being transmitted to the plurality of remote wireless communication units is modulated; and*

*transmitting a transmission signal from the host unit to the remote unit over the communication medium;*

*wherein the transmission signal is derived from at least a portion of the framed signal; and*

*wherein the remote unit is physically remote from the first unit.*

*85. The method of claim 84, wherein the representation of the wireless signal comprises a digital representation of the wireless signal.*

*86. The method of claim 84, wherein the plurality of channels comprises a plurality of baseband signals that comprise the information, wherein each of the plurality of baseband signals is modulated onto at least one of the plurality of carriers.*

*87. The method of claim 84, wherein the framed signal comprises a plurality of frames, each frame comprising a digital sample of the plurality channels.*

*88. The method of claim 87, wherein each frame comprises at least one of control data and monitoring data.*

*89. The method of claim 87, wherein each frame comprises error detection and correction data.*

*90. The method of claim 87, wherein each frame comprises data associated with multiple services.*

*91. The method of claim 84, wherein the plurality of carriers comprises at least one of a plurality of radio frequency carriers and a plurality of intermediate frequency carriers.*

*92. The method of claim 84, wherein the communication medium comprises an optical communication medium and the transmission signal comprises an optical transmission signal.*

*93. The method of claim 84, wherein the first unit receives, from a base station in the form of an analog combined signal, the plurality of channels.*

*94. The method of claim 93, wherein the first unit is at the base station.*

*95. A method of communicating from a first unit to a remote unit over a communication medium, the method comprising:*

*receiving, at the remote unit from the communication medium, a transmission signal transmitted from the first unit;*

*extracting, from a framed signal derived from the transmission signal, a digital representation of a plurality channels, the plurality of channels comprising a plurality of carriers on which information being transmitted to a plurality of remote wireless communication units is modulated; and*

*producing a radio frequency signal from the digital representation for wireless radio frequency transmission to a plurality of wireless communication devices;*

*wherein the remote unit is physically remote from the first unit.*

*96. The method of claim 95, wherein the framed signal comprises a plurality of frames, each frame comprising a digital sample of the plurality channels.*

*97. The method of claim 96, wherein each frame comprises at least one of control data and monitoring data.*

*98. The method of claim 96, wherein each frame comprises error detection and correction data.*

*99. The method of claim 96, wherein each frame comprises data associated with multiple services.*

*100. The method of claim 95, wherein the plurality of carriers comprises at least one of a plurality of radio frequency carriers and a plurality of intermediate frequency carriers.*

*101. A method of communicating from a remote unit to a first unit over a communication medium, the method comprising:*

*producing a framed signal from a digital representation of a radio frequency signal from an antenna, the radio frequency signal comprising a plurality of radio frequency channels, the plurality of radio frequency channels including information being transmitted from a plurality of remote wireless communication units;*

*transmitting a transmission signal from the remote unit to the first unit over the communication medium;*

*wherein the transmission signal is derived from at least a portion of the framed signal; and*

*wherein the remote unit is physically remote from the first unit.*

*102. The method of claim 101, wherein producing the framed signal further comprises producing the framed signal from the digital representation of the radio frequency signal from the antenna and a digital representation of a second radio frequency signal.*

*103. The method of claim 102, wherein the second radio frequency signal is a diversity signal from a diversity antenna.*

*104. A method of communicating from a remote unit to a first unit over a communication medium, the method comprising:*

*receiving, at the first unit from the communication medium, a transmission signal transmitted from the remote unit;*

*extracting, from a framed signal derived from the transmission signal, a digital representation of a radio frequency signal from an antenna, the radio frequency signal comprising a plurality of radio frequency channels; and*

*producing a base station signal from the digital representation for communication to a base station, the base station signal comprising a representation of at least a subset of the plurality of radio frequency channels;*

*wherein the remote unit is physically remote from the first unit.*

*105. The method of claim 104, wherein the first unit is located at the base station.*

*106. The method of claim 105, wherein base station is connected to the first unit.*

*107. A first unit for communicating with a remote unit over a communication medium, the first unit comprising:*

*a digital unit to output a digital representation of a base station signal from a base station, the base station signal comprising a single signal that includes a plurality of channels, the plurality of channels including information being transmitted to a plurality of remote wireless communication units;*

*wherein the first unit transmits a transmission signal over the communication medium to the remote unit;*

*wherein the transmission signal is derived from at least a portion of the digital representation; and*

*wherein the remote unit is physically remote from the first unit.*

*108. The first unit of claim 107, wherein the digital unit comprises an analog to digital converter.*

*109. The first unit of claim 108, wherein the digital unit comprises a down converter that down converts the base station signal, wherein the analog to digital converter digitizes the down converted base station signal.*

*110. The first unit of claim 107, wherein the plurality of channels comprises at least one of a plurality of radio frequency channels and a plurality of intermediate frequency channels.*

*111. The first unit of claim 107, wherein the communication medium comprises an optical communication medium and the transmission signal comprises an optical transmission signal.*

*112. The first unit of claim 107, wherein the first unit receives, from a base station in the form of an analog combined signal, the base station signal.*

*113. The first unit of claim 112, wherein the first unit is at the base station.*

*114. A first unit for communicating with a remote unit over a communication medium, the first unit comprising:*

*a digital unit to output a digital representation of a plurality channels, the plurality of channels comprising a plurality of carriers on which information being transmitted to a plurality of remote wireless communication units is modulated;*

*wherein the first unit transmits a transmission signal over the communication medium to the remote unit;*

*wherein the transmission signal is derived from at least a portion of the digital representation; and*

*wherein the remote unit is physically remote from the first unit.*

*115. The first unit of claim 114, wherein the digital unit comprises an analog to digital converter.*

*116. The first unit of claim 115, wherein the digital unit comprises a down converter that down converts a combined signal comprising the plurality of channels, wherein the analog to digital converter digitizes the down converted combined signal.*

*117. The first unit of claim 114, wherein the plurality of carriers comprises at least one of a plurality of radio frequency carriers and a plurality of intermediate frequency carriers.*

*118. The first unit of claim 114, wherein the communication medium comprises an optical communication medium and the transmission signal comprises an optical transmission signal.*

*119. The first unit of claim 114, wherein the first unit receives, from a base station in the form of an analog combined signal, the plurality of channels.*

*120. The first unit of claim 119, wherein the first unit is at the base station.*

*121. A first unit for communicating with a remote unit over a communication medium, the first unit comprising:*

*an interface to receive, from the communication medium, a transmission signal transmitted from the remote unit, wherein the transmission signal comprises a digital representation of a radio frequency signal from at least one antenna communicatively coupled to the remote unit, the radio frequency signal comprising a plurality of radio frequency channels; and*

*a digital unit to output a base station signal from the digital representation that is communicated to a base station, the base station signal comprising a representation of at least a subset of the plurality of radio frequency channels;*

*wherein the remote unit is physically remote from the first unit.*

*122. The first unit of claim 121, wherein the digital unit comprises a digital to analog converter.*

*123. The first unit of claim 122, wherein the digital unit comprises an up converter that up converts an analog signal output by the digital to analog converter.*

*124. The first unit of claim 121, wherein the communication medium comprises an optical communication medium and the transmission signal comprises an optical transmission signal.*

*125. The first unit of claim 121, wherein the first unit is at the base station.*

*126. A remote unit for communicating with a first unit over a communication medium, the remote unit comprising:*

*an interface to receive, from the communication medium, a transmission signal transmitted from the first unit, wherein the transmission signal comprises a digital representation of a plurality channels, the plurality of channels comprising a plurality of carriers on which information being transmitted to a plurality of wireless communication units is modulated; and*

*a digital unit to output a radio frequency signal from the digital representation for wireless radio frequency transmission to the plurality of wireless communication devices;*

*wherein the remote unit is physically remote from the first unit.*

*127. The remote unit of claim 126, wherein the digital unit comprises a digital to analog converter.*

*128. The remote unit of claim 127, wherein the digital unit comprises an up converter that up converts an analog signal output by the digital to analog converter in order to output the radio frequency signal.*

*129. The remote unit of claim 126, wherein the communication medium comprises an optical communication medium and the transmission signal comprises an optical transmission signal.*

*130. The remote unit of claim 126, wherein the antenna is located at the remote unit.*

*131. A remote unit for communicating with a first unit over a communication medium, the remote unit comprising:*

*a digital unit to output a digital representation of a radio frequency signal from an antenna, the radio frequency signal comprising a single signal that includes a plurality of radio frequency channels, the plurality of radio frequency channels including information being transmitted from a plurality of remote wireless communication units;*

*wherein the remote unit transmits a transmission signal over the communication medium to the first unit;*

*wherein the transmission signal is derived from at least a portion of the digital representation; and*

*wherein the remote unit is physically remote from the first unit.*

*132. The remote unit of claim 131, wherein the digital unit comprises an analog to digital converter.*

*133. The remote unit of claim 132, wherein the digital unit comprises a down converter that down converts the radio frequency signal, wherein the analog to digital converter digitizes the down converted radio frequency signal.*

*134. The remote unit of claim 131, wherein the communication medium comprises an optical communication medium and the transmission signal comprises an optical transmission signal.*

*135. The remote unit of claim 131, wherein the antenna is located at the remote unit.*

*136. A method of communicating from a first unit to a remote unit over a communication medium, the method comprising:*

*producing a digital representation of a base station signal originating from a base station, the base station signal comprising a single signal that includes a plurality of channels, the plurality of channels including information being transmitted to a plurality of remote wireless communication units;*

*transmitting a transmission signal from the first unit to the remote unit over the communication medium;*

*wherein the transmission signal is derived from at least a portion of the digital representation; and*

*wherein the remote unit is physically remote from the first unit.*

*137. The method of claim 136, wherein producing the digital representation of the base station signal comprises down converting the base station signal.*

*138. The method of claim 136, wherein the plurality of channels comprises at least one of a plurality of radio frequency channels and a plurality of intermediate frequency channels.*

*139. The method of claim 136, wherein the communication medium comprises an optical communication medium and the transmission signal comprises an optical transmission signal.*

*140. The method of claim 136, further comprising receiving, from a base station in the form of an analog combined signal, the base station signal.*

*141. A method of communicating from a first unit to a remote unit over a communication medium, the method comprising:*

*producing a digital representation of a plurality channels, the plurality of channels comprising a plurality of carriers on which information being transmitted to a plurality of remote wireless communication units is modulated;*

*transmitting a transmission signal from the first unit to the remote unit over the communication medium;*

*wherein the transmission signal is derived from at least a portion of the digital representation; and*

*wherein the remote unit is physically remote from the first unit.*

*142. The method of claim 141, wherein producing the digital representation of the plurality channels comprises down converting a combined signal comprising the plurality of channels.*

*143. The method of claim 141, wherein the plurality of carriers comprises at least one of a plurality of radio frequency carriers and a plurality of intermediate frequency carriers.*

*144. The method of claim 141, wherein the communication medium comprises an optical communication medium and the transmission signal comprises an optical transmission signal.*

*145. The method of claim 141, further comprising receiving, from a base station in the form of an analog combined signal, the plurality of channels.*

*146. A method of communicating from a remote unit to a first unit over a communication medium, the method comprising:*

*receiving, at the first unit from the communication medium, a transmission signal transmitted from the remote unit, wherein the transmission signal comprises a digital representation of a radio frequency signal from at least one antenna communicatively coupled to the remote unit, the radio frequency signal comprising a plurality of radio frequency channels; and*

*producing a base station signal from the digital representation that is communicated to a base station, the base station signal comprising a representation of at least a subset of the plurality of radio frequency channels;*

*wherein the remote unit is physically remote from the first unit.*

*147. The method of claim 146, wherein producing the base station signal from the digital representation comprises up converting an analog signal output by the digital to analog converter.*

*148. The method of claim 146, wherein the communication medium comprises an optical communication medium and the transmission signal comprises an optical transmission signal.*

*149. A method of communicating from a first unit to a remote unit over a communication medium, the method comprising:*

*receiving, at the remote unit from the communication medium, a transmission signal transmitted from the first unit, wherein the transmission signal comprises a digital representation of a base station signal from a base station, the base station signal comprising a plurality of channels; and*

*producing a radio frequency signal from the digital representation for wireless radio frequency transmission to a plurality of wireless communication devices;*

*wherein the remote unit is physically remote from the first unit.*

*150. The method of claim 149, wherein producing the radio frequency signal from the digital representation comprises up converting an analog signal output by the digital to analog converter in order to output the radio frequency signal.*

*151. The method of claim 149, wherein the communication medium comprises an optical communication medium and the transmission signal comprises an optical transmission signal.*

*152. The method of claim 149, wherein the antenna is located at the remote unit.*

*153. A method of communicating from a remote unit to a first unit over a communication medium, the method comprising:*

*receiving a radio frequency signal from an antenna, the radio signal comprising a single signal that includes a plurality of radio frequency channels, the plurality of radio frequency channels including information being transmitted from a plurality of remote wireless communication units;*

*producing a digital representation of the radio frequency signal;*

*transmitting a transmission signal from the remote unit to the first unit over the communication medium;*

*wherein the transmission signal is derived from at least a portion of the digital representation; and*

*wherein the remote unit is physically remote from the first unit.*

*154. The method of claim 153, wherein producing the digital representation comprises down converting the radio frequency signal.*

*155. The method of claim 153, wherein the communication medium comprises an optical communication medium and the transmission signal comprises an optical transmission signal.*

*156. The method of claim 153, wherein the antenna is located at the remote unit.*

*157. A first unit for communicating with a remote unit over an optical communication medium, the first unit comprising:*

*an interface to receive a plurality channels, the plurality of channels comprising a plurality of carriers on which information being transmitted to a plurality of wireless communication units is modulated; and*

*a digitally modulated optical modulator to digitally modulate an optical signal with at least a portion of a digital representation of the plurality of channels in order to produce a modulated optical signal;*

*wherein the remote unit is physically remote from the first unit.*

*158. A remote unit for communicating with a first unit over an optical communication medium, the first unit comprising:*

*an interface to receive a radio frequency signal from an antenna, the radio frequency signal comprising a plurality of radio frequency channels, the plurality of radio frequency channels including information being transmitted from a plurality of wireless communication units; and*

*a digitally modulated optical modulator to digitally modulate an optical signal with at least a portion of a digital representation of the radio frequency signal in order to produce a modulated optical signal;*

*wherein the remote unit is physically remote from the first unit.*

* * * * *